US012699446B2

(12) United States Patent
Patel et al.

(10) Patent No.: US 12,699,446 B2
(45) Date of Patent: Aug. 4, 2026

(54) MANAGING INPUT MODALITIES ON AN EXTENDED REALITY DEVICE

(71) Applicant: GOOGLE LLC, Mountain View, CA (US)

(72) Inventors: Khushman Jayantilal Patel, Sunnyvale, CA (US); Mar Gonzalez Franco, Seattle, WA (US); Eric Jordan Gonzalez, Seattle, WA (US); Stiven Guillaume Francois Morvan, New York City, NY (US); Jacob Pawek, Cupertino, CA (US); Ishan Chatterjee, Seattle, WA (US); Isaac Allen Fehr, Los Angeles, CA (US); Vrushank Shripad Phadnis, Sunnyvale, CA (US); Jochen Weber, San Francisco, CA (US); Diego Rivas Vetencourt, San Francisco, CA (US); Lucy Abramyan, Los Gatos, CA (US); Li-Te Cheng, San Mateo, CA (US); Andrea Colaco, Los Altos, CA (US); Lee Payne, Elmira (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/036,702

(22) Filed: Jan. 24, 2025

(65) Prior Publication Data

US 2025/0244828 A1 Jul. 31, 2025

Related U.S. Application Data

(60) Provisional application No. 63/625,218, filed on Jan. 25, 2024, provisional application No. 63/625,234, (Continued)

(51) Int. Cl.
*G06F 3/01* (2006.01)

(52) U.S. Cl.
CPC .................................... *G06F 3/013* (2013.01)

(58) Field of Classification Search
CPC .......... G06F 3/011; G06F 3/012; G06F 3/013; G06F 3/017; G06F 2203/0381
See application file for complete search history.

(56) References Cited

U.S. PATENT DOCUMENTS

| 11,294,475 B1 | 4/2022 | Pinchon et al. | |
| 11,620,000 B1 * | 4/2023 | Stellmach .......... G02B 27/0179 |
| | | | 715/863 |

(Continued)

FOREIGN PATENT DOCUMENTS

CN 116243785 A 6/2023

OTHER PUBLICATIONS

International Search Report and Written Opinion for PCT Application No. PCT/US2025/013207, mailed on Apr. 24, 2025, 14 pages.

(Continued)

*Primary Examiner* — Ryan A Lubit
(74) *Attorney, Agent, or Firm* — Brake Hughes Bellermann LLP

(57) ABSTRACT

A display device may receive eye tracking data. A display device may detect an eye gaze intent state based on the eye tracking data. A display device may receive an input device signal of an input device. A display device may determine to switch from a first input modality to a second input modality based on at least one of the eye gaze intent state or the input device signal. A display device may move a position indicator on a display of the display device using at least one of the first input modality or the second input modality.

20 Claims, 35 Drawing Sheets

Related U.S. Application Data filed on Jan. 25, 2024, provisional application No. 63/625,222, filed on Jan. 25, 2024, provisional application No. 63/625,231, filed on Jan. 25, 2024, provisional application No. 63/625,235, filed on Jan. 25, 2024.

(56) References Cited

U.S. PATENT DOCUMENTS

| | | | | |
|---|---|---|---|---|
| 12,422,936 | B1 * | 9/2025 | Chen | G06F 3/013 |
| 2009/0086165 | A1 | 4/2009 | Beymer | |
| 2015/0338915 | A1 | 11/2015 | Publicover et al. | |
| 2016/0103579 | A1 * | 4/2016 | Coulmeau | G06F 3/0488 |
| | | | | 701/533 |
| 2017/0042418 | A1 | 2/2017 | Leinonen et al. | |
| 2018/0210547 | A1 * | 7/2018 | Sarkar | G02B 27/0172 |
| 2018/0292907 | A1 * | 10/2018 | Katz | G06F 3/017 |
| 2018/0307303 | A1 * | 10/2018 | Powderly | G06F 3/167 |
| 2019/0212827 | A1 | 7/2019 | Kin et al. | |
| 2019/0362557 | A1 * | 11/2019 | Lacey | G06F 3/012 |
| 2020/0089388 | A1 * | 3/2020 | Fu | G06F 3/167 |
| 2020/0371673 | A1 * | 11/2020 | Faulkner | G06F 3/017 |
| 2021/0097875 | A1 * | 4/2021 | Alexander, IV | G06T 13/40 |
| 2021/0141444 | A1 | 5/2021 | Speelman et al. | |
| 2021/0191510 | A1 | 6/2021 | Yoshikawa | |
| 2022/0121281 | A1 | 4/2022 | Stellmach et al. | |
| 2022/0236795 | A1 * | 7/2022 | Jonker | G06F 3/011 |
| 2022/0326536 | A1 | 10/2022 | Blomqvist et al. | |
| 2023/0315247 | A1 * | 10/2023 | Pastrana Vicente | G06F 1/1694 |
| | | | | 715/716 |
| 2023/0333646 | A1 | 10/2023 | Pastrana Vicente et al. | |
| 2024/0103613 | A1 * | 3/2024 | Chawda | G06F 3/0304 |
| 2024/0295922 | A1 * | 9/2024 | Parshionikar | G06F 3/013 |
| 2024/0304012 | A1 * | 9/2024 | Thomas | G06V 30/1452 |
| 2024/0402801 | A1 * | 12/2024 | Shutzberg | G06F 3/011 |

OTHER PUBLICATIONS

Caceres, et al., "Evaluation of an Eye-Pointer Interaction Device for Human-Computer Interaction", https://www.researchgate.net/publication/323764084_Evaluation_of_an_eye-pointer_interaction_device_for_human-computer_interaction, Mar. 2018, 29 pages.

Chen, et al., "Identifying Fixation and Saccades in Virtual Reality", Article; arXiv:2205.04121v1, May 9, 2022, 27 pages.

Fuhl, et al., "The Gaze and Mouse Signal as Additional Source for User Fingerprints in Browser Applications", arXiv:2101:03793v3, Mar. 10, 2023, 8 pages.

Karthik, et al., "A Custom Implementation of the Velocity Threshold Algorithm for Fixation Identification", Second International Conference on Smart Systems and Inventive Technology (ICSSIT 2019); IEEE Xplor Part No. CFP19P17-ART; ISBN:978-1-7281-2119-2, Feb. 10, 2020, pp. 488-492.

Pfeuffer, et al., "Gaze + Pinch Interaction in Virtual Reality", 2017 Association for Computing Machinery, Oct. 16-17, 2017, 11 pages.

Spittle, et al., "A Review of Interaction Techniques for Immersive Environments", DMT Lab, School of Computing and Digital Technology, Birmingham City University, United Kingdom; https://ieeexplore.ieee.org/document/9773967, May 12, 2022, 19 pages.

* cited by examiner

146

Steps to selection

Selecting — 138

Fine Pointing — 136

Coarse Pointing — 134

144

Object to interact

Controller 152

Eye Gaze + Hand Pinch

Computer Mouse 156

144

Object to interact

Controller 152

Eye Gaze + Hand Pinch

Computer Mouse 156

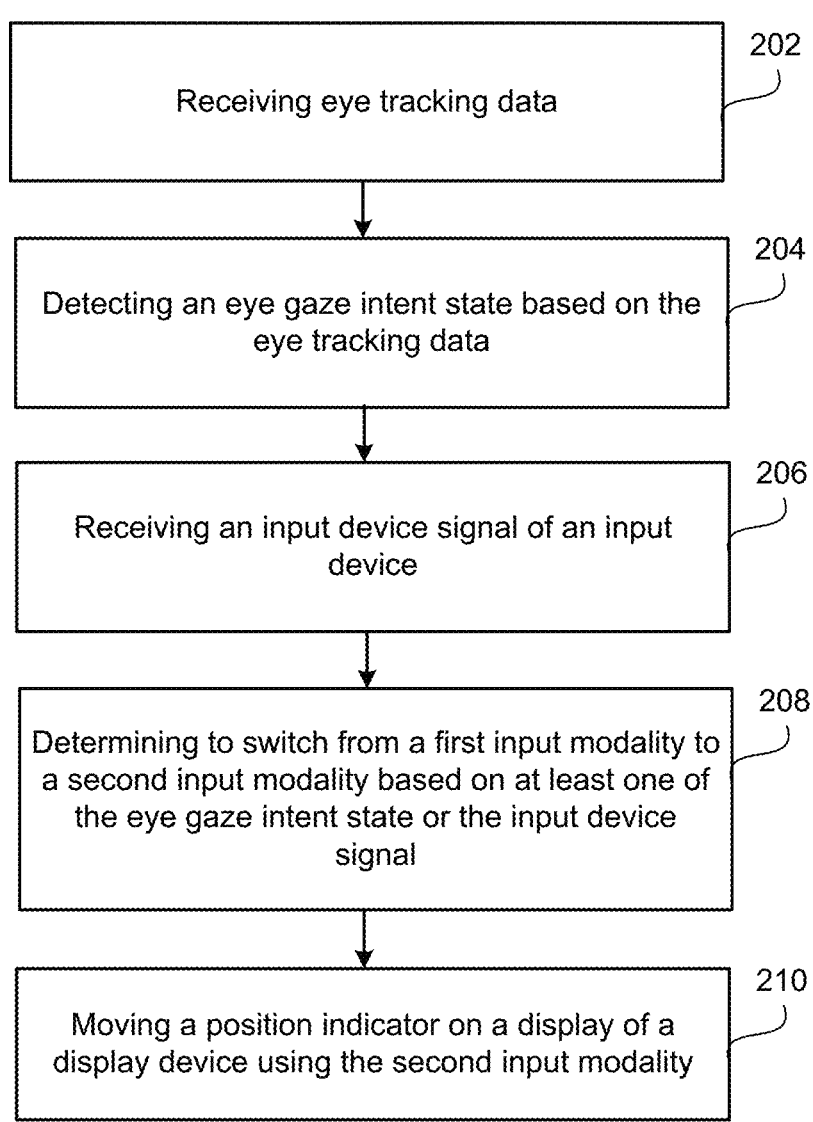

200

202
Receiving eye tracking data

204
Detecting an eye gaze intent state based on the eye tracking data

206
Receiving an input device signal of an input device

208
Determining to switch from a first input modality to a second input modality based on at least one of the eye gaze intent state or the input device signal 210
Moving a position indicator on a display of a display device using the second input modality

FIG. 2

R = radius of cursor

Cursor movement with step = r

T=1

T=0 r

700

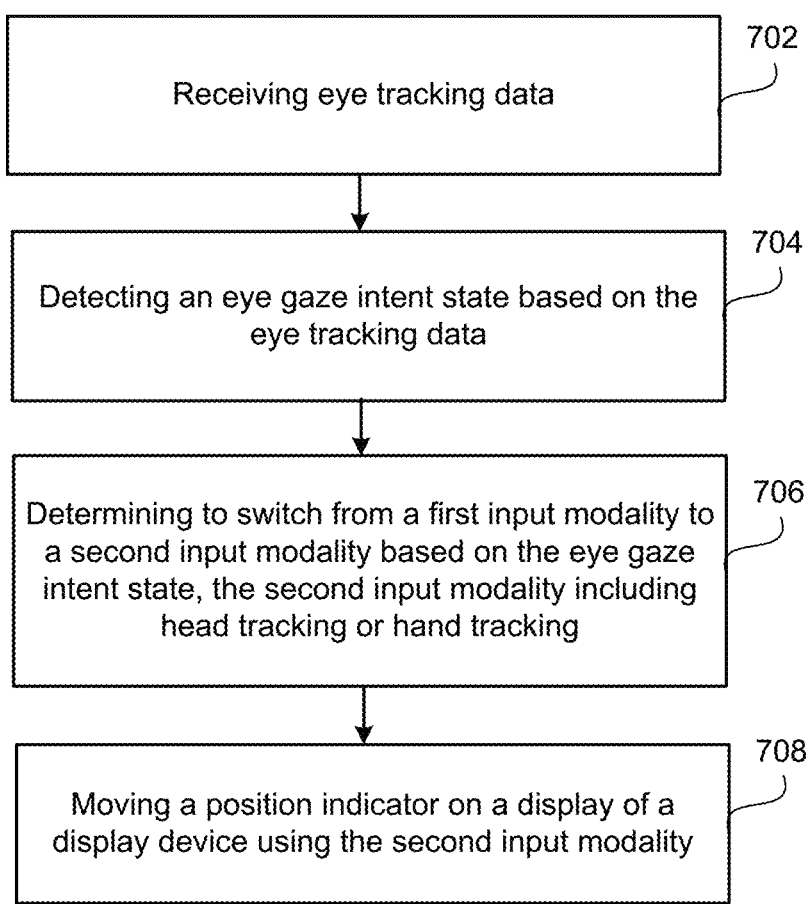

702

Receiving eye tracking data

704

Detecting an eye gaze intent state based on the eye tracking data

706

Determining to switch from a first input modality to a second input modality based on the eye gaze intent state, the second input modality including head tracking or hand tracking

708

Moving a position indicator on a display of a display device using the second input modality

FIG. 7

Legend
▭ Fixation area
⊏⊐ Undecided area
– – Threshold past which saccade

A=Previous sample, i.e. at t(-1) [assume in fixation]
B=New sample at Fixation state at t(0)
C=New sample at Undecided state at t(0)
D=New sample at Saccade state at t(0)

<u>1000</u>

1100

Transition Framework 123

Input Modalities 110

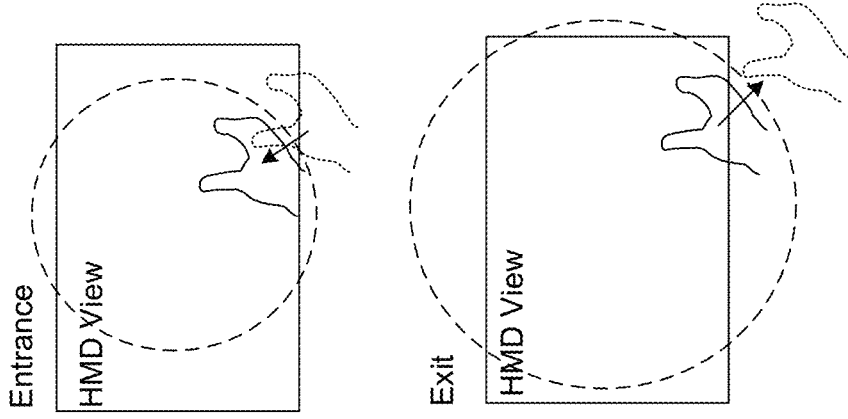
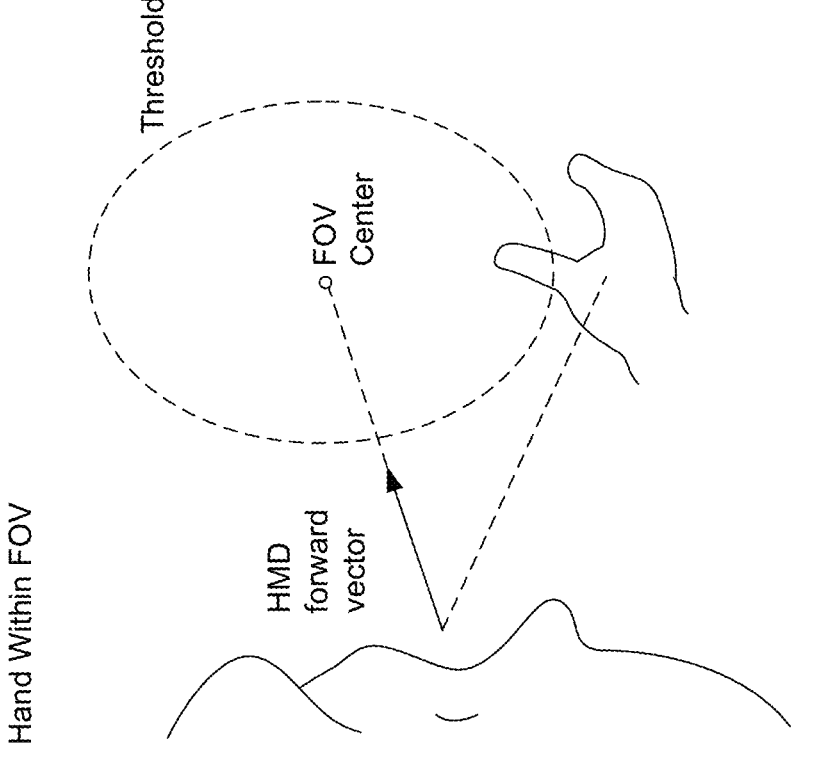
FIG. 14A

1600

1800

MANAGING INPUT MODALITIES ON AN EXTENDED REALITY DEVICE

CROSS-REFERENCE TO RELATED APPLICATIONS

This application claims priority to U.S. provisional application No. 63/625,218, filed Jan. 25, 2024, U.S. provisional application No. 63/625,222, filed Jan. 25, 2024, U.S. provisional application No. 63/625,231, filed Jan. 25, 2024, U.S. provisional application No. 63/625,234, filed Jan. 25, 2024, and U.S. provisional application No. 63/625,235, filed Jan. 25, 2024, the contents of each are incorporated herein in their entirety.

BACKGROUND

Interacting with an object on a display device may be controlled by an input modality such as an input device, a user's head or hand movement, or a user's eye gaze. A particular input modality may be more suitable or easier to use than other input modalities for a specific task. In some examples, an input device may be more precise for cursor control than a touch screen. In some examples, a display device may use eye gaze tracking to compute a gaze of the user's eye(s), which may be used to position a position indicator. Some conventional approaches use a single input modality for interacting with an object on the display device. Some eye tracking based pointer interaction systems have a stability issue where the user may be looking at a single point, but due to their involuntary eye motion, the involuntary eye motion may cause the pointer to move, leading to jitter.

SUMMARY

A display device may transition (e.g., seamless switch) between one input modality (e.g., eye gaze tracking) to another input modality (e.g., an input device) (or vice versa) to perform a computer task (e.g., a single computer task) such as moving a position indicator to interact with a particular object. In some examples, the display device determines an eye gaze intent state from a plurality of eye gaze intent states based on eye tracking data and determines to transition from a first input modality to a second input modality based on at least one of the eye gaze intent states and an input device signal from an input device. The display device may move a position indicator on the display using the second input modality.

The display device may transition (e.g., seamless switch) between one input modality (e.g., eye gaze tracking) to another input modality (e.g., head pointer or hand pointer) (or vice versa) to perform a computer task (e.g., a single computer task) such as moving a position indicator to interact with a particular object.

The display device may execute an eye state algorithm (e.g., an averaging algorithm) for eye tracking to compute user intent signals relating to a fixation state, a saccade state, and an undecided state from eye tracking data of an eye gaze tracker. In some examples, the eye state algorithm may compute an undecided state when new eye-tracking samples are not classified as the saccade state or the fixation state. In some examples, the eye state algorithm is a combination of a first algorithm (e.g., a velocity-threshold identification (I-VT) algorithm) that can identify one or more saccades, and a second algorithm (e.g., dispersion-threshold identification (I-DT) algorithm). In some examples, the eye state algorithm may classify one or more samples as an undecided state when the samples achieve a dispersion threshold or window. By classifying eye movements as a fixation state, a saccade state, and/or an undecided state, the eye gaze tracker may provide one or more technical advantages of increasing the accuracy of representing user intent, which can increase the performance of an interaction system that uses eye gaze intent states as inputs. In some examples, the eye state algorithm may provide one or more technical advantages of generating a stable ray for eye gaze trackers, which may also provide pointing information (and, in some examples, gesture and other intent information on a frame-by-frame basis.

The disclosure relates to a transition framework for enabling transitions between input modalities to perform a computer task (e.g., a single computer task) such as moving a position indicator to interact with a particular object. For example, a display device may transition between multiple input modalities for performing a computer task. The transition framework may include transition criteria between the various input modalities supported by a display device. The transition framework can be referred to as a transition model.

This disclosure relates to a display device that guides visual feedback (e.g., via a visual position indicator) to detect user intent and to direct the user's eye to the location of selection. For example, the display device may use multiple input modalities to identify and select an object (e.g., eye-gaze to identify an object, and a hand gesture (e.g., a pinch motion) to select the object) in which a position indicator (e.g., a gaze spotlight indicator) may aid the user in the selection. For example, the display device may use one or more intent signals from eye gaze tracking (e.g., fixation, other signals) and a hand gesture (e.g., a pinch motion, or a partial pinch motion) to identify when the user is planning to select a different input modality. Also, the display device may display visual user feedback in the form of a position indicator (which may change its size and/or display characteristics) to guide the user's eye, and, in some examples, may transform the visual user feedback to a cursor to provide additional stabilization. In some examples, the hand may operate as a cursor creator (e.g., a dual cursor creator), where the position indicator (e.g., the gaze spotlight indicator) changes into a cursor when the user provides an intent to pinch (e.g., makes a partial-pinch gesture).

In some aspects, the techniques described herein relate to a method including: receiving eye tracking data; detecting an eye gaze intent state based on the eye tracking data; receiving an input device signal of an input device; determining to switch from a first input modality to a second input modality based on at least one of the eye gaze intent state or the input device signal; and moving a position indicator on a display of a display device using the second input modality.

In some aspects, the techniques described herein relate to a method including: receiving eye tracking data; detecting an eye gaze intent state based on the eye tracking data; determining to switch from a first input modality to a second input modality based on the eye gaze intent state, the second input modality including head tracking or hand tracking; and moving a position indicator on a display of a display device using the second input modality.

In some aspects, the techniques described herein relate to a method including: receiving eye tracking data from an eye gaze tracker; detecting an eye gaze intent state based on the eye tracking data, the eye gaze intent state being a fixation state, an undecided state, or a saccade state; and transitioning between a first input modality and a second input modality based on the eye gaze intent state.

In some aspects, the techniques described herein relate to a method including: moving a position indicator on a display of a display device using a first input modality; transitioning from the first input modality to a second input modality based on a transition model; moving the position indicator on the display using the second input modality; and selecting an object that is displayed on the display using the first input modality, the second input modality, or a third input modality.

In some aspects, the techniques described herein relate to a method including: moving a position indicator on a display device using eye gaze tracking; detecting an eye gaze intent state based on eye tracking data; displaying a position indicator based on the eye gaze intent state; detecting a hand gesture; and selecting an object that is displayed on the display device based on the hand gesture.

The details of one or more implementations are set forth in the accompanying drawings and the description below. Other features will be apparent from the description and drawings, and from the claims.

BRIEF DESCRIPTION OF THE DRAWINGS

FIG. 2 illustrates a flowchart depicting example operations of transitioning between two or more input modalities for interacting with an object that is displayed on a display device according to an aspect.

FIG. 7 illustrates a flowchart depicting example operations of transitioning between multiple input modalities for interacting with an object on a display device.

FIGS. 14A to 14C illustrate examples of heuristics for different input modalities according to an aspect.

DETAILED DESCRIPTION

Figure 1A:
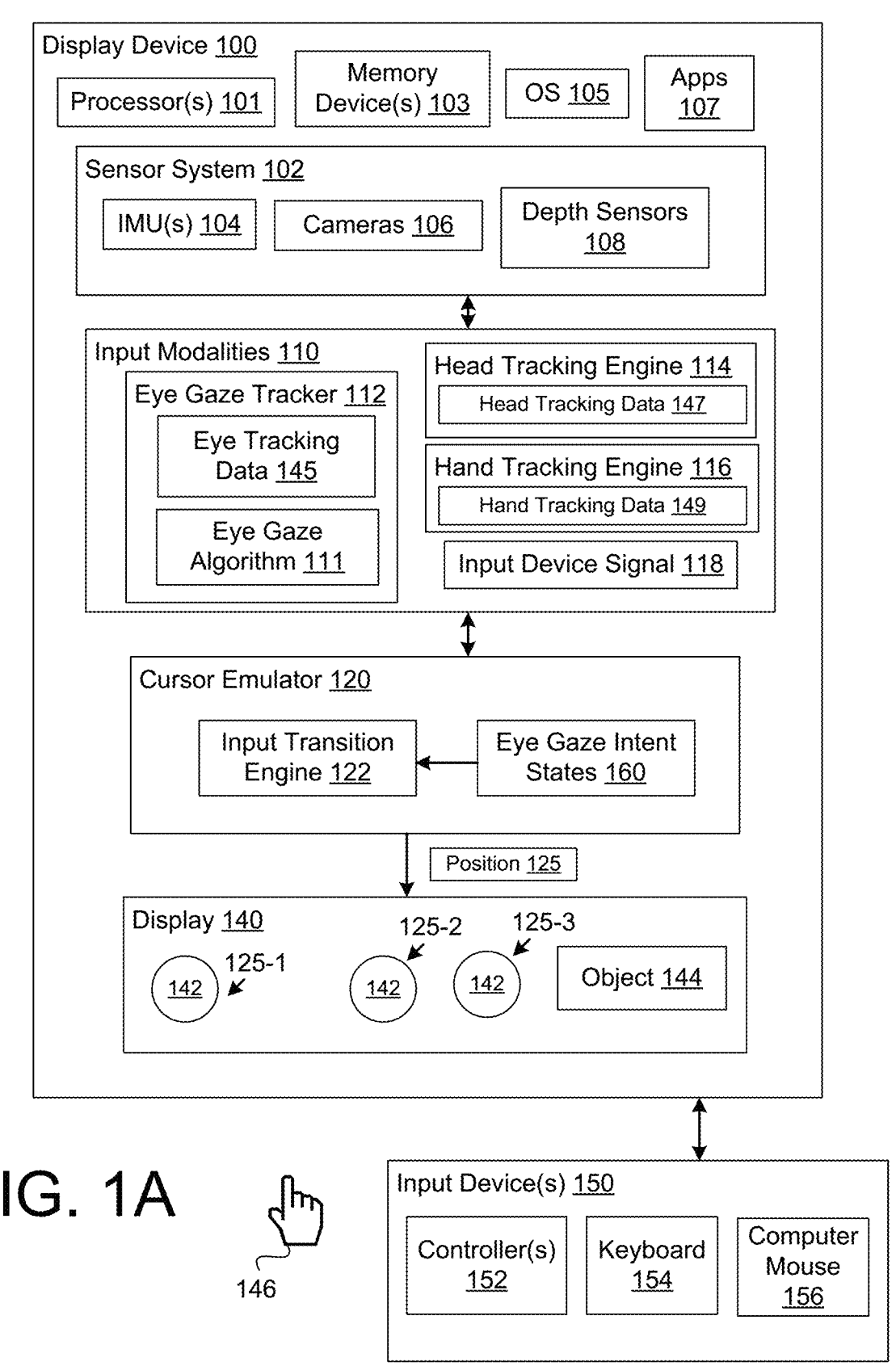
FIG. 1A illustrates a display device for transitioning between two or more input modalities for performing a computer task according to an aspect.

This disclosure relates to a display device configured to control a position of a position indicator (e.g., a cursor on a display) using two or more input modalities (e.g., eye-gaze tracking, head or hand movement, controller, an input device, etc.) for interacting with objects displayed on a display device. In some examples, the display device is an extended reality (XR) device, which may be an AR device or a VR device. In some examples, the display device is a head-mounted display device. In some examples, the display device is a user device such as a laptop, desktop, smartphone, or other computing device. The display device may transition (e.g., seamless switch) between one input modality (e.g., eye gaze tracking) to another input modality (e.g., an input device) (or vice versa) to perform a computer task (e.g., a single computer task) such as moving the position indicator on the display to select a particular object on the display. The techniques discussed herein may overcome one or more technical problems associated with transitioning between multiple input modalities.

For example, in some conventional approaches, a transition from one input modality to another input modality may return the position indicator to an original state (e.g., an initial state). In some examples, a conventional system may use a single input modality to interact with objects on a display. Some conventional systems provide input modalities that are mutually exclusive and/or cascaded in a specific order. However, the techniques discussed herein may solve one or more technical problems of syncing various different inputs and user intentions such that disruptions are minimized or eliminated while the user is operating the interaction system. The display device may augment an eye-gaze based system with one or more input devices, and, in some examples other input signals (e.g., head movement, hand movement, voice commands, hand gestures, etc.).

The display device discussed herein provides one or more technical features that can use multiple input modalities, including transitioning between multiple input modalities, to perform a computer task (e.g., a single computer task) such as moving a position indicator to select a particular object. In some examples, the display device may not specify a particular order of using the input modalities. For example, a user may use an input device to move the position indicator and then move the position indicator based on the user's eye gaze, or the user may move the position indicator based on the user's eye gaze and then use the input device to continue to move the position indicator. In some examples, the display device may switch between multiple input modalities at multiple times during a particular computer task (e.g., eye-gaze to input device, then back to eye-gaze, then head tracking, then back to input device, then hand gesture, etc.).

In other words, two or more input modalities can be used together for selection. In some examples, the lower accuracy input (e.g., eye tracking) may be refined by a higher-accuracy input (e.g., computer mouse) (or vice versa). The techniques discussed herein may allow a user to use the input method that is most convenient for them in a given situation by allowing the user to use eye tracking or an input device interchangeably, thereby allowing the user to switch between the two input methods as needed. For example, the user may begin by using the eye tracking to scan (e.g., rapidly scan) the display (e.g., a screen) for a target (e.g., an object), and then switch to the input device (e.g., the computer mouse) to precisely select the target. This flexibility may provide more control over user interactions while enabling more natural interactions.

In some examples, the display device is configured to control a position of a position indicator using two or more input modalities (e.g., switching between head or hand movement and eye gaze) for interacting with objects displayed on a display device. Some eye tracking components that track eye gaze using image data may have one or more technical problems related to relatively low accuracy, latency, and/or calibration for tracking eye gaze around the edge portions of a display. According to the techniques discussed herein, the display device may use two or more input modalities for interacting with an object, including transitioning between an input based on eye gaze and an input based on head or hand movement during the course of interacting with an object, to overcome the one or more technical problems. For example, the display device may include a framework (e.g., a transition model) to transition between hand, head, and eye (and other input modalities) that enables a seamless cascade of inputs for fast coarse pointing with eye tracking, fine selection with the head, and/or comfortable confirmation (as well as mode switching) with hand gestures.

In some examples, the display device discussed herein may integrate eye gaze pointing with one or more other signals (e.g., head or hand signals or other signals) to reduce or eliminate eye gaze inaccuracy and may provide a relatively smooth eye gaze interaction. In some examples, the display device uses head and eye gaze information to reduce or correct gaze inaccuracies, which may include providing a "nudge" behavior when the display device determines user intent to use a higher-precision input modality such as a head pointer or a hand pointer. In some examples, the display device may determine a transition point (or time window) for switching the input between eye gaze and head or hand movement, which may be based on one or more multimodal selection indicators. The display device may provide visual feedback by using the appearance of a cursor (sometimes referred to as a pointer) to indicate to the user that they are in a fine-pointing mode.

In some examples, a transition to a head or hand pointing input mechanism may involve one or more technical problems in which natural inputs (e.g., head pointing, hand pointing, etc.) may be more difficult to use for fine-point transitions because the system may isolate when the user intends to use the head or hand pointing for fine-pointing. To overcome these technical problem(s), the display device discussed herein may use multimodal intent heuristics. In some examples, the display device uses a partial pinch gesture (e.g., a half-pinch gesture) for a selection heuristic and one or more virtual cues (e.g., changing display appearance and/or size of a position indicator) may be provided to inform the user that the input has moved to a cascaded higher precision mode. In some examples, the display device uses eye gaze for coarse pointing, and head or hand pointing for fine pointing. The techniques discussed herein may solve one or more technical problems of syncing various different inputs and user intentions such that disruptions are minimized or eliminated while the user is operating the interaction system. The display device may augment an eye-gaze based system with head or hand-based systems, and, in some examples, may use other input modalities such as input device signals.

The display device discussed herein provides one or more technical features that can use two or more input modalities, including switching between input modalities to perform a single computer task such as moving a position indicator to select a particular object. In some examples, the display device may not specify a particular order of using the input modalities. For example, a user may first use eye-tracking (or head or hand tracking) to move the position indicator and then move the position indicator using head or hand tracking (or eye-tracking). In some examples, the display device may switch between two or more input modalities at one, two, or more than two times during a particular computer task.

In other words, two or more input modalities can be used together for selection. In some examples, the lower accuracy input (e.g., eye tracking) can be refined by a higher-accuracy input (e.g., hand or head tracking) (or vice versa). The techniques discussed herein may allow a user to use the input method that is most convenient for them in a given situation by allowing the user to use eye tracking, hand tracking, head tracking, and/or an input device interchangeably, thereby allowing the user to switch between two or more input methods. For example, the user might begin by using the eye tracking to scan (e.g., rapidly scan) the display (e.g., a screen) for a target (e.g., an object), and then switch to hand or head tracking to precisely select the target. This flexibility may provide more control over interactions while enabling more natural interactions.

In some examples, the display device includes an eye gaze tracker. The eye gaze tracker is configured to compute one or more user intent signals relating to a fixation state, a saccade state, and an undecided state. In some examples, the eye gaze tracker may detect an undecided state when new eye-tracking samples are not classified as the saccade state or the fixation state. In some examples, the eye gaze tracker may execute an eye state algorithm. The eye state algorithm may be a combination of a first algorithm (e.g., a velocity-threshold identification (I-VT) algorithm) that can identify one or more saccades, and a second algorithm (e.g., dispersion-threshold identification (I-DT) algorithm). In some examples, the eye state algorithm is modified to classify one or more samples as an undecided state when the samples achieve a dispersion threshold or window. By classifying eye movements as a fixation state, a saccade state, and/or an undecided state, the eye gaze tracker may provide one or more technical advantages of increasing the accuracy of representing user intent, which can increase the performance of an interaction system that uses eye gaze intent states as inputs. In some examples, the eye state algorithm may provide one or more technical advantages of generating a stable ray for eye gaze trackers, which may also provide pointing information (and, in some examples, gesture and other intent information on a frame-by-frame basis.

Eyes usually look around in fixations and saccades. Fixations are when they are looking at a region with focus and barely moving around. Saccades are when they make sudden jumps, often between fixations. While the user usually jumps between these states, there can be a fuzzy state in between them. In some examples, the eye state algorithm may determine an eye gaze intent state as the undecided state when the eye movement corresponds to a state between the fixation state and the saccade state. In some examples, the undecided state is an intermediate state.

The eye state algorithm uses a dispersion threshold to classify one or more samples as the fixation state, and the eye state algorithm classifies saccades after achieving a velocity threshold. In between the fixation state and the saccade state, the eye state algorithm may classify new eye tracking samples as an undecided state. In the undecided state, if the new sample lies within the dispersion threshold, the eye state algorithm may add samples to a window until a threshold is achieved (e.g., greater than the duration threshold in I-DT) to classify the window as a fixation. If not, the eye state algorithm may manage the samples in the window while searching for possible new fixations. The eye state algorithm includes a previous fixation cache, which can identify whether the user is looking directly at a previous fixation and use the previous window from the previous fixation to re-create fixation stability.

In some examples, the eye state algorithm combines the fixation identification from I-DT with saccade identification from I-VT. In some examples, the eye state algorithm provides a technical advantage of classifying movements that are not determined to be fixating or saccading, which can more accurately represent user intent. In cases where their eyes relax (e.g., especially after long periods of stress), the undecided state may represent those movements. In some examples, the state is considered undecided because, in some examples, the user has chosen to look slightly away from the previous fixation and might choose to look away (e.g., saccade) or fixate at the new position next. Combined with fixation caches, the undecided state may provide one or more technical benefits of allowing for smooth interpolation amongst nearby fixations points, thereby providing robustness to the user intent detection system.

In response to obtaining user intent signals relating to fixations, saccades, and/or undecided states, the display device may use the user intent signals in an interaction system. For example, the display device may execute an eye gaze based human computer interaction method which detects the user's intentions through their gaze and is able to provide additional stability to the eye-gaze input modality. In some examples, the display device may integrate eye tracking with other input modalities to create a multi-modal input system.

In some examples, the generation of user intent signals relating to fixation, saccades and/or undecided states may enable the controlling of a position of a position indicator using multiple input modalities (e.g., switching between eye gaze and other input modalities such as head movement, hand movement, input device movement, etc.) for interacting with objects displayed on a display of a display device. Some eye tracking components that track eye gaze using image data may have one or more technical problems related to relatively low accuracy, latency, and/or calibration for tracking eye gaze around the edge portions of a display of a display device. According to the techniques discussed herein, the display device may use multiple input modalities for interacting with an object, including switching between an input based on eye gaze and other input modalities based on the eye gaze intent states during the course of interacting with an object, to overcome the one or more technical problems.

In some examples, the use of the eye gaze intent states may enable the display device to integrate eye gaze pointing with one or more other signals (e.g., head or hand signals) to reduce or eliminate eye gaze inaccuracy and may provide a relatively smooth eye gaze interaction. In some examples, the display device uses head and eye gaze information to reduce or correct gaze inaccuracies, which may include providing a "nudge" behavior when the display device determines user intent to use a higher-precision input modality such as a head pointer or a hand pointer. In some examples, the display device may use the eye gaze event states to determine a transition point (or time window) for switching the input between eye gaze and head or hand movement.

The display device may switch (e.g., seamless switch) between one input modality (e.g., eye gaze tracking) to another input modality (e.g., head orientation tracking or hand pointing (e.g., hand-ray casting), input device, voice commands, etc.) (or vice versa) to perform a computer task (e.g., a single computer task) such as moving a position indicator (e.g., a cursor, pointer, etc.) to select a particular object. The techniques discussed herein overcome one or more technical problems associated with transitioning between multiple input modalities. For example, in some conventional approaches, a transition from one input modality to another input modality may return the position indicator to an original state (e.g., an initial state) rather than a smooth handover from a previous position. In some examples, a conventional system may use a single input modality to interact with objects in an AR or VR environment. Some conventional systems provide input modalities that are mutually exclusive and/or cascaded in a specific order. However, the techniques discussed herein may solve one or more technical problems of syncing various different inputs and user intentions such that disruptions are minimized or eliminated while the user is operating the interaction system.

In some examples, the display device is configured with a transition framework (e.g., a transition model) for enabling transitions between two or more input modalities to perform a computer task (e.g., a single computer task) such as moving a position indicator to interact with a particular object. For example, the display device may transition between input modalities for performing a computer task, and the transition framework may include transition criteria for transition between the various input modalities supported by a display device. For example, the display device may control a position indicator using two or more input modalities (e.g., switching between head movement, hand movement, eye gaze, one or more input devices, gestures, etc.) for interacting with objects displayed on a display of a display device. Some eye tracking components that track eye gaze using image data may have one or more technical problems related to relatively low accuracy, latency, and/or calibration for tracking eye gaze around the edge portions of a display of a display device. According to the techniques discussed herein, the display device may use multiple input modalities for interacting with an object, including transitioning between other input modalities, to overcome the one or more technical problems.

Some conventional systems provide input modalities that are mutually exclusive and/or cascaded in a specific order. However, the techniques discussed herein may solve one or more technical problems of syncing various different inputs and user intentions such that disruptions are minimized or eliminated while the user is operating the interaction system. The display device discussed herein provides one or more technical features that can use two or more input modalities, including switching between multiple modalities to perform a single computer task such as moving a position indicator to select a particular object. In other words, two or more input modalities can be used together for selection. The techniques discussed herein may allow a user to use the input method that is most convenient for them in a given situation by allowing the user to use eye tracking, hand tracking, head tracking, and/or an input device interchangeably, thereby allowing the user to switch between two or more input methods. For example, the user might begin by using the eye tracking to scan (e.g., rapidly scan) the display (e.g., a screen) for a target (e.g., an object), and then switch to another input modality, and then switch to yet another input modality to select the target. This flexibility may provide one or more technical advantages related to reducing or eliminating inaccuracies and/or reducing latency, as well as providing increased control over user interactions while enabling more natural interactions.

In some examples, this disclosure relates to a display device that guides visual feedback (e.g., via a visual position indicator) to detect user intent and to direct the user's eye to the location of selection. In some examples, the display device is an extended reality (XR) device (e.g., an AR device or a VR device). The display device may use two or more input modalities to identify and select an object (e.g., eye-gaze to identify an object, and a hand gesture (e.g., a pinch motion) to select the object) in which a position indicator (e.g., a gaze spotlight indicator) may aid the user in the selection. For example, the display device may use signals (e.g., intent signals) from eye gaze tracking (e.g., fixation) and a hand gesture (e.g., a pinch motion) to identify when the user is planning to select a different input modality. The display device may display visual user feedback in the form of a position indicator (which may change its size and/or display characteristics) to guide the user's eye, and, in some examples, may switch to a cursor to provide additional stabilization. The hand may operate as a cursor creator (e.g., a dual cursor creator), where the position indicator (e.g., the gaze spotlight indicator) changes into a cursor when the user provides an intent to pinch.

In some examples, the display device may determine an eye gaze intent state based on eye tracking data, where the eye gaze intent state is a saccade state, an undecided state, or a fixation state. The size and/or characteristics of the position indicator may change based on the eye gaze intent state being the saccade state, the undecided state, or the fixation state. In some examples, in response to the eye gaze intent state being the saccade state, the display device may display the position indicator as a UI element (e.g., a circle, square, or other shape) with a first size (e.g., a larger size).

In some examples, in response to the eye gaze intent state being the undecided state, the display device may display the position indicator as a UI element (e.g., a circle or other shape) with a second size (e.g., a smaller size) (e.g., where the second size is smaller than the first size) with one or more graphics (e.g., one or more arrows that point to the center of the UI element). In some examples, display characteristic(s) of the UI element (e.g., the color, tint, or shading) may change when the eye gaze intent state transitions from the saccade state to the undecided state. As the eye gaze intent state becomes closer to the fixation state, the size of the UI element may continue to become smaller and/or the display characteristics may continue to change. In response to the eye gaze intent state being the fixation state, the display device may display the position indicator as a UI element with a third size (e.g., an even smaller size) (e.g., where the third size is smaller than the second size) and may adjust the display characteristic(s) to be different from the display characteristic(s) of the UI element when the UI element is displayed in the undecided state or the saccade state. The position indicator (and its changing size and appearance) may help avoid the Midas touch because the user may freely look around without worrying about chasing the cursor. In some examples, when the device detects an intent to fixate, the position indicator becomes smaller, thereby providing visual feedback on the location where their eye gaze is pointing.

FIGS. 1A to 1F illustrate a display device 100 with an interaction system for transitioning between two or more input modalities 110 for interacting with an object 144 on a display 140, including transitioning from one input modality 110 to another input modality 110 in a seamless and intuitive manner. In some examples, the display device 100 may move a position indicator 142 (e.g., a cursor) using two or more input modalities 110 to interact (e.g., select, move, open, or close, etc.) with an object 144 displayed on a display 140 of the display device 100.

The display device 100 may enable multi-modal interactions (e.g., different types of interactions) inside a computing environment with a sensor system 102 having a variety of different accuracies and speeds. The display device 100 may provide a transition (e.g., seamless transition) between input modalities 110 by interpreting user intent signals and integrating input transitions that aligns with the user's natural process of interacting with objects 144. The display device 100 may overcome one or more technical problems of syncing various different inputs and user intentions such that disruptions are minimized or eliminated while the user is interacting with one or more objects 144. In some examples, the display device 100 may enable (e.g., seamlessly enable) gaze and input device interactions, and, in some examples, other types of input modalities 110 such as voice, head movement, or hand movement (e.g., hand ray casting), or hand gestures. With such a diverse collection of input modalities 110, the display device 100 may orchestrate transitions between input modalities 110 while making the interaction model intuitive and reliable.

The display device 100 may be any type of user device. In some examples, the display device 100 is an extended reality (XR) device. In some examples, the display device 100 is an augmented reality (AR) device. In some examples, the display device 100 is a virtual reality (VR) device. In some examples, the display device 100 is a wearable device such as a head-mounted display device or other type of AR or VR device. The display device 100 may include an optical head-mounted display (OHMD) device, a transparent heads-up display (HUD) device, an AR device, or other devices such as goggles or headsets having sensors, display, and computing capabilities. The display device 100 may also be a laptop, desktop, smartphone, television device, or other type of user device.

The display device 100 includes a sensor system 102. The sensor system 102 may include an inertial measurement unit (IMU) 104 configured to generate head movement data about an acceleration and/or velocity of the display device 100. The IMU 104 includes an accelerometer configured to measure an acceleration of the display device 100 and generate accelerometer data. The accelerometer data includes information about the acceleration of the display device 100, e.g., acceleration in an x-axis, a y-axis, and a z-axis. The IMU 104 includes a gyroscope configured to measure a velocity of the display device 100 and generate gyroscope data. The gyroscope data includes information about the velocity of the display device 100, e.g., information about the velocity in the x-axis, the y-axis, and the z-axis.

The sensor system 102 includes one or more cameras 106 configured to detect image data (e.g., image frames) in the camera's field of view. In some examples, the camera(s) 106 may include one or more imaging sensors. In some examples, the camera(s) 106 includes a stereo pair of image sensors. In some examples, the camera(s) 106 include a visual see through (VST) camera system that allows the user to see the real world through the camera's lens while also seeing digital information (e.g., virtual content, e.g., object 144) overlaid on the real world. In some examples, the camera(s) 106 may be referred to as an AR camera, a mixed reality camera, a head-mounted display camera, a transparent display camera, or a combiner camera. The camera's field of view may be the angular extent of the scene that is captured by the camera(s) 106. The field of view may be measured in degrees and may be specified as a horizontal field of view and/or a vertical field of view. The sensor system 102 may include one or more depth sensors 108 configured to generate depth information or a depth map about objects in the scene. In some examples, the depth sensor(s) 108 include time-of-flight (ToF) sensors. In some examples, the sensor system 102 may include other sensors such as electrooculography (e.g., measures the electrical potential changes around the eyes) and/or electromagnetic coils (e.g., creating a magnetic field that interacts with the eye's conductivity, recording movements).

The display device 100 may include two or more input modalities 110 that are used by a user for interacting with an object 144. An object 144 may be computer-generated data such a user control, a button, menu item, selectable computer element (e.g., a UI element), an application element (e.g., app icon), or generally any type of computer element that can be displayed on a display 140 and interacted with (e.g., selected, grabbed, moved, etc.) using one or more input modalities 110. An input modality 110 may be a specific method or channel through which a user provides input to move a position indicator 142 and/or control an object 144 on the display 140. The input modalities 110 may include hand pointing (e.g., hand-based ray casting that generates a ray from the user's hand 146), hand gestures (e.g., pinching, grabbing, or switching, etc.), input device(s) 150 that are connected to the display device 100, eye pointing based on the user's eye gaze (e.g., eye tracking of the user's eyes), head pointing (e.g., head tracking), and/or voice commands. In some examples, the input modalities 110 may include brain-computer interfaces (BCIs), facial body expressions, body movements, and/or other sensory-based input systems.

In some examples, the display device 100 includes an eye gaze tracker 112 configured to detect a user's eye gaze. For example, the eye gaze tracker 112 may a person's gaze using information from the sensor system 102 (e.g., images of the eyes), which may include tracking pupil movements and corneal reflections. An eye gaze tracker 112 may be a device that measures and analyzes the direction of a person's gaze. In some examples, the eye gaze tracker 112 may generate eye tracking data 145. In some examples, the eye tracking data 145 may include an eye gaze ray (e.g., invisible, or visible), which is a virtual ray that aligns with the user's eye gaze. In some examples, the eye tracking data 145 includes a fixation location that identifies a location on the display 140 that aligns with the user's eye gaze. In some examples, the fixation location is the eye's gaze point, which is a location on the display 140 that corresponds to the user's eye gaze. In some examples, when the eye gaze tracker 112 is used as the input modality 110, the position indicator 142 may be referred to as an eye pointer, where movement of the user's gaze moves the eye pointer (e.g., an instance of the position indicator 142).

The display device 100 may include a head tracking engine 114 configured to generate head tracking data 147 about an orientation, position, and/or movement of the user's head. In some examples, the head tracking data 147 include an angular distance between a previous head position and a current head position. For example, the head tracking engine 114 may compute angular distance between a previous orientation of the display device 100 and a current orientation of the display device 100 using information from the IMU 104 (e.g., accelerometer data, gyroscope data, etc.). In some examples, the previous orientation of the display device 100 is the orientation of the display device 100 in a previous image frame, and the current orientation of the display device 100 is the orientation of the head in a current image frame. The angular distance is the distance (e.g., angular delta) expressed in angles from the previous orientation to the current orientation. The angular distance includes information about the amount in degrees in the x-axis, and the information about the amount in degrees in the y-axis, and, in some examples, the information about the amount in degrees in the z-axis. In some examples, when the head tracking engine 114 is used as the input modality 110, the position indicator 142 may be referred to as a head pointer, where the head pointer moves based on head movements.

The display device 100 may include a hand tracking engine 116 configured to generate hand tracking data 149 about the position, orientation, and/or movement of the user's hand(s) based on information from the sensor system 102. In some examples, when the hand tracking engine 116 is used as the input modality 110, the position indicator 142 may be referred to as a hand pointer, where the hand pointer moves based on hand movements. In some examples, the hand tracking engine 116 is configured to generate a hand-ray that is cast from the user's hand to a location on the display. In some examples, the hand tracking engine 116 is configured to detect one or more hand gestures, which may correspond to certain actions taken with respect to the object 144.

The display device 100 may receive one or more input device signals 118 from an input device 150 to move a position indicator 142 to interact with an object 144. An input device signal 118 may include the movement and/or the position (or orientation) of an input device 150. In some examples, the input device 150 includes one or more controllers 152. The controllers 152 may be one or more hand-held devices that are moved to move a position indicator 42 to interact with an object 144. In some examples, the input device signal 118 indicates the position, orientation, and/or movement of the controller 152 in 3D space. In some examples, the input device 150 includes a keyboard 154. In some examples, the keyboard 154 is a physical keyboard that is communicatively coupled to the display device 100. In some examples, the keyboard 154 is a virtual keyboard rendered by the display device 100. In some examples, the input device signal 118 may be directional signals to move a position indicator 142 on the display 140. In some examples, the input device 150 may be a computer mouse 156. In some examples, the computer mouse 156 is a physical device that is connected (e.g., wired, or wirelessly) to the display device 100. In some examples, the computer mouse 156 is a virtual computer mouse that is rendered by the display device 100. The input device signal 118 may indicate the amount of movement (e.g., in an x-direction, y-direction) of the computer mouse 156. In some examples, when an input device 150 is used as the input modality 110, the position indicator 142 may be referred to as a device pointer (or a mouse pointer, controller pointer, etc.).

The display device 100 includes a cursor emulator 120 configured to compute a location 125 of a position indicator 142 using information received via a particular input modality 110 such as eye tracking data 145 from the eye gaze tracker 112, head tracking data 147 (e.g., a head position or orientation (or movement)) from a head tracking engine 114, hand tracking data 149 (e.g., a hand position and/or orientation (or movement)) from a hand tracking engine 116, or an input device signal 118 from an input device 150.

In some examples, the position indicator 142 is a virtual marker such as a cursor, pointer, or other element that indicates a position on the display 140. In some examples, the position indicator 142 is referred to as a device cursor or a mouse cursor when the computer mouse 156 is used as an input modality 110. In some examples, the position indicator 142 is referred to as a controller cursor or pointer when a controller 152 is used as an input modality 110. In some examples, the position indicator 142 is referred to as an eye gaze cursor or an eye pointer when eye gaze is used as an input modality 110. In some examples, the position indicator 142 is referred to as a head gaze cursor or a head pointer when head tracking is used as an input modality 110. In some examples, the position indicator 142 is referred to as a hand pointer when hand tracking is used as an input modality 110.

In some examples, the position indicator 142 is visually displayed. In some examples, the position indicator 142 is displayed for one or more types of input modalities 110 and not displayed for one or more other types of input modalities 110. In some examples, the position indicator 142 is invisible. In some examples, the eye pointer is not visually displayed. In some examples, the device pointer (e.g., mouse cursor) is visually displayed. In some examples, the hand pointer or the head pointer is displayed. In some examples, the cursor emulator 120 is configured to move the position indicator 142 using two or more input modalities 110. In some examples, the cursor emulator 120 is configured to move the position indicator 142 and select an object 144 using two or more input modalities 110. In some examples, the cursor emulator 120 is configured to move the position indicator 142 and select an object 144 using three or more input modalities 110.

The cursor emulator 120 includes an input transition engine 122 configured to transition from one input modality 110 to another input modality 110. In some examples, the input transition engine 122 is configured to transition (e.g., one or more multiple times) from one input modality 110 to another input modality 110 during the course of selecting an object 144. For example, the input transition engine 122 may transition from a device pointer to an eye pointer when the input transition engine 122 determines that the user intends to use the eye gaze tracking as the input modality 110. The input transition engine 122 may transition from an eye pointer to a device pointer when the input transition engine 122 determines that the user intends to use the input device 150 as the input modality 110. User intent may be determined based on eye tracking data 145 from the eye gaze tracker 112, and, in some examples, the input device signals 118 from the input device 150.

In some examples, the input transition engine 122 may transition from an eye pointer to a head pointer (or a hand pointer) when the input transition engine 122 determines that the user intends to use the head pointer (or hand pointer) as the input modality 110. The input transition engine 122 may transition from a head pointer (or a hand pointer) to an eye pointer when the input transition engine 122 determines that the user intends to use the eye pointer as the input modality 110. In some examples, during the transition (e.g., handoff) from the head pointer to the eye pointer, a pinch gesture is active. As further discussed below, the input transition engine 122 may detect one or more eye gaze intent states 160 about the user's eye movement and use the eye gaze intent states 160 with one or more heuristics (e.g., heuristic filtering, heuristic spotlight, etc.) to determine the timing of when to transition from an eye pointer to a head pointer (or hand pointer) or vice versa.

The input transition engine 122 may determine which input modality 110 is used by the user (e.g., if the computer mouse 156 is moving, then the computer mouse 156 is the position indicator 142, if not, the eye gaze is the position indicator 142) and then switch to that input modality 110 while keeping the position indicator 142 at its location 125 without jumps between a transition to a different input modality 110. For example, a user may use eye gazing to move the position indicator 142 from a location 125-1 to a location 125-2 and then determine that the user has switched to using the input device 150 for moving the position indicator 142 from the location 125-2 to a location 125-3. In other words, the input transition engine 122 may determine user intent on which input modality 110 is being used by the user. In some examples, movement of the position indicator 142 from location 125-1 to location 125-2 is referred to as coarse pointing, and movement of the position indicator 142 from location 125-2 to location 125-3 is referred to as fine pointing. Then, the object 144 may be selected using an input modality 110 (which can be another input modality 110). In some examples, two or more input modalities are used for coarse pointing, fine pointing, and selection.

In some examples, the user intent may be determined by the input device signals 118 and/or the eye tracking data 145 from the eye gaze tracker 112. The input device signals 118 may represent signals that indicate that the user is operating the input device 150 (e.g., moving the computer mouse 156, pressing a button, scrolling the wheel, etc.). For eye tracking, the input transition engine 122 may use the eye tracking data 145 from the eye gaze tracker 112 to determine an eye gaze intent state 160 (e.g., a fixation state 160a, an undecided state 160b, and a saccade state 160c). In some examples, the user intent may be determined by the information from the head tracking engine 114, the hand tracking engine 116, and/or the eye gaze tracker 112, and, in some examples, the input device signals 118.

In some examples, a user may use eye-gaze tracking (or a hand or head tracking) to move the position indicator 142 from a location 125-1 to a location 125-2 and then determine a user intent to switch to hand or head tracking (or eye-gaze tracking) for moving the position indicator 142 from the location 125-2 to a location 125-3. In some examples, movement of the position indicator 142 from location 125-1 to location 125-2 is referred to as coarse pointing, and movement of the position indicator 142 from location 125-2 to location 125-3 is referred to as fine pointing. Then, the object 144 may be selected using an input modality 110 (which can be another input modality 110). In some examples, two or more input modalities are used for coarse pointing, fine pointing, and selection.

In some examples, the input transition engine 122 uses a transition framework 123 that defines transition criteria for transitioning between the input modalities 110.

In some examples, the display device 100 uses two or more input modalities 110 for interacting with an object 144 on a display 140, which includes eye-gaze to identify an object 144 and a hand gesture (e.g., a pinching motion) to select the object 144. For example, the display device 100 may use intent signals (e.g., eye tracking data 145) from eye gaze tracking (e.g., a fixation state 160a) and a hand gesture (e.g., a pinch motion) to identify when the user is planning to select and displays visual user feedback in the form of a position indicator 142 (which may change its size and/or display characteristics) to guide the user's eye. For example, when the input modality 110 switches to hand tracking, a different type of pointer or cursor (e.g., a gaze spotlight indicator 142a) may be displayed as the position indicator 142. A gaze spotlight indicator 142a may be a circular based UI element that changes size based on a position of a hand gesture. For example, the hand 146 may operate as a cursor or pointer creator (e.g., a dual cursor creator), where the gaze spotlight indicator 142a changes into a cursor when the user provides an intent to pinch.

In some examples, the display device 100 includes a mechanism to transition between eye and hand interactions (or between hand, head and eye interactions) that enables a cascade of inputs (e.g., a seamless cascade of inputs) that allow for fast coarse pointing with eye tracking, easy fine selection (if needed) with the head, and comfortable confirmation as well as mode switching controlled with hand gestures. In some examples, the display device 100 uses eye tracking (or a cascade of eye and head tracking) combined with one or more hand gestures to enable fine grained interaction. The display device 100 uses a system that can use both the eye gaze and hand pinch modality, or the eye gaze, head pointing, and/or hand pinch modality, thereby allowing the user to switch modalities during the course of a selection based on their own confidence.

In some examples, the hand 146 is used for mode switching and/or confirmation. In some examples, eye-tracking may be used for coarse pointing. For example, the eyes may travel large distances to a point (which may be a coarse point). In some examples, head movements may be beneficial for fine pointing. In some examples, large motions may be achieved naturalistically with the eyes (e.g., a faster modality). If the user is confident in the eye pointing target, they can use a hand gesture (e.g., a pinch) to confirm. If not, they can switch modes by using their hands to a partial pinch (e.g., a half-pinch gesture).

For example, the display device 100 may detect the partial pinch gesture at a portion (e.g., midway) during the pinch confirmation. In the partial pinch configuration, an explicit cursor transition informs the user that they are in fine-point mode, where they use head movements to fine tune the cursor selection. This process may provide more robust eye gaze and hand pinch based input systems. In some examples, in a pure gaze and pinch system, users might have a way to correct the coarse eye pointing, and, in some examples, users may feel frustrated if they are unable to select a target. By providing a path for users to correct inaccurate eye gaze targeting in the coarse region of their selection, the system adds a layer of robustness by introducing fine pointing to existing gaze and pinch systems that allows the user to perform the range of selection and confirmation tasks they would need in a pointer based input.

In some examples, the display device 100 may allow the user to switch modes using a partial pinch gesture simultaneously while eye gaze pointing. In some examples, the eye pointer converting to a head cursor may provide feedback that input modalities 110 have transitioned. Eye gaze pointing may be implicitly connected with head movement so when the cursor transitions, it follows the same general direction the eyes were following, since the eyes and head move in concert while being offset to each other. This continuation of the same path the eye pointer was tracing introduces a cascading effect, where users can operate as if the head pointing is an extension of the same eye movement and may not need to rely on their judgment to assess if the eye tracker itself worked well.

In some examples, the display device 100 may use eye gaze and hand pinch or eye gaze, head, and/or hand pinch. This duality may be enabled by a hand gesture (e.g., the partial pinch gesture). The partial pinch gesture may provide an intuitive way to cascade inputs during selection because the state occurs during the process of confirmation using hand pinch, e.g., the user will go through the partial pinch state to be able to confirm selection using hand pinch. This state may enable fast mode switching because it reduces or eliminates extra steps from the hand pinch gesture. Integrating into the existing paradigm also allows it to provide an easy learning curve and integrate with current hand tracking systems with minimal effort. Some camera based hand tracking systems in VR have one or more technical problems relating to instability in hand pinch readings, especially with large head movements. To overcome the one or more technical problems, the display device 100 uses a banding effect (e.g., see FIG. 4) to introduce robustness in the partial pinch gesture. The display device 100 may use time and pinch strength banding to ensure the user stays in the fine-tune state even if the device loses tracking for small time periods.

In some examples, when a pinch gesture is a partial pinch gesture, the display device 100 may detect a partial pinch gesture (which may sometimes be referred to as a Magic Pinch). The partial pinch gesture is incorporated into the existing pinch selection gesture. For example, the display device 100 may display a cursor at a portion (e.g., midway) through the selection process (e.g., during a point in the middle of the pinching gesture). In the case of a more complete pinching gesture, the cursor may not affect pointing and may act as a visual indicator of the location of selection. The partial pinch state may also direct the user's eyes towards the center of the selection, which may stabilize the eye fixation at the selection object.

The display device 100 may include some or all sensors of the sensor system 102 and/or some or all the input modalities 110. According to some examples, the display device 100 includes all components shown in FIG. 1A.

Figure 1B:
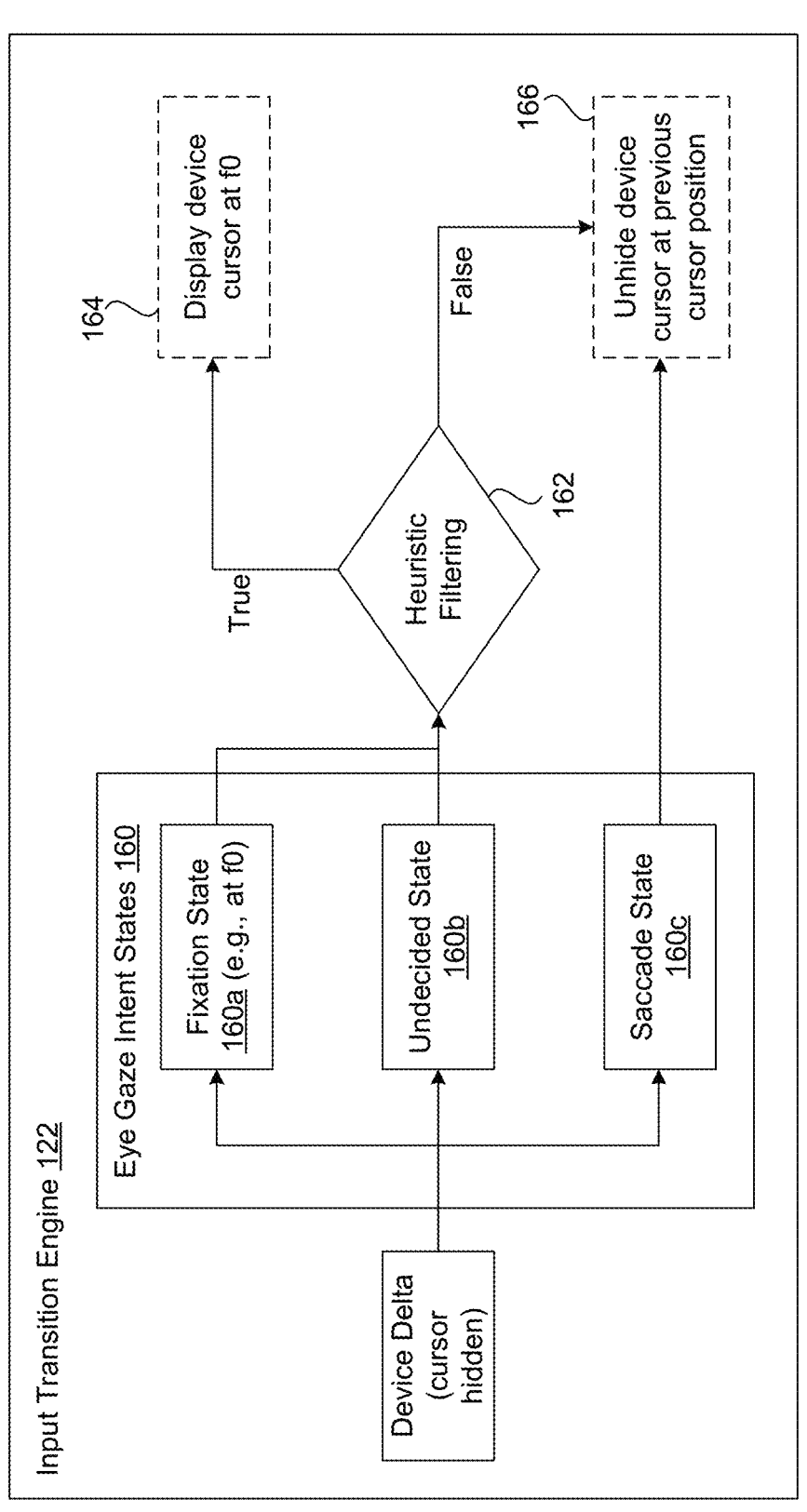
FIG. 1B illustrates an example of an input transition engine according to an aspect.

FIG. 1B illustrates an example of the input transition engine 122 for transitioning between eye gaze and an input device 150 for moving (and, in some examples, selecting) an object 144. For example, the input transition engine 122 may transition between an eye pointer and a device pointer. In some examples, when eye gazing is first used by the user, the position indicator 142 (also referred to as eye pointer) is not visible. The input transition engine 122 determines an eye gaze intent state 160 from a plurality of eye gaze intent states 160 based on the eye tracking data 145 from the eye gaze tracker 112. In some examples, the eye gaze intent states 160 represent different types of eye movements. In some examples, an eye gaze intent state 160 may represent a classification of eye movement. In some examples, the input transition engine 122 may switch between an eye gaze pointer and a device pointer based on an eye gaze intent state 160 and an input device signal 118.

The input transition engine 122 may determine one of a plurality of eye gaze intent states 160 based on the eye tracking data 145 from the eye gaze tracker 112. An eye gaze intent state may represent a type or classification of eye movement. The eye gaze intent states 160 may include a fixation state 160a, an undecided state 160b, and a saccade state 160c.

A fixation state 160a is a period of time when the user's eyes are relatively still, focused on a specific point in the user's visual field. Fixations typically last between 200 and 300 milliseconds but can be shorter or longer depending on the task and individual. A saccade state 160c may indicate a rapid, involuntary eye movement between points of fixation. Saccades may be very fast, typically lasting 20-200 milliseconds. In some examples, both eyes move together in the same direction during a saccade. Saccades are beneficial for visual perception, allowing a person to quickly scan their surroundings. The undecided state 160b is a classification of eye movement that is not a saccade or a fixation.

Saccades are ballistic eye movements that the eye makes to jump areas, and fixations are areas that the eye is focusing on. Undecided is an in-between state where the user is not in fixation or a saccade. In some examples, a saccade is a ballistic eye movement made suddenly which is above a certain velocity threshold. In some examples, a fixation is an eye movement which occurs only in the area they were already looking at (e.g., almost like just moving a little bit). A user usually quickly switches saccades and fixations depending on what the user is trying to do, and there is a window in between saccades and fixations, which may be referred to as an undecided state 160b. In some examples, the eye gaze tracker 112 may use an eye state algorithm 111 to detect a particular eye gaze intent state 160 using the eye tracking data 145.

The input transition engine 122 determines a fixation state 160a when the eye tracking data 145 indicates that the user has fixated on a particular location (e.g., location 125-2, f0).

In some examples, the input transition engine 122 determines an undecided state 160b when the eye tracking data 145 indicates that the user has not fixated on a particular location. In some examples, the undecided state 160b can be referred to as an intermediate state that is between the fixation state 160a and the saccade state 160c. In some examples, the input transition engine 122 may receive a device delta (e.g., a device delta) as an input device signal 118. In some examples, the device delta is the change of position from a previous position to a current position of the device cursor. In some examples, the input device signal 118 indicates whether or not there is movement of an input device 150, and, if so, indicates the amount of movement (e.g., the device delta).

In some examples, the input transition engine 122 determines to switch from eye gaze to an input device 150 for the position indicator 142 based on the input device signal 118 and the eye gaze intent state 160. In some examples, when the eye gaze intent state 160 is the fixation state 160 or the undecided state 160b, the input transition engine 122 may apply heuristic filtering 162 to determine whether to display a device cursor at a fixation location or unhide the device cursor at the previous cursor position. The heuristic filtering 162 may use the eye gaze intent states 160 and the input device signals 118 but may include other signals and/or conditions. In some examples, a display appearance (e.g., size, shape, color, animation, and/or visibility, etc.) of the position indicator 142 changes when an input modality 110 has changed. In some examples, when eye gaze is used, the position indicator 142 is invisible, but when the input modality 110 changes to an input device 150, the position indicator 142 is visibly displayed.

The input transition engine 122 may transition to the input device 150 in response to the eye gaze intent state 160 being the fixation state 160a and the detection of an input device signal 118 that indicates movement of the input device 150 (e.g., movement over a threshold amount). When the eye gaze intent state 160 is the fixation state 160a and the input device signal 118 indicates that the input device 150 has moved, as shown in operation 164, the position indicator 142 is positioned (and visible) at the fixated location (e.g., location 125-2, f0), and the input device 150 is in control of the position indicator 142. In other words, the device pointer is positioned at the fixation location (f0) determined by the eye gaze tracker 112.

In some examples, the input transition engine 122 may determine to transition to the input device 150 in response to the eye gaze intent state 160 being the undecided state 160b and the input device signal 118 that indicates movement of the input device 150 (e.g., within a threshold amount of time of determining that the eye gaze intent state 160 to the undecided state 160b). In response to the eye gaze intent state 160 being the undecided state 160b and the detection of an input device signal 118 indicating movement of the input device 150, in operation 166, the position indicator 142 (e.g., cursor) is positioned (and visible) at a previous location (e.g., location 125-1). For example, since the user's eye movement is detected as the undecided state 160b but the user has applied movement to the input device 150, the input transition engine 122 switches to the input device 150 and unhides the position indicator 142 at the previous cursor position (e.g., not at an eye gaze position).

Fo example, the input transition engine 122 may apply heuristic filtering 162, and the outcome of the heuristic filtering 162 is true when the eye gaze intent state 160 is the fixation state 160a and then the input transition engine 122 receives a device delta from an input device signal 118 that indicates movement of the input device 150. When in the fixation state 160*a*, the eye gaze tracking data 145 may specify a fixation location f0 (e.g., location 125-2), which is a location on the display 140 that corresponds to the user's fixed gaze. In some examples, the outcome of the heuristic filtering 162 is true when the eye gaze intent state 160 is the undecided state 160*b* and the input transition engine 122 receives a device delta (e.g., input device signal 118). Otherwise, the input transition engine 122 may determine the outcome of the heuristic filtering as false. If true, in operation 164, the input transition engine 122 displays the device pointer at the fixation location f0. If false, in operation 166, the input transition engine 122 displays (unhides) the device position at the previous cursor position. In some examples, when in the saccade state 160*c*, in operation 166, the input transition engine 122 displays (unhides) the device position at the previous cursor position.

Figure 1C:
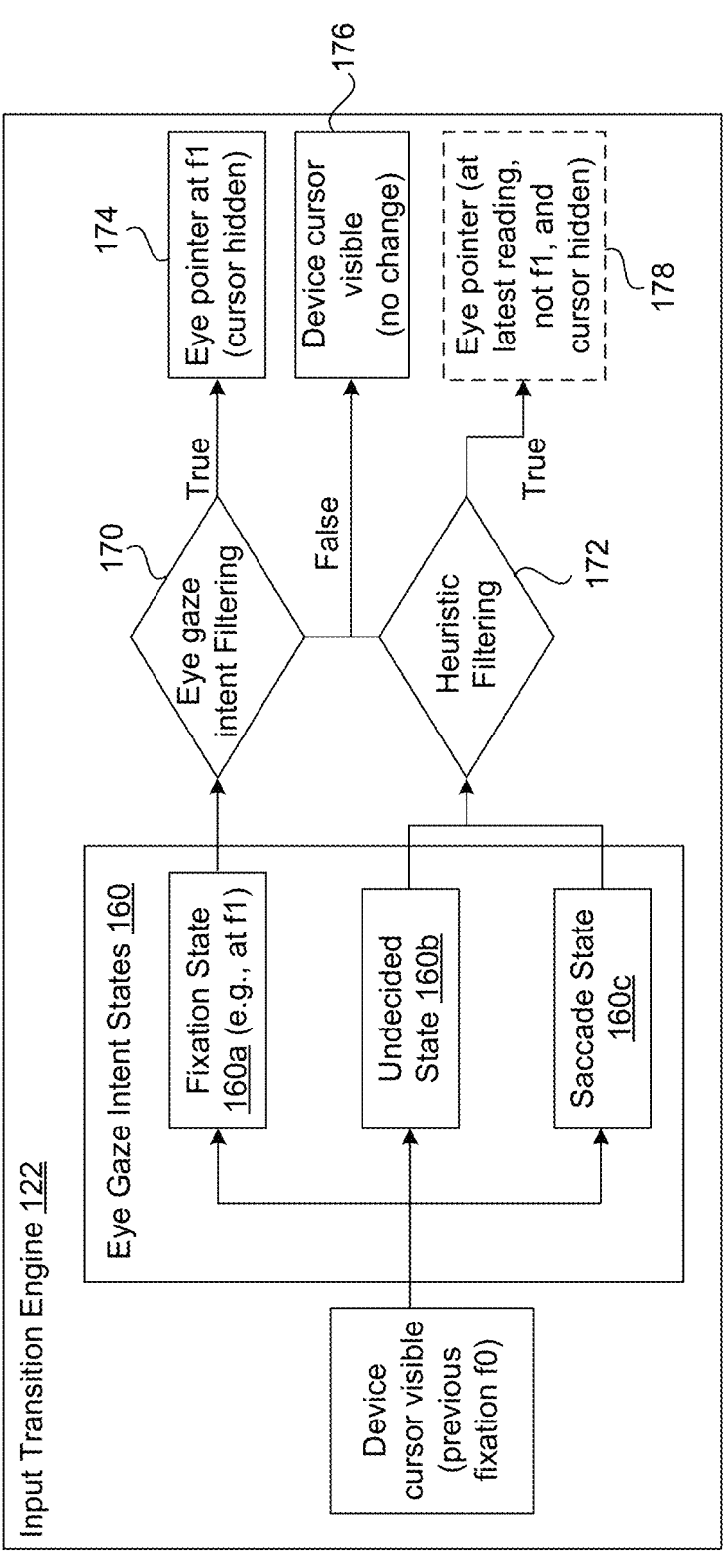
FIG. 1C illustrates an example of an input transition engine according to another aspect.

FIG. 1C illustrates an example of the input transition engine 122 for transitioning from a device pointer to an eye pointer. When a device pointer is used, the position indicator 142 may be visible at a location 125-2 (e.g., previous fixation location f). The input transition engine 122 may determine one of a plurality of eye gaze intent states 160 based on eye tracking data 145 from the eye gaze tracker 112. The eye gaze intent states 160 may include a fixation state 160*a*, an undecided state 160*b*, and a saccade state 160*c*. A saccade state 160*c* may be a rapid movement of both eyes that shifts a gaze from one point of interest to another. In some examples, the input transition engine 122 determines a fixation state 160*a* when the eye tracking data 145 indicates that the user has fixated on a particular location.

In some examples, the input transition engine 122 may switch from a device pointer to an eye pointer in response to the eye gaze intent state 160 being the fixation state 160*a* and/or determining that a fixation location (e.g., location 125-3, f1) has an angular distance from the device cursor (e.g., at location 125-2, f0) that exceeds a threshold value. For example, the input transition engine 122 applies eye gaze intent filtering 170, where the result of the eye gaze intent filtering is true when the eye gaze intent state 160 is the fixation state 160*a* and the fixation location has a distance (e.g., an angular distance) from the device pointer that exceeds a threshold value. In some examples, if both two conditions are not satisfied (or one condition), the result of the eye gaze intent filtering 170 is false. If true, in operation 174, the input transition engine 122 moves the eye pointer to the location 125-3 (e.g., the fixation location f1), and the eye gaze tracker 112 is in control of the position indicator 142. If false, in operation 176, the input transition engine 122 displays the device pointer, e.g., at the location 125-2 (e.g., no change in position), and the input device 150 is in control of the position indicator 142.

In some examples, the input transition engine 122 applies heuristic filtering 172 when the eye gaze intent state 160 is the undecided state 160*b* or the saccade state 160*c*. The output of the heuristic filtering 172 may be true or false. In some examples, the input transition engine 122 determines that the output of the heuristic filtering 172 is true in response to the eye gaze intent state 160 being determined as the saccade state 160*c* and a length of one or more saccades (e.g., consecutive saccades) having a distance (e.g., an angular distance) from the device cursor that exceeds a first threshold level (e.g., a high threshold level). In some examples, the input transition engine 122 determines the output of the heuristic filtering 172 as true in response to the eye gaze intent state 160 being determined as the saccade state 160*c* and determining that a length of a saccade is a medium length (e.g., between the first threshold level and a second threshold level, there the second threshold level that is less than the first threshold level) and there exists another saccade that is not towards the device pointer.

In some examples, the input transition engine 122 determines the output of the heuristic filtering 172 as true in response to 1) the eye gaze intent state 160 being determined as the undecided state 160*b*, 2) there is far enough angular distance away (e.g., angular distance greater than a threshold level), and 3) a subsequent saccade in the saccade state 160*c* or a move in the undecided state 160*b* is further away from the device pointer. If the output of the heuristic filtering 172 is true, in operation 178, the input transition engine 122 may position the eye pointer at the latest eye pointer reading (e.g., not f1), and the eye pointer may remain hidden. If the output of the heuristic filtering 172 is false, the input transition engine 122 proceeds to operation 176, which displays the device pointer.

The eye gaze intent states 160 may add an extra layer of intention discoverability in the switching between the input modalities 110 (e.g., switching between a device pointer and an eye pointer or vice versa). Apart from user intent filtering, additional heuristics may include angular distance between the device pointer and an eye gaze ray, and a period of time from when a pointer was hidden). In addition, the input transition engine 122 may maintain pointer locations contextually during handovers (e.g., transitions).

When switching the eye pointer to the device pointer, as shown in FIG. 1B, the input transition engine 122 may change the behavior of the device pointer to be the same as the intentful fixation at the fixation location (f0), thereby being perceived by the user as a continuation of the eye pointer. In some examples, when the input transition engine 122 determines that the user's eyes are not fixated (e.g., the undecided state 160*b* or the saccade state 160*c*), the input transition engine 122 may switch the device pointer back to its previous contextual location, smoothly bringing back the previous context back to the user upon transitioning the pointer, thereby aiding seamlessness in the transition to the device pointer.

Similarly, when switching from the device pointer to the eye pointer, as shown in FIG. 1C, an intentful saccade (e.g., a saccade state 160*c*), or a fixation (e.g., a fixation state 160*a*), or an undecided state 160*b* with sufficient heuristic strength may provide a signal that the user has decided to switch contexts, and the input transition engine 122 enables seamless transition to an eye pointer in the user's new gaze location. In some examples, the techniques discussed herein may allow the eye gaze and device (e.g., mouse, controller, etc.) input combination to be closer to or as precise as a physical input device, while almost being as fast as pure eye gaze pointing. In some examples, the input transition engine 122 provides a cascaded input method with cascading input modalities and may achieve better performance results than some conventional approaches.

Figures 1D, 1E:
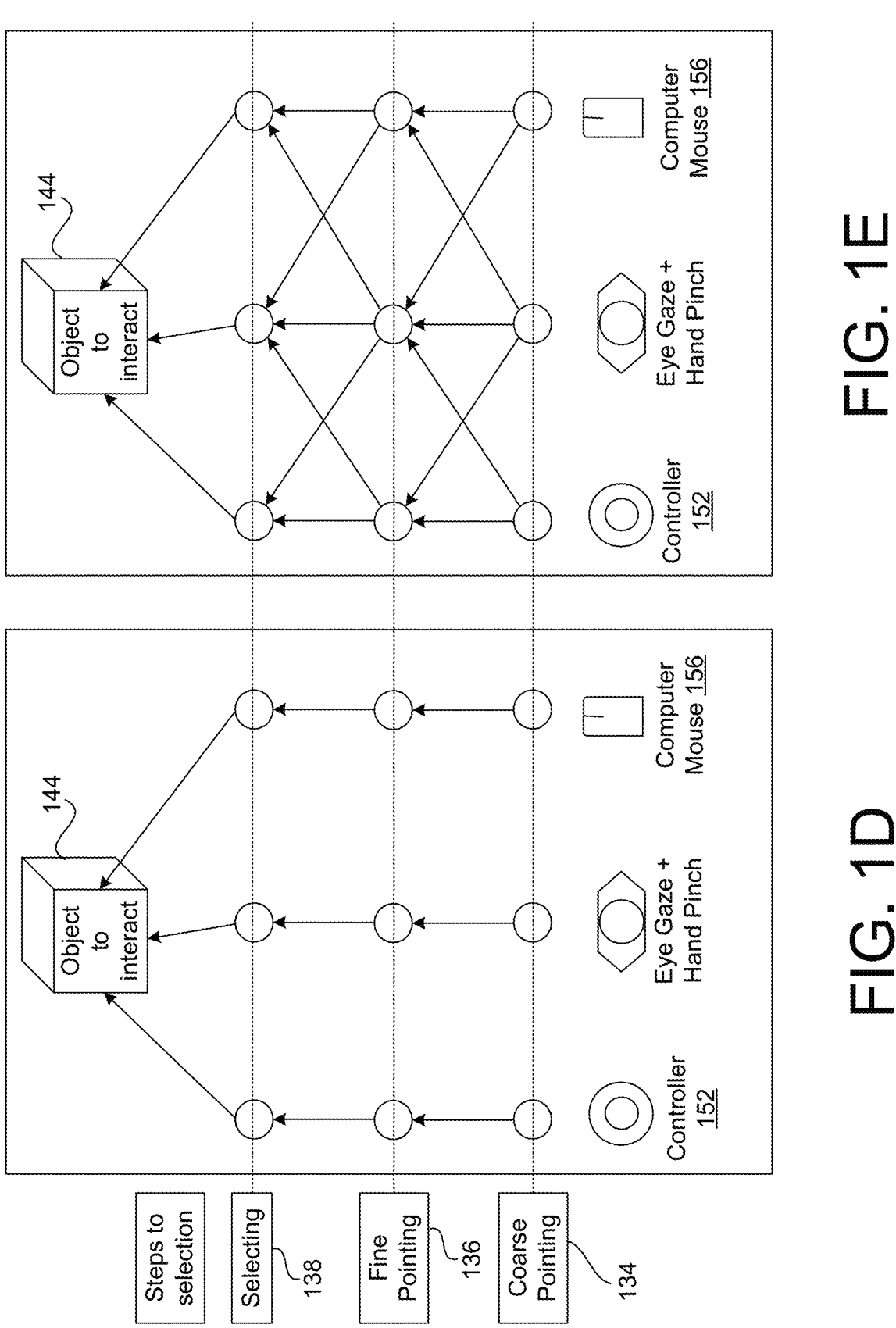
FIG. 1D illustrates a conventional system that uses a single input modality for selecting an object.
FIG. 1E illustrates a system that uses two or more input modalities for selecting an object according to an aspect.

FIG. 1D illustrates a system that uses one input mechanism (e.g., a controller 152, eye gaze plus hand pinch, or a computer mouse 156) for selecting an object 144. In other words, a single input mechanism may be used to perform the steps to select an object 144. For example, for coarse pointing 134, fine pointing 136, and selecting 138, a user may use the controller 152, eye gaze plus hand pinch, or a computer mouse 156. However, as shown in FIG. 1E, the techniques discussed may use multiple input modalities 110 to perform an object selection.

Figure 1F:
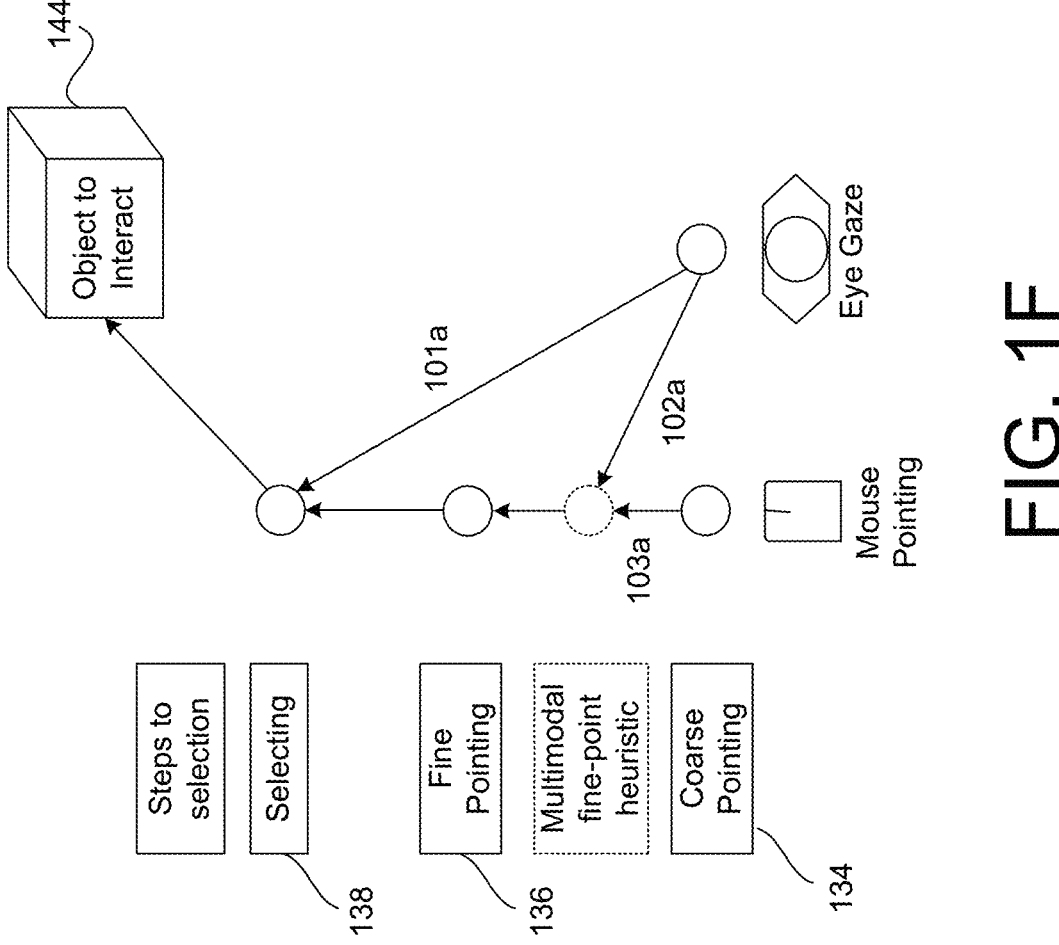
FIG. 1F illustrates a flow diagram with multiple paths involving one or more input modalities for selecting an object according to an aspect.

FIG. 1F illustrates various selection paths involving one or more input modalities 110 for selecting an object 144.

Selection path 101*a* relates to using eye-tracking for coarse pointing 134, fine pointing 136, and selecting 138 the object 144. In some examples, when the display device 100 uses only eye-tracking according to selection path 101*a*, a user element interface (e.g., a button interface) may be used to select the object 144. Selection path 103*a* relates to using an input device 150 for coarse pointing 134, fine pointing 136, and selecting 138 the object 144. However, selection path 102*a* relates to using eye gaze for coarse pointing 134 but then switching to device pointing for fine pointing 136 and using the input device 150 for selecting 138. Selection path 102*a* may relate to a multimodal heuristic (e.g., a device delta, and, in some examples, other signals) to identify that the user may not have confidence in their selection and then switch to a fine pointing input mechanism (e.g., input device 150) to perform the selection.

Referring back to FIG. 1A, the display device 100 may include one or more processors 101, one or more memory devices 103, and an operating system 105 configured to execute one or more applications 107. In some examples, the operating system 105 includes the cursor emulator 120, including the input transition engine 122. For example, the input modalities 110 and the cursor emulator 120 may be components or functionalities of the operating system 105. The processor(s) 101 may be formed in a substrate configured to execute one or more machine executable instructions or pieces of software, firmware, or a combination thereof. The processor(s) 101 can be semiconductor-based—that is, the processors can include semiconductor material that can perform digital logic. The memory device(s) 103 may include any type of storage device that stores information in a format that can be read and/or executed by the processor(s) 101. In some examples, the memory device(s) 103 is/are a non-transitory computer-readable medium. In some examples, the memory device(s) 103 includes a non-transitory computer-readable medium that includes executable instructions that cause at least one processor (e.g., the processor(s) 101) to execute operations discussed with reference to the display device 100. The applications 107 may be any type of computer program that can be executed by the display device 100, including native applications that are installed on the operating system 105 by the user and/or system applications that are pre-installed on the operating system 105. The object 144 may be any object rendered by a user interface associated with the operating system 105, an application 107, or generally any component of the display device 100.

FIG. 2 is a flowchart 200 depicting example operations of a display device for transitioning between two input modalities according to an aspect. The flowchart 200 may depict operations of a computer-implemented method. The flowchart 200 is explained with respect to the display device 100 of FIGS. 1A and 1F. Although the flowchart 200 of FIG. 2 illustrates the operations in sequential order, it will be appreciated that this is merely an example, and that additional or alternative operations may be included. Further, operations of FIG. 2 and related operations may be executed in a different order than that shown, or in a parallel or overlapping fashion. The flowchart 200 may depict a computer-implemented method.

Operation 202 includes receiving eye tracking data. Operation 204 includes detecting an eye gaze intent state based on the eye tracking data. Operation 206 includes receiving an input device signal of an input device. Operation 208 includes determining to switch from a first input modality to a second input modality based on at least one of the eye gaze intent state or the input device signal. Operation

210 includes moving a position indicator on a display of a display device using the second input modality.

Figure 3A:
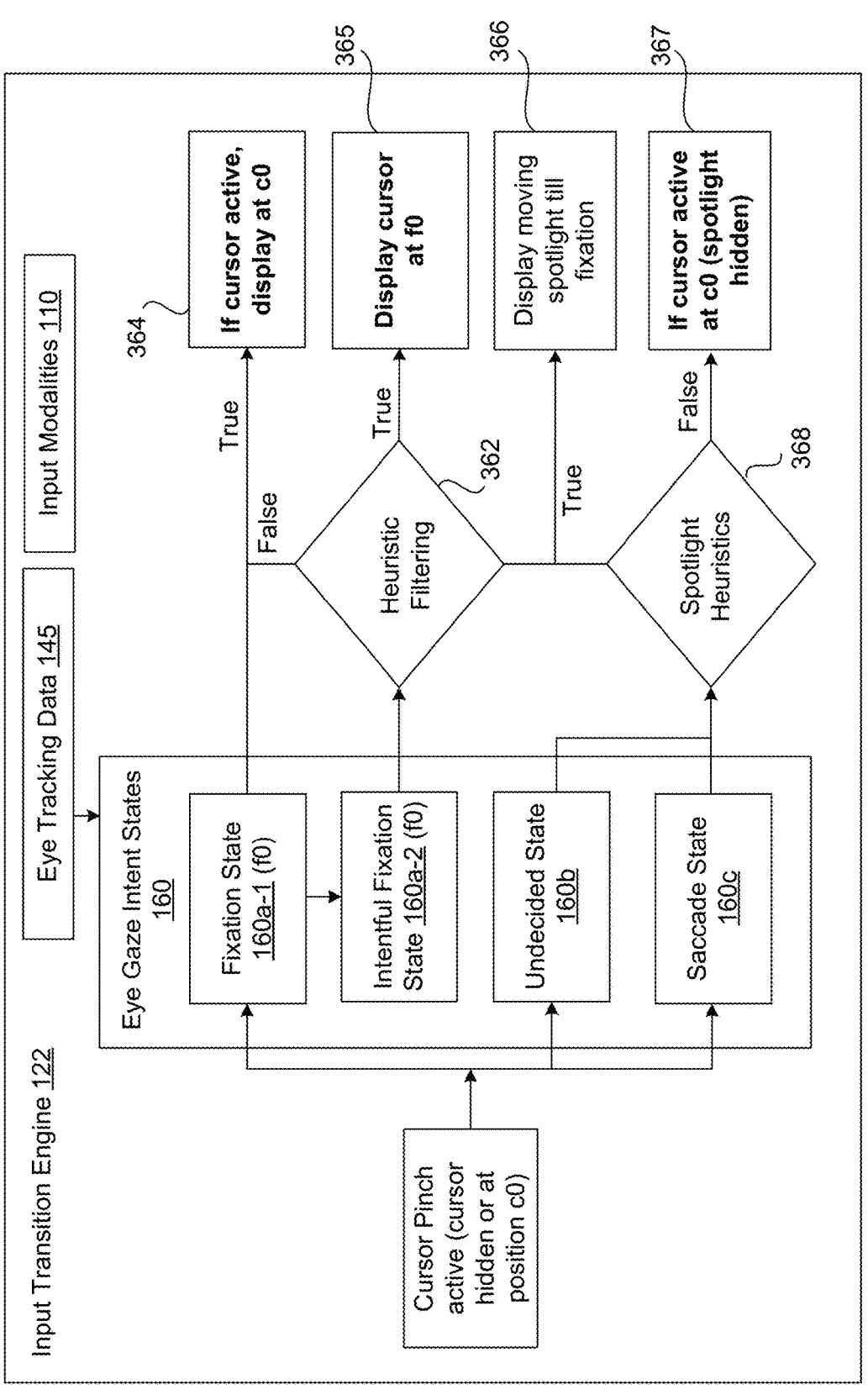
FIG. 3A illustrates an example of an input transition engine for transitioning from an eye pointer to a head pointer according to an aspect.

FIG. 3A illustrates an input transition engine 122 according to an aspect. The input transition engine 122 may transition from an eye pointer to a head pointer or hand pointer (or from a head pointer or hand pointer to an eye pointer). The input transition engine 122 may switch between an eye pointer to a head pointer during the course of identifying and selecting an object 144 (e.g., during coarse pointing, fine pointing, and/or selecting of an object 144). A feature (or a combination of features) of the input transition engine 122 described with reference to FIGS. 3A to 7 may be used with a feature (or a combination of features) described with reference to the display device 100 of FIGS. 1 to 2. For example, the display device 100 may enable transitions between an eye pointer and an input device and/or an eye pointer and a head pointer or a hand pointer (or between an input device and a head pointer or a hand pointer, or between a head pointer and a hand pointer).

In some examples, the hand can be used for mode switching and confirmation. The eyes can travel large distances to a coarse point, and the head may fine tune a selection. For example, large motions may be achieved naturalistically with the eyes (e.g., a fast modality). If the user is confident in the eye pointing target, they can use a pinch to confirm. If not, they switch modes by using their hands to a partial pinch (e.g., a half-pinch gesture). The partial pinch gesture is detected at a portion (e.g., midway) during the pinch confirmation. In the partial pinch configuration, an explicit cursor transition (transitions from a hidden cursor to a displayed cursor) informs the user that they are in fine-point mode, where they use head movements to fine tune the cursor selection. In some examples, this process may provide more robust eye gaze and hand pinch based input systems. In some examples, in a pure gaze and pinch system, users might have a way to correct the coarse eye pointing, and, in some examples, may feel frustrated if they are unable to select a target. By providing a path for users to correct inaccurate eye gaze targeting in the coarse region of their selection, the system adds a layer of robustness by introducing fine pointing to gaze and pinch systems, thereby allowing the user to perform the complete range of selection and confirmation tasks they would need in a pointer based input.

The interactions discussed herein allow the user to switch modes using a partial pinch gesture simultaneously while eye gaze pointing. In some examples, completing a pinch may take longer than targeting the eye (e.g., ballistic eye movements may be relatively small while a pinch takes longer). In some examples, the display device may perform transitions during the pointing flow, where a user avoids waiting and judging if the coarse eye tracker was able to target correctly. The eye pointer converting to a head cursor may provide feedback that input modalities have transitioned. Eye gaze pointing is implicitly connected with head movement so when the cursor transitions, it follows the same general direction the eyes were following, since the eyes and head move in concert while being offset to each other. This continuation of the same path the eye pointer was tracing introduces a cascading effect, where users can operate as if the head pointing is an extension of the same eye movement and may avoid relying on their judgment to assess if the eye tracker itself worked well.

In some examples, the display device 100 uses a system that can either use eye gaze and hand pinch or eye gaze, head and hand pinch. This duality may be enabled by the partial pinch gesture. The partial pinch gesture may provide an intuitive way to cascade inputs during selection because the state occurs during the process of confirmation using hand pinch, e.g., the user will go through the partial pinch state to be able to confirm selection using hand pinch. This state may enable fast mode switching because it reduces or eliminates extra steps from the hand pinch gesture. Integrating into the existing paradigm also allows it to provide an easy learning curve and integrate with current hand tracking systems with minimal effort.

Some camera based hand tracking systems in XR systems may not be able to provide stable hand pinch readings, especially with large head movements. To introduce robustness in the partial pinch gesture, a banding effect is used (see FIG. 4). The display device may use time and pinch strength banding to ensure the user stays in the fine-tune state even if the device loses tracking for small time periods. In some examples, the display device 100 may enable users to use eye gaze plus pinch or enter a space where the eye gaze can be fine-tuned with the head and then pinch. This flexibility may allow for much faster transition and confirmation when the target is aligned already with the eye gaze, whereas sometimes if there is need for a more fine pointing the users can engage the hand further to enable head pointing selection.

With respect to head-eye gaze input cascading, in some examples, the eyes and head are coordinated when they shift to gaze at a target. To make the transition appear seamless, the eye gaze pointer may convert into a head movement controlled donut cursor at the location of the eye gaze pointer on entering the partial pinch gesture state. Visual feedback may be provided where the hazy gaze pointer transitions to a solid donut cursor which is controlled by head movement. This behavior, along with the coordinated eye gaze and head movement serve to reinforce the different modes of input while still appearing to be the same input, including for large gaze shifts, where when switching to fine-tune mode, the head movement cursor may seem to continue the same eye gaze movement, giving the appearance of a single continuous input.

In some examples, the display device 100 provides a smart cursor state, where the cursor states depend on the hand gesture of the user, whether they are doing coarse eye input, or enabling head fine pointing or directly confirming with the pinch.

Referring to FIG. 3A, the input transition engine 122 determines an eye gaze intent state 160 based on the eye tracking data 145 from an eye gaze tracker 112 (e.g., the eye gaze tracker 112 of FIGS. 1A to 1F). In some examples, when eye tracking is initially used as the input modality 110, the position indicator 142 is not visible. In some examples, when eye tracking is initially used as the input modality 110 and a particular hand gesture (e.g., a half-pinch) is detected, the input transition engine 122 may display a head pointer at a first location (c0) (e.g., a previous location). For example, the hand tracking engine 116 may detect a hand gesture from hand tracking data 149. In some examples, the hand tracking engine 116 may detect a particular hand gesture (e.g., a partial pinch), which may activate cursor pinch, but the eye gaze input modality is in control of the position indicator 142.

The input transition engine 122 may determine one of a plurality of eye gaze intent states 160 based on the eye tracking data 145 from the eye gaze tracker 112. In some examples, the input transition engine 122 periodically determines the eye gaze intent state 160 as new eye tracking data 145 is detected. In some examples, the eye gaze intent states 160 include a fixation state 160a-1, an intentful fixation state 160a-2, an undecided state 160b, and a saccade state 160c. Saccades are ballistic eye movements that the eye makes to jump areas, and fixations are areas that the eye is focusing on. Undecided is an in-between state where the user is not in fixation or a saccade. In some examples, a saccade is a ballistic eye movement made suddenly which is above a certain velocity threshold. In some examples, a fixation is an eye movement which occurs only in the area they were already looking at (e.g., almost like just moving a little bit). A user usually quickly switches saccades and fixations depending on what the user is trying to do, and there is a window in between saccades and fixations, which may be referred to as an undecided state 160b. In some examples, the eye track tracker 112 may use an eye state algorithm 111 to detect a particular eye gaze intent state 160 using the eye tracking data 145. In some examples, the input transition engine 122 may apply heuristics to classify a fixation as an intentful fixation (e.g., the user is intentfully looking to be able to select).

In some examples, the input transition engine 122 may use one or more eye-based heuristics or signals to detect whether a fixation is intentful or not. The eye-based heuristics or signals may include fixation length and/or fixation count. A fixation length may be the amount of time that a user has focused on a particular location. In some examples, the eye gaze tracker 112 may collect n names of eye tracking data which indicate that the user is in a fixation, and the samples all lie within the fixation (e.g., $e\_1$=first eye tracking sample in fixation, . . . $e\_n$=$n\_th$ eye tracking sample in fixation, the fixation length=$n$/(time_of ($e\_n$)−time_of ($e\_1$)). In some examples, the fixation length is the number of samples in the fixation divided by the total time the user has been in that particular fixation. In other words, a fixation count is the number of samples within the fixation threshold from the eye gaze window. In some examples, an intent fixation state 160a-2 has a fixation length that is greater than a fixation length of a fixation state 160a-1. In some examples, intentful fixations have higher fixation counts than exploratory fixations. To detect fixations, the input transition engine 122 may use a time based threshold which may provide a plurality of noisy samples of where the eye might actually be looking. To calculate fixation count, the input transition engine 122 may check how many of the samples are actually within the fixation area in this time threshold versus how many samples are outside the time threshold. This ratio of samples in fixation versus samples out of fixation is the fixation count.

The input transition engine 122 may determine whether a fixation is a fixation state 160a-1 or an intentful fixation state 160a-2 based on the fixation length and/or fixation count. In some examples, the input transition engine 122 determines a fixation state 160a-1 when the eye tracking data indicates that the user has fixated on a particular location (e.g., location 125-2, f0), and the fixation length is less than an upper threshold, and/or the fixation count is less than an upper threshold. In some examples, the input transition engine 122 determines an intentful fixation state 160a-2 when the eye tracking data indicates the user has fixated on a particular location, and the fixation length is greater than the upper threshold, and/or the fixation count is greater than the upper threshold. The input transition engine 122 determines an undecided state 160b when the eye tracking data 145 indicates that the user has not fixated on a particular location.

When cursor pinch is active at position c0, in response to detecting a fixation state 160a-1, in operation 364, the input transition engine 122 may display a head pointer at location c0 if the cursor is active, and the header pointer is in control. In response to detecting an intent fixation state 160a-2, the input transition engine 122 may apply heuristic filtering 362 to determine one of two outcomes (e.g., true or false). The input transition engine 122 may output true in response to the distance (e.g., the angular distance) between location c0 and location f0 (e.g., a fixation location) being greater than a threshold level, which may cause the input transition engine 122, in operation 365, to display a head pointer at location f0 (e.g., the fixation location), and the head pointer is in control.

If the angular distance between location c0 and location f0 is less than the threshold level (e.g., false outcome), the input transition engine 122 may display the head pointer at location c0 (e.g., the current location of the position indicator 142), as shown in operation 364. In response to detecting an undecided state 160b or a saccade state 160c, the input transition engine 122 may apply spotlight heuristics 368 to determine one of two outcomes (e.g., true or false). The input transition engine 122 may output true in response to the angular distance between an eye gaze location and location c0 being greater than a threshold level, which may cause the input transition engine 122, in operation 366, to display a moving a gaze spotlight indicator 142a until at least a fixation state 160a-1 or an intent fixation state 160a-2 is detected. In operation 366, the eye gaze pointer is in control. In response to the angular distance between the eye gaze location and location c0 is less than a threshold level (false), the input transition engine 122, in operation 367, may display a head pointer at location c0, where the gaze spotlight indicator is hidden.

Figure 3B:
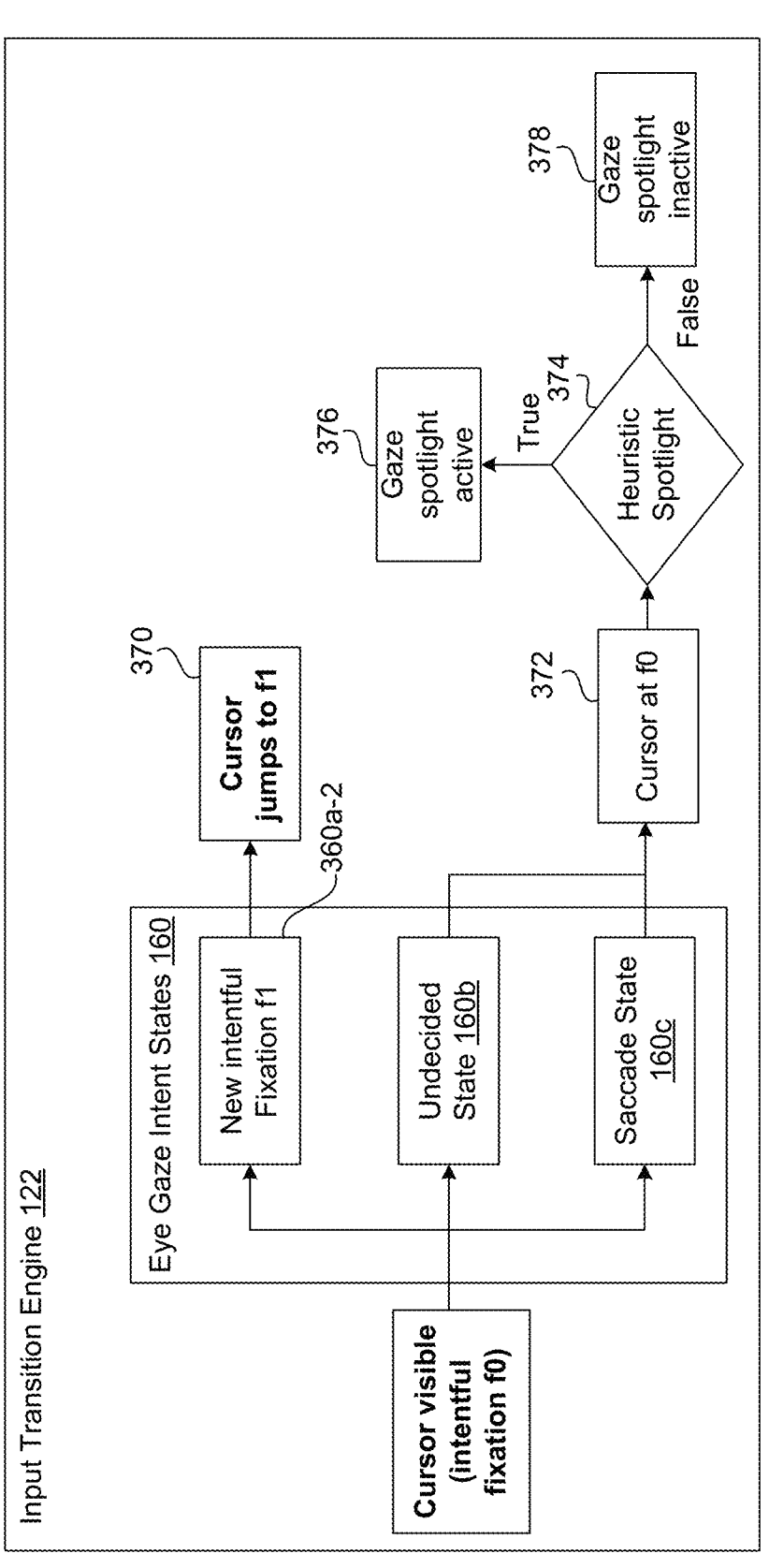
FIG. 3B illustrates an example of an input transition engine for transitioning from a head pointer to an eye pointer according to another aspect.

FIG. 3B illustrates an example of the input transition engine 122 for transitioning between a head pointer to an eye pointer. When using head tracking as an input modality 110, the head pointer is visible at location f0, and there may be an intentful fixation at location f0.

The input transition engine 122 may determine one of a plurality of eye gaze intent states 160 based on eye tracking data from the eye gaze tracker. In response to detecting an intentful fixation state 160a-2 at a new fixation location f1, in operation 370, the input transition engine 122 may move the head pointer to location f1. In response to detecting an undecided state 160b or a saccade state 160c, the input transition engine 122, in operation 372, may position an eye pointer at location f0. In response to the eye pointer being positioned at location f0, the input transition engine 122 may apply spotlight heuristics 374, and if the angular distance between eye gaze and location f0 is greater than a threshold level (true), in operation 376, the input transition engine 122 may activate a gaze spotlight indicator 142a.

A gaze spotlight indicator 142a may be a UI element that indicates to the user that the system is tracking eye movements. In response to the eye pointer being positioned at location f0, the input transition engine 122 may apply spotlight heuristics 374, and if the angular distance between eye gaze location and location f0 is less than the threshold level (false), in operation 378, the input transition engine 122 may deactivate gaze spotlight (e.g., deactivate displaying the spotlight gaze indicator 142a). The gaze spotlight indicator 142a may be a subtle indicator that is displayed, which may indicate that the eye tracking system is currently tracking their eye movements. In some examples, the gaze spotlight indicator 142a is a hazy cloud graphic on top of the user interface.

Figures 3C, 3D:
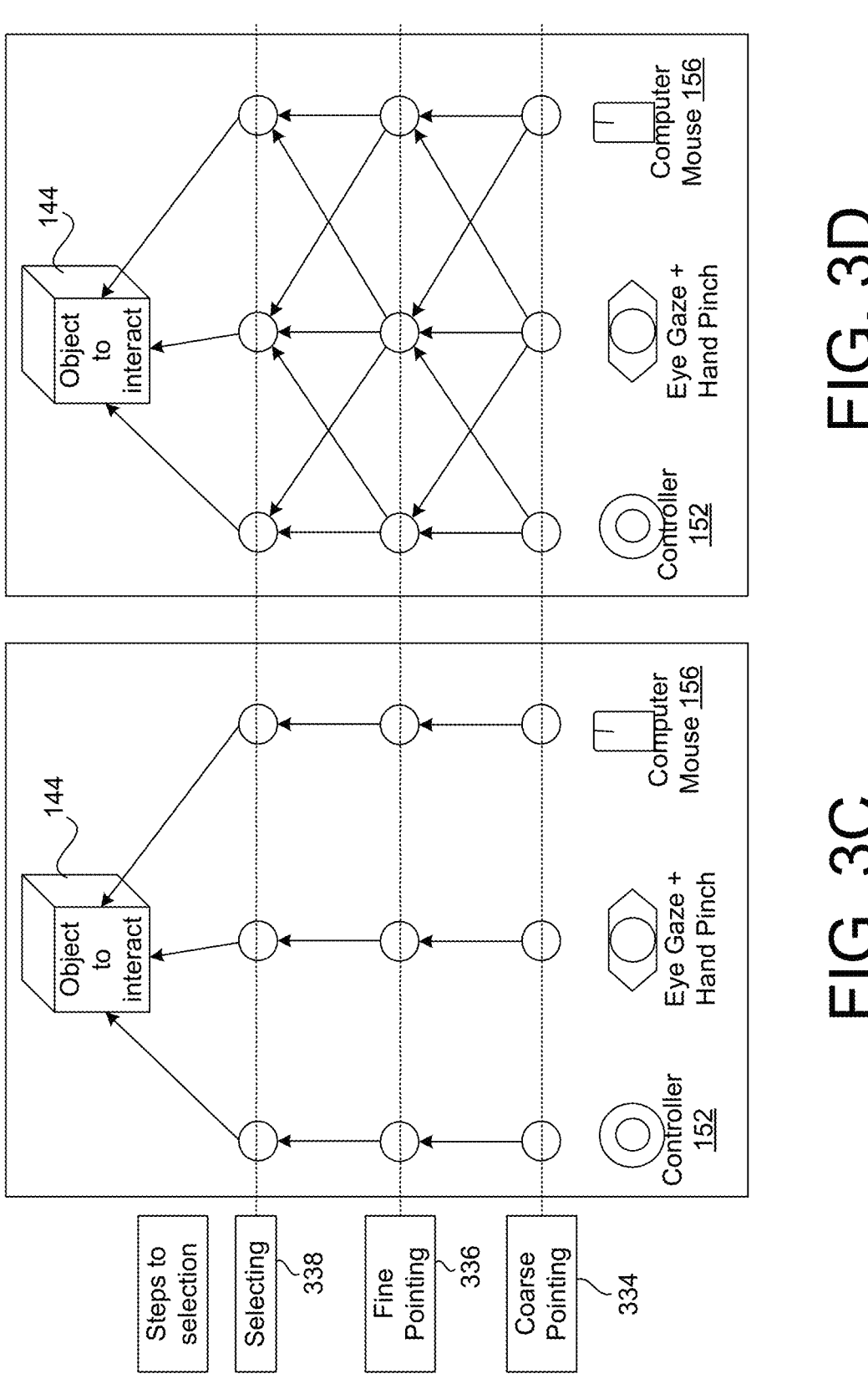
FIG. 3C illustrates a system that uses a single input modality for selecting an object.
FIG. 3D illustrates a system that uses multiple input modalities for selecting an object according to an aspect.

FIG. 3C illustrates a system that uses one input mechanism for selecting an object 144. In other words, a single input mechanism is used to perform the steps (e.g., all the steps) to select an object 144. For example, for coarse pointing 334, fine pointing 336, and selecting 338, a user may use the controller 152, eye gaze plus hand pinch, or a computer mouse 156. However, as shown in FIG. 3D, the techniques discussed may use multiple input modalities 110 to perform an object selection.

Figure 3E:
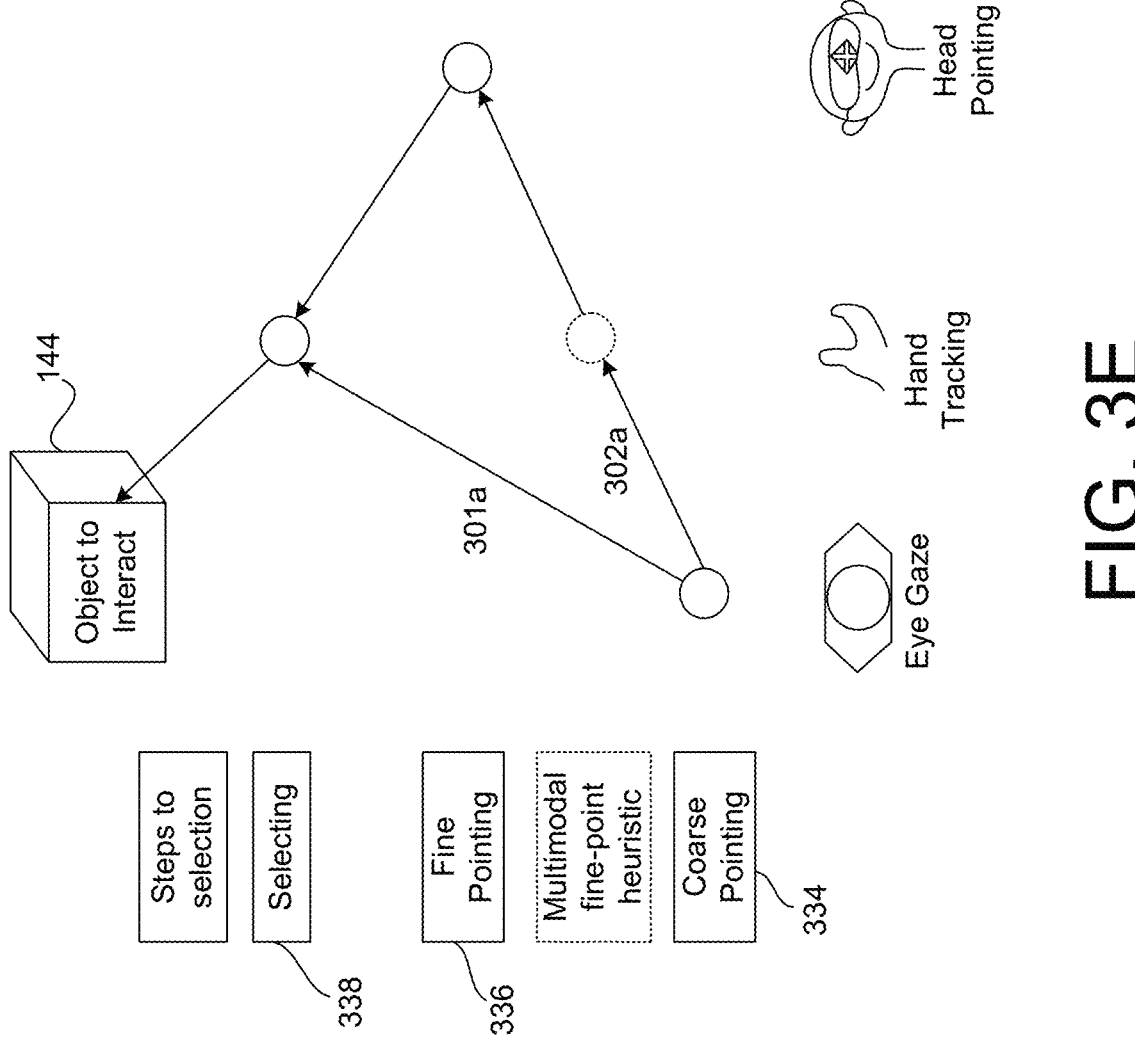
FIG. 3E illustrates a flow diagram with multiple paths involving one or more input modalities for selecting an object according to an aspect.

FIG. 3E illustrates various selection paths involving one or more input modalities 110 for selecting an object 144. Selection path 301a includes coarse (and fine) pointing with eye gaze and a hand gesture (e.g., pinching with the hands) to indicate selection. For example, a display device 100 may use eye gaze for coarse and fine pointing and then switch to hand tracking (e.g., hand pointer) for selecting the object 144. This interaction method may provide a stable point-and-selection interaction mechanism when the user is confident that their gaze is pointing correctly.

Selection path 302a relates to a high-precision mode, where a pinching gesture may act as a multimodal fine-point heuristic. When the user enters a high-precision mode, a visual cursor may be displayed which reflects the selection amount that the user is currently operating with. This visual cursor allows the user to perform the steps (e.g., all the steps) in selection path 302a, with the cursor changing location when the user changes their coarse eye gaze location but being locally affected by (e.g., only by) the relative head pointing movement after one or more heuristics. In some examples, relative movement with the head pointer may be sensitive and overcompensate for correct gaze selection. In some examples, the input transition engine 122 may overcome this technical problem by inserting a small time lag before starting head movement, and, in some examples, may reduce the angular gain on head movement translated into cursor movement. In some examples, the display device 100 may transition between hand positioning and eye gaze. In some examples, the display device 100 may transition to hand positioning using a pinch gesture for fine pointing to reduce one or more technical problems relating to accuracy.

Figure 3F:
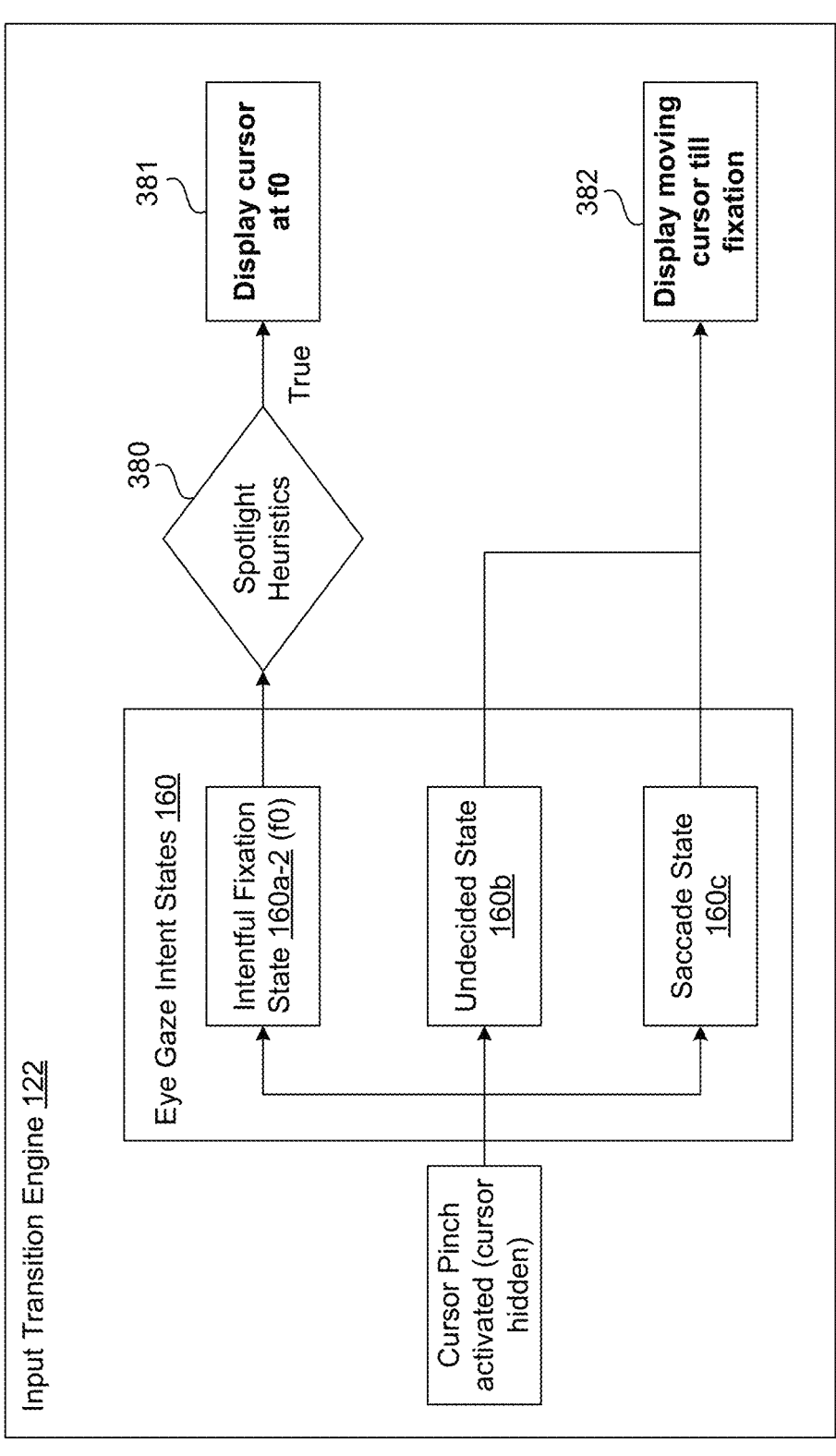
FIG. 3F illustrates an example of an input transition engine for transitioning from an eye pointer to a hand pointer according to an aspect.

FIG. 3F illustrates an input transition engine 122 according to another aspect. As shown in FIG. 3F, the input transition engine 122 may transition from an eye pointer to a hand pointer. For example, the input transition engine 122 may switch between an eye pointer to a hand pointer during the course of identifying and selecting an object 144 (e.g., during coarse pointing, fine pointing, and/or selecting of an object 144). In some examples, the hand can be used for mode switching and confirmation.

The input transition engine 122 determines an eye gaze intent state 160 based on the eye tracking data 145 from an eye gaze tracker 112. In some examples, a cursor pinch is activated by the input transition engine 122 detecting a partial pinch gesture, and the cursor (e.g., the eye pointer) is hidden. In some examples, the hand tracking engine 116 may detect a particular hand gesture (e.g., a partial pinch), which activates cursor pinch, but the eye gaze input modality is in control of the position indicator 142.

The input transition engine 122 may determine one of a plurality of eye gaze intent states 160 based on the eye tracking data 145 from the eye gaze tracker 112. In some examples, the input transition engine 122 periodically determines the eye gaze intent state 160 as new eye tracking data 145 is detected. In some examples, the eye gaze intent states 160 include an intentful fixation state 160-a-2, an undecided state 160b, and a saccade state 160c.

When the cursor pinch is active and the cursor is hidden, in response to detecting an intentful fixation state 160a-2, in operation 380, the input transition engine 122 may apply spotlight heuristics 380. The input transition engine 122 may output true in response to the angular distance between location of the hidden cursor and the location f0 (e.g., a fixation location) being greater than a threshold level, which may cause the input transition engine 122, in operation 381, to display a hand cursor at the fixation location. If the angular distance between the location of the hidden cursor and the location f0 is less than the threshold level, the input transition engine 122 may display the hand pointer at the location of the hidden cursor. In response to detecting an undecided state 160b or a saccade state 160c, the input transition engine 122 may display a hand cursor till fixation.

Figure 3G:
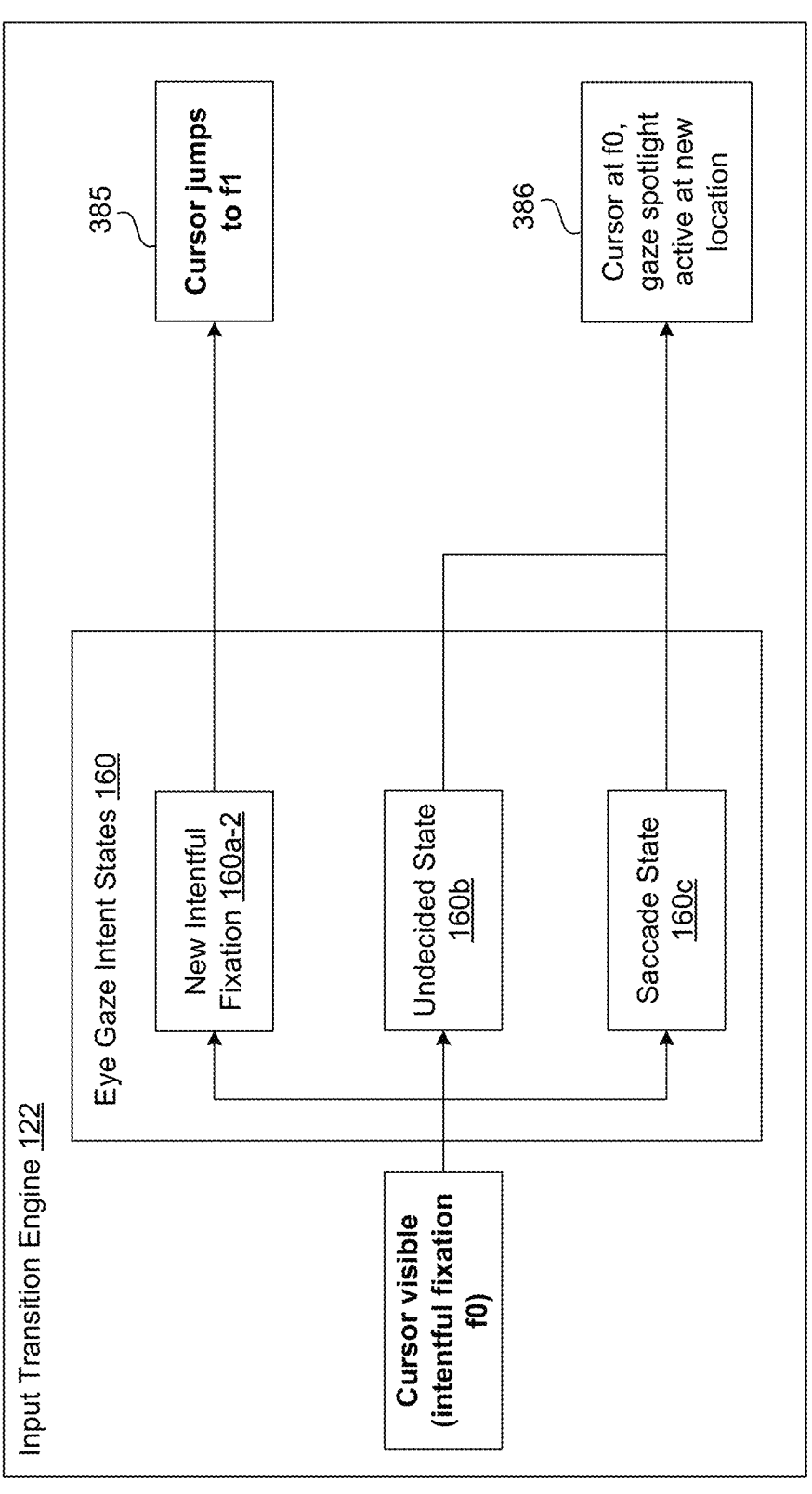
FIG. 3G illustrates an example of an input transition engine for transitioning from a hand pointer to an eye pointer according to an aspect.

FIG. 3G illustrates an input transition engine 122 according to an aspect. As shown in FIG. 3G, the input transition engine 122 may transition from a hand pointer to an eye pointer. As shown in FIG. 3G, the input transition engine 122 may transition from an eye pointer to a hand pointer. For example, the input transition engine 122 may switch between an eye pointer to a hand pointer during the course of identifying and selecting an object 144 (e.g., during coarse pointing, fine pointing, and/or selecting of an object 144).

The input transition engine 122 determines an eye gaze intent state 160 based on the eye tracking data 145 from an eye gaze tracker 112. In some examples, the hand gaze is in control, and the hand cursor is visible. The input transition engine 122 may determine one of a plurality of eye gaze intent states 160 based on the eye tracking data 145 from the eye gaze tracker 112. In some examples, the input transition engine 122 periodically determines the eye gaze intent state 160 as new eye tracking data 145 is detected. In some examples, the eye gaze intent states 160 include an intentful fixation state 160-a-2, an undecided state 160b, and a saccade state 160c. In response to detecting an intentful fixation state 160a-2, in operation 385, the input transition engine 122 may move the hand cursor to the new fixation location (f1). In response to detecting an undecided state 160b or a saccade state 160c, the input transition engine 122 may display a gaze spotlight indicator 142a at the current location f0.

Figure 3H:
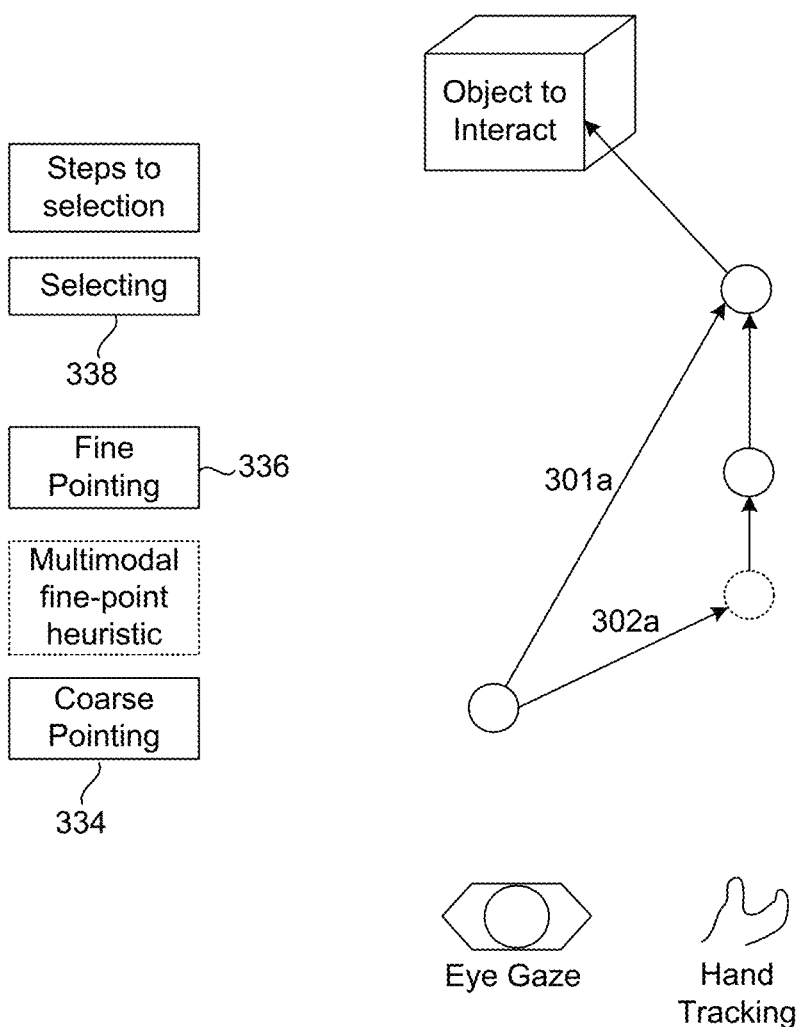
FIG. 3H illustrates a system that uses eye gaze and hand tracking for an input to a display device.

FIG. 3H illustrates various selection paths involving one or more input modalities 110 for selecting an object 144. Selection path 301a of FIG. 3H is the coarse (and fine) pointing with eye gaze, and pinching with the hands to indicate interaction. This path may provide a stable point-and-selection interaction mechanism when the user is confident that their gaze is pointing correctly. Selection path 302a relates to a high precision mode, where a pinch gesture acts as the multimodal fine-point heuristic. When the user enters high-precision mode, a visual cursor is displayed, which reflects the selection amount that the user is currently operating with. This visual cursor allows the user to perform the steps in selection path 302a, with the cursor changing location when the user changes their coarse eye gaze location but being locally affected by the relative hand pointing movement after some heuristics.

Figure 4:
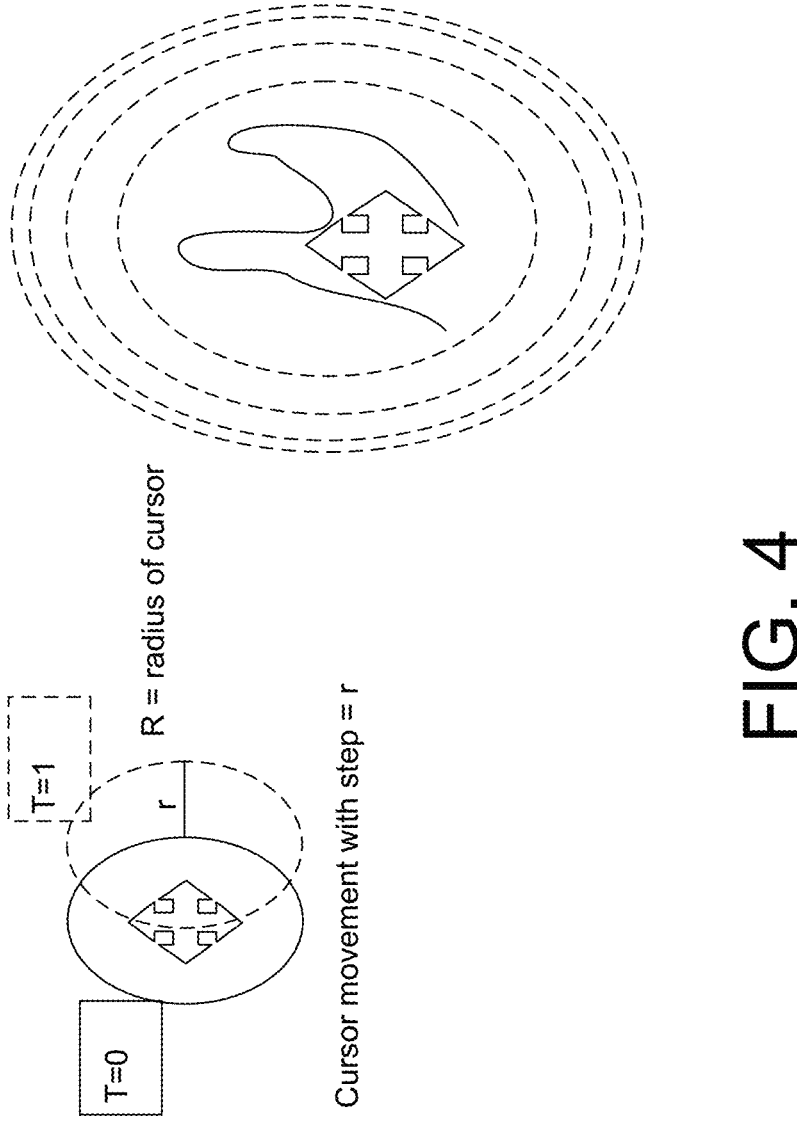
FIG. 4 illustrates an example of discrete cursor movement according to an aspect.
Figure 5:
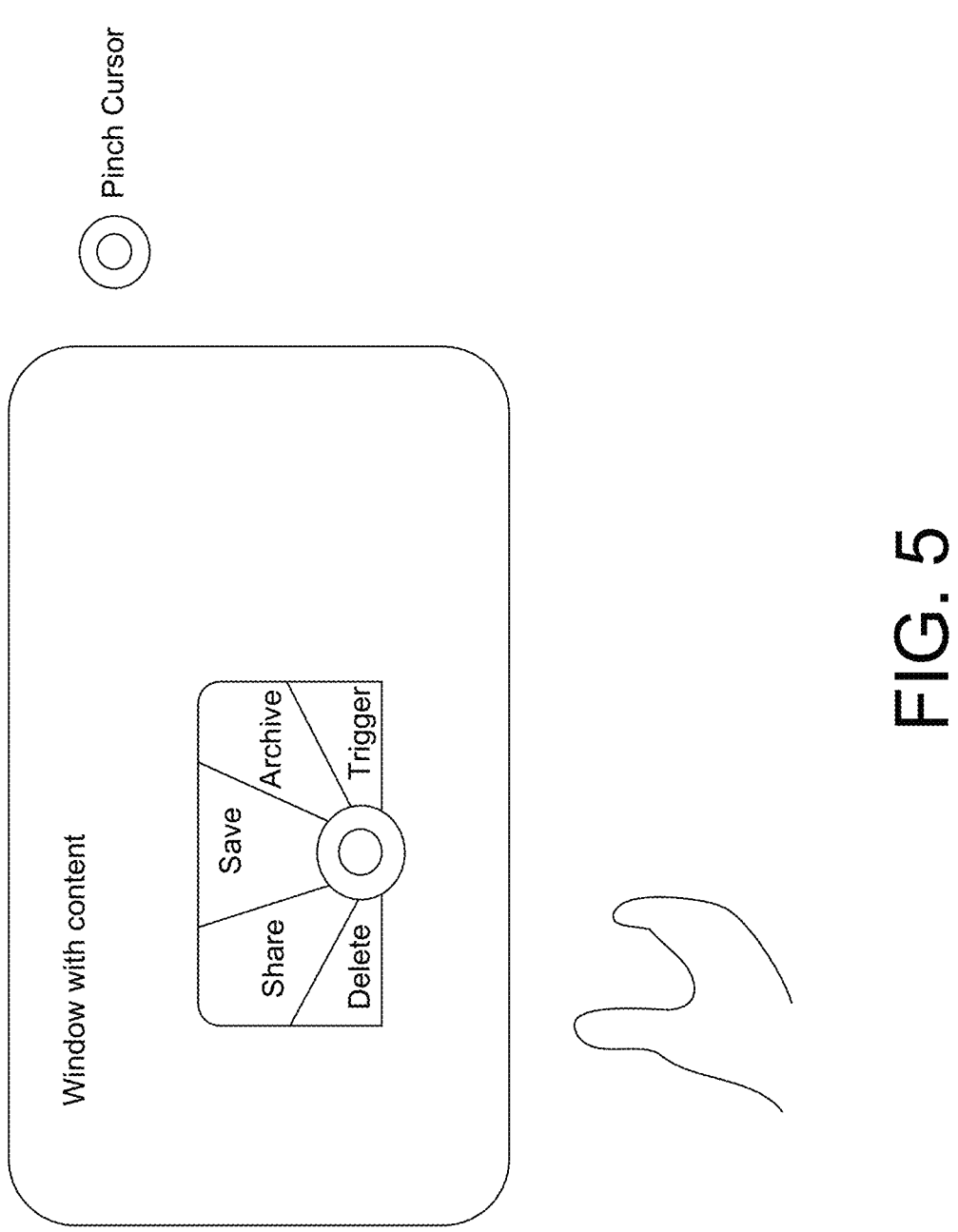
FIG. 5 illustrates an example of various actions for different hand gestures according to an aspect.

In some examples, the input transition engine 122 may use discrete pointer movement, as shown in FIG. 4. For example, a hand gesture (e.g., a partial pinch) may activate a spotlight gaze indicator, and the pinching motion may provide a banding effect. For example, while a user's hand is in a pinch position, a pinching (or releasing) action in a direction may cause a band (or circle) to shrink (or enlarge) in discrete steps, which causes a cursor movement. When the band (or circle) moves one step, the cursor is moved according to one step. When the band (or circle) moves two steps, the cursor is moved according to two steps, and so forth. In some examples, a discrete pointer movement may enable stable "nudging" behavior when the user has to correct within one to three radius steps. In some examples, instead of just moving the cursor like a mouse (e.g., directly tied to the position of your hand), the input transition engine 122 may move the pointer if (e.g., only if) the hand moves a certain amount (e.g., the band to move the pointer by one step). The amount of movement to subsequently change the cursor position reduces if already in motion, thereby giving the banding effect shown in the figure. FIG. 5 illustrates various actions with certain hand gestures.

Figure 6:
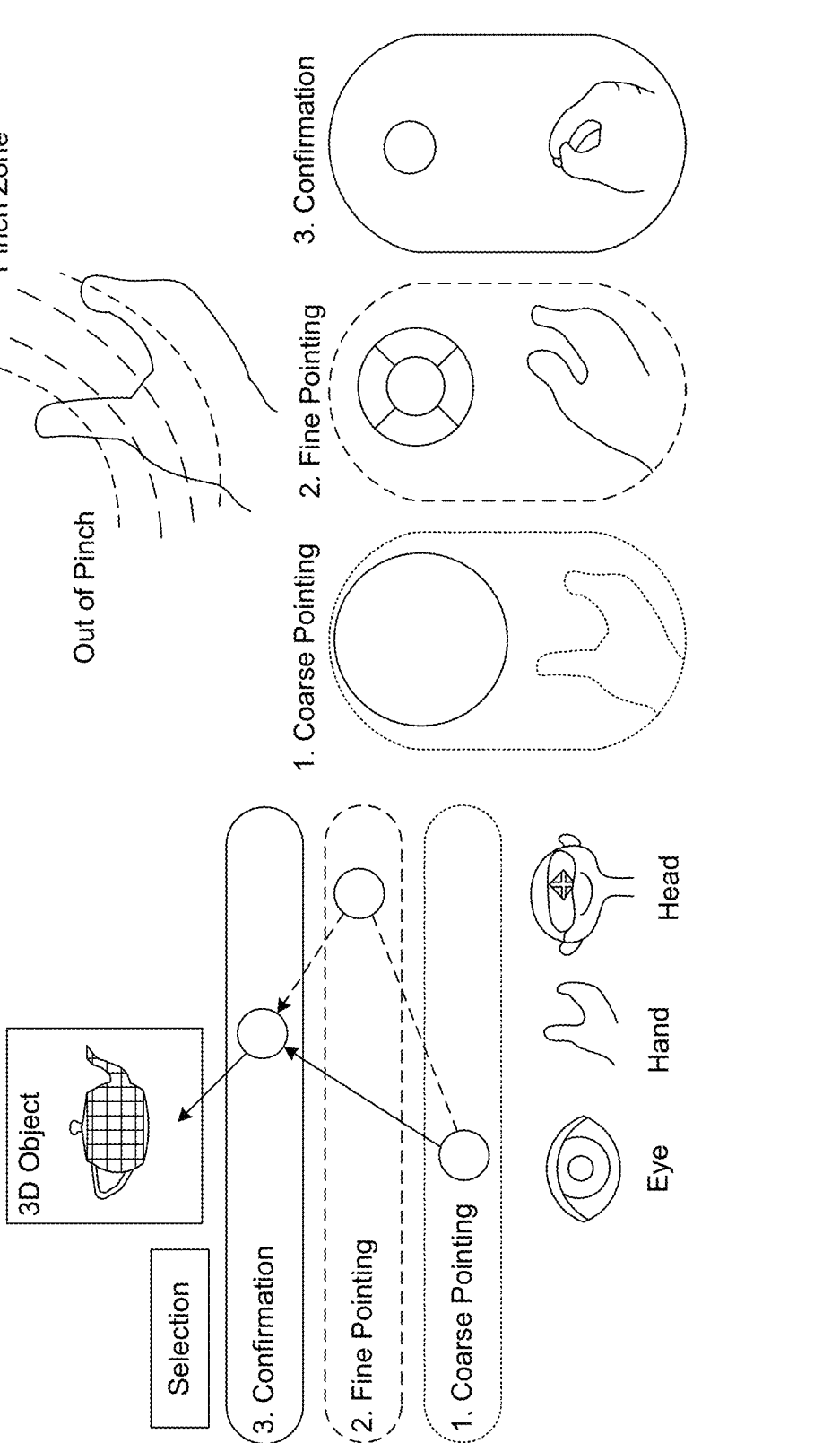
FIG. 6 illustrates a depiction of a cascade of eye and head combined by a plurality of hand gestures to enable fine grained interactions according to an aspect.

FIG. 6 illustrates a framework to transition between hand, head and eye interactions that enables a cascade of inputs (e.g., a seamless cascade of inputs) that allow for fast coarse pointing with eye tracking, easy fine selection (if needed) with the head, and comfortable confirmation as well as mode switching controlled with hand gestures. The framework of FIG. 6 may be executed by the display device 100 of FIGS. 1A to 1F and/or the input transition engine discussed herein. The interactions use a cascade of eye and head combined by a plurality of hand gestures to enable fine grained interaction. The display device uses a system that can use both the eye gaze and hand pinch modality, or the eye gaze, head pointing, and hand pinch modality, thereby allowing the user to switch modalities during the course of a selection based on their own confidence.

FIG. 7 is a flowchart 700 depicting example operations of a display device for transitioning between two input modalities according to an aspect. The flowchart 700 may depict operations of a computer-implemented method. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

Operation 702 includes receiving eye tracking data. Operation 704 includes detecting an eye gaze intent state based on the eye tracking data. Operation 706 includes determining to switch from a first input modality to a second input modality based on the eye gaze intent state, the second input modality including head tracking or hand tracking. Operation 708 includes moving a position indicator on a display of a display device using the second input modality.

Figure 8A:
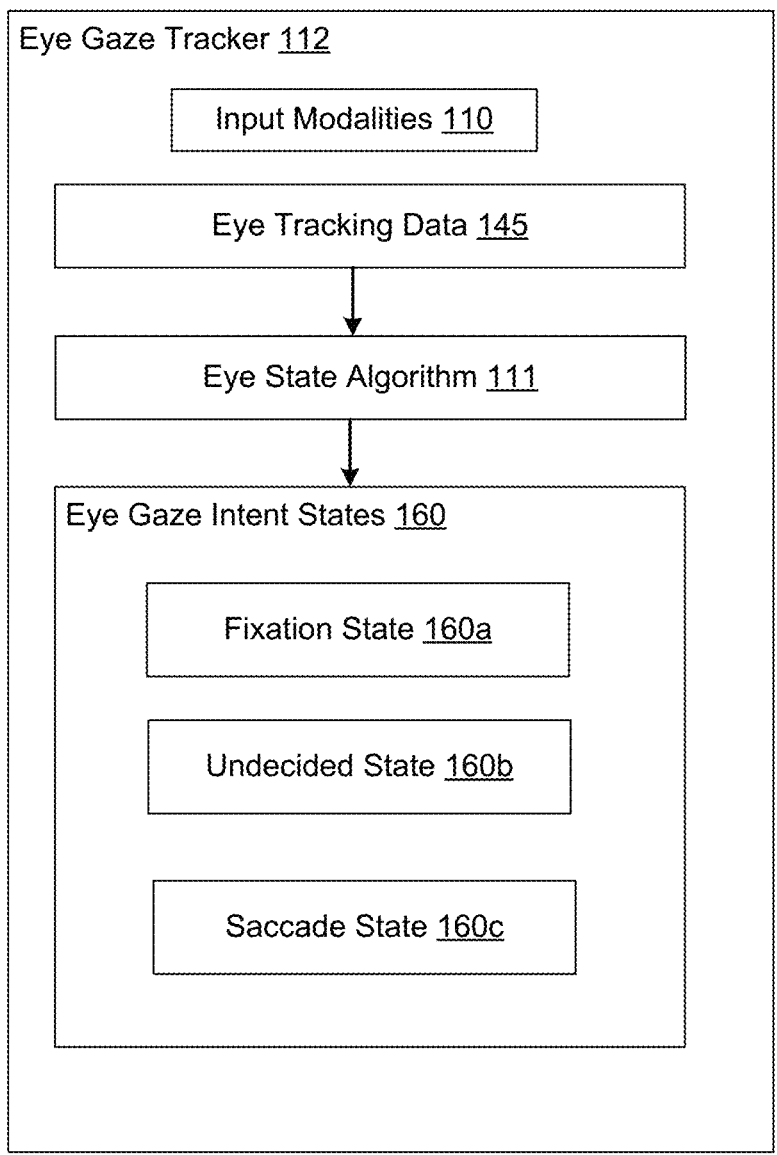
FIG. 8A illustrates an example of an eye gaze tracker according to an aspect.
Figure 8B:
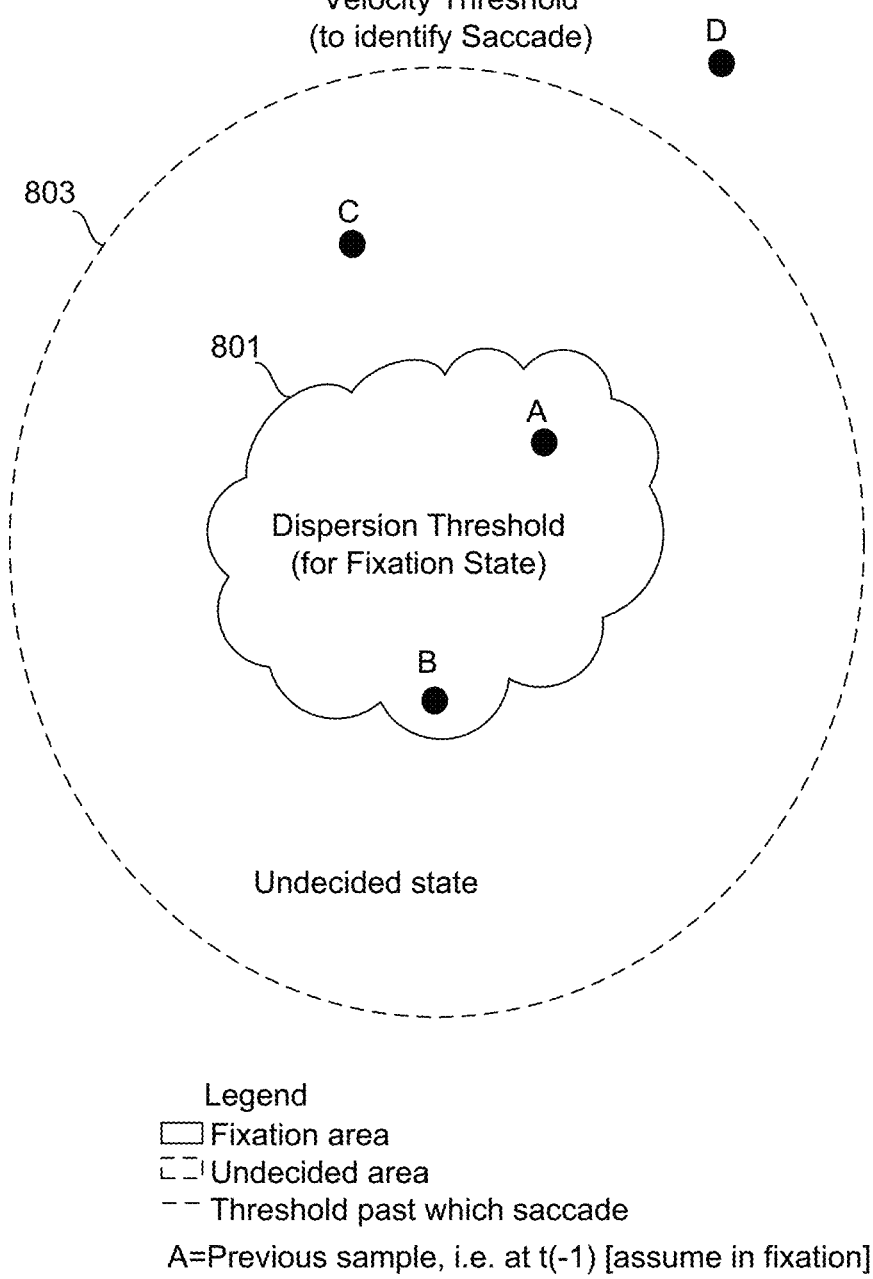
FIG. 8B illustrates a graphical depiction of a fixation state, a saccade state, and an undecided state according to another aspect.

FIG. 8A illustrates an eye gaze tracker 112 according to an aspect. The eye gaze tracker 112 may compute one or more user intent signals relating to a fixation state 160a, a saccade state 160c, and an undecided state 160b. FIG. 8B illustrates a graphical representation of the fixation state 160a, the saccade state 160c, and the undecided state 160b along their relationship between a dispersion threshold 801 (e.g., a first threshold) and a velocity threshold 803 (e.g., a second threshold). In some examples, the eye gaze tracker 112 may detect an undecided state 160b when new eye-tracking samples are not classified as the saccade state 160c or the fixation state 160a. In some examples, the eye gaze tracker 112 may execute an eye state algorithm 111. The eye state algorithm 111 may be a combination of a first algorithm (e.g., a velocity-threshold identification (I-VT) algorithm) that can identify one or more saccades, and a second algorithm (e.g., dispersion-threshold identification (I-DT) algorithm), but the eye state algorithm 111 is modified to classify one or more samples as an undecided state 160b when the samples achieve a dispersion threshold 801. In some examples, the techniques of FIGS. 8A to 11 for determining eye gaze intent states 160 may be used in any of the examples discussed herein.

By classifying eye movements as a fixation state 160a, a saccade state 160c, and/or an undecided state 160b, the eye gaze tracker 112 may provide one or more technical advantages of increasing the accuracy of representing user intent, which can increase the performance of an interaction system that uses eye gaze intent states 160 as inputs. In some examples, the eye state algorithm 111 may provide one or more technical advantages of generating a stable ray for eye gaze trackers, which may also provide pointing information (and, in some examples, gesture and other intent information on a frame-by-frame basis).

Eyes usually look around in fixations and saccades. Fixations are when they are looking at a region with focus and barely moving around. Saccades are when they make sudden jumps, often between fixations. While the user usually jumps between these states, there can be a fuzzy state in between them. In some examples, the eye state algorithm 111 may determine an eye gaze intent state 160 as the undecided state 160b when the eye movement corresponds to a state between the fixation state 160a and the saccade state 160c. In some examples, the undecided state 160b is an intermediate state.

The eye state algorithm 111 uses a dispersion threshold 801 to classify one or more samples (e.g., A, B) as the fixation state 160a, and the eye state algorithm 111 classifies saccades (e.g., D) after achieving a velocity threshold 803. In between the fixation state 160a and the saccade state 160c, the eye state algorithm 111 may classify new eye tracking samples as an undecided state 160b. In the undecided state 160b, if the new sample (e.g., C) lies within the dispersion threshold, the eye state algorithm 111 may add samples to a window until a threshold is achieved (e.g., greater than the duration threshold in I-DT) to classify the window as a fixation. If not, the eye state algorithm 111 may manage the samples in the window while searching for possible new fixations. The eye state algorithm 111 includes a previous fixation cache, which can identify whether the user is looking directly at a previous fixation and use the previous window from the previous fixation to re-create fixation stability.

In some examples, the eye state algorithm 111 combines the fixation identification from I-DT with saccade identification from I-VT. The thresholds (e.g., for both) may be selected, where a narrow band exists (e.g., undecided state 160b) in which new samples are not classified as fixations or saccades. In some examples, the eye state algorithm 111 provides a technical advantage of classifying movements that are not determined to be fixating or saccading, which can more accurately represent user intent. In cases where their eyes relax (e.g., especially after long periods of stress), the undecided state 160b may represent those movements. In some examples, the state is considered undecided because, in some examples, the user has chosen to look slightly away from the previous fixation and might choose to look away (e.g., saccade) or fixate at the new position next. Combined with fixation caches, the undecided state 160b may provide one or more technical benefits of allowing for smooth interpolation amongst nearby fixations points, thereby providing robustness to the user intent detection system.

Figure 9:
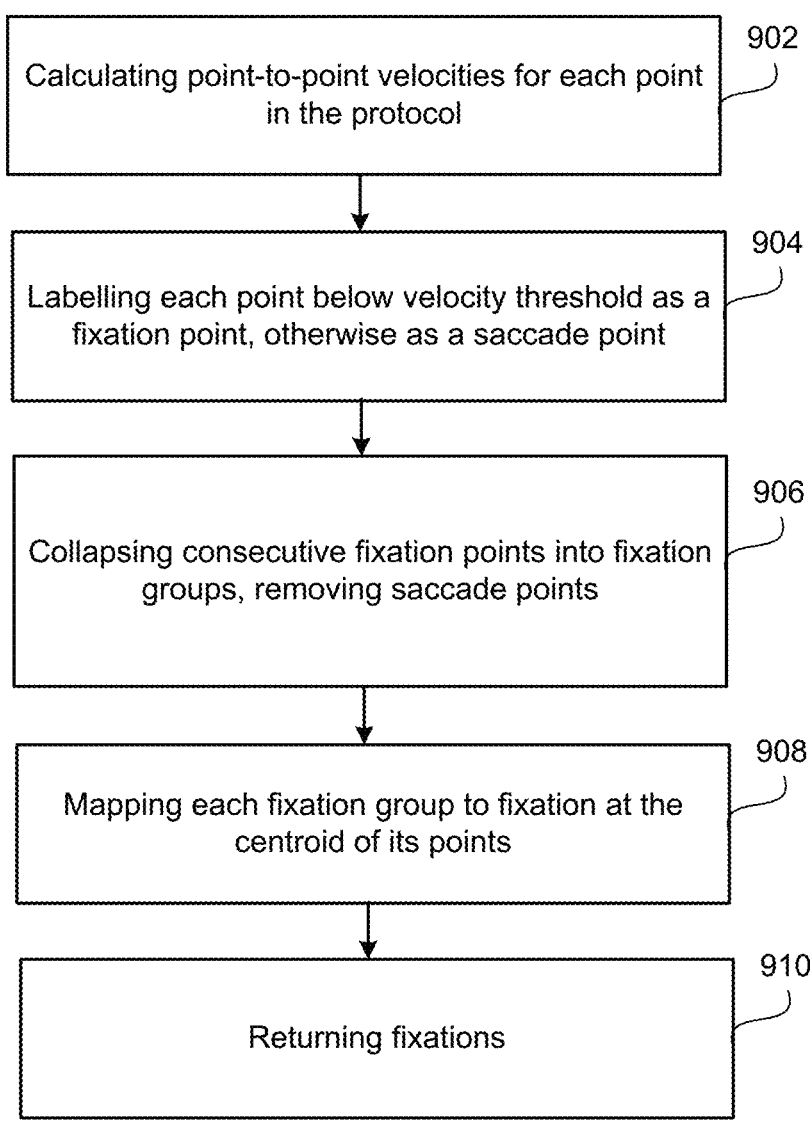
FIG. 9 illustrates a flowchart depicting example operations of a velocity-threshold identification (I-VT) algorithm according to an aspect.

FIG. 9 illustrates a flowchart 900 depicting example operations of an I-VT algorithm according to an aspect. The flowchart 900 may depict operations of a computer-implemented method. Although the flowchart 900 of FIG. 9 illustrates the operations in sequential order, it will be appreciated that this is merely an example, and that additional or alternative operations may be included. Further, operations of FIG. 9 and related operations may be executed in a different order than that shown, or in a parallel or overlapping fashion.

Operation 902 includes calculating velocities (e.g., point-to-point velocities) for a point (e.g., each point). Operation 904 includes labeling a point (e.g., each point) below a velocity threshold as a fixation point, otherwise as a saccade point. Operation 906 includes collapsing consecutive fixation points into fixation groups, thereby removing saccade points. Operation 908 includes mapping a fixation group (e.g., each fixation group) to fixation at the centroid of its point. Operation 910 includes returning fixations.

Figure 10:
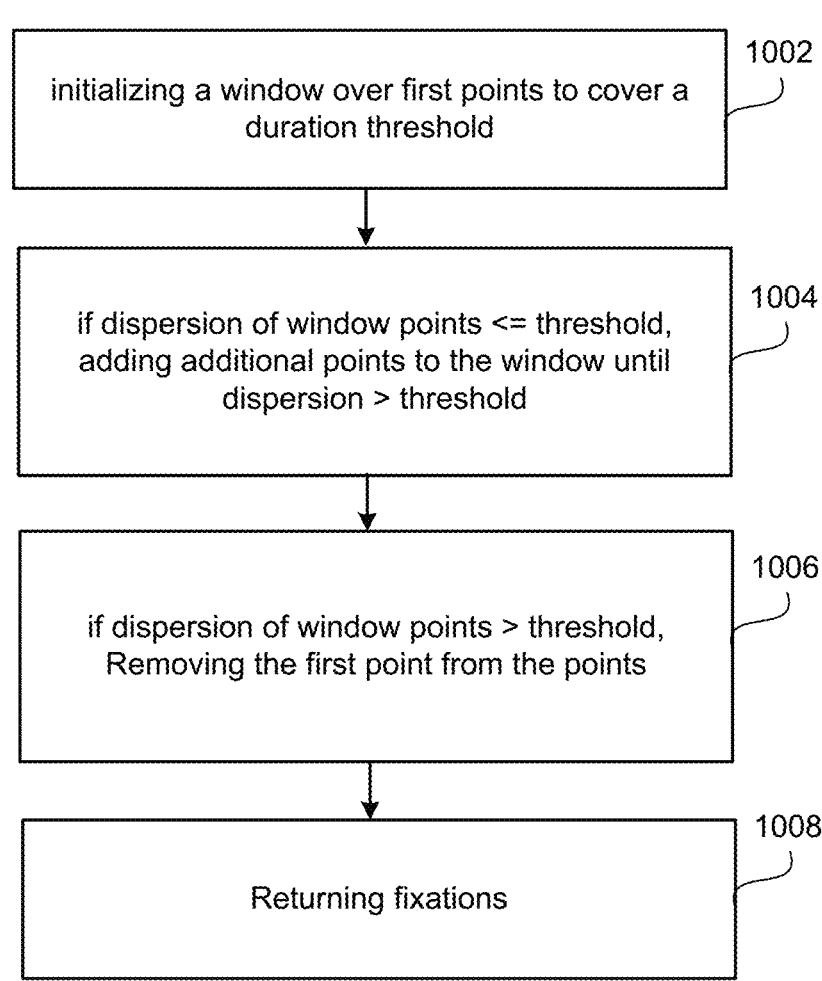
FIG. 10 illustrates a flowchart depicting example operations of a dispersion-threshold identification (I-DT) algorithm according to an aspect.

FIG. 10 illustrates a flowchart 1000 depicting example operations of an I-DT algorithm according to an aspect. The flowchart 1000 may depict operations of a computer-implemented method. Although the flowchart 1000 of FIG. 10 illustrates the operations in sequential order, it will be appreciated that this is merely an example, and that additional or alternative operations may be included. Further, operations of FIG. 10 and related operations may be executed in a different order than that shown, or in a parallel or overlapping fashion.

Operation 1002 includes initializing a window over first points to cover a duration threshold. Operation 1004 includes, in response to the dispersion of window points being equal to or less than a threshold, adding additional points to the window until the dispersion is greater than the threshold. A fixation may be at the centroid of the window points. Operation 1006 includes, in response to the dispersion of window points being greater than the threshold, removing the first point from the points. Operation 1008 includes returning the fixations.

An example of the eye state algorithm 111 is illustrated below as Algorithm 1.

---

Algorithm 1

---

```
Paython
# Tunable Parameters
Dispersion_Threshold ~= Human look dispersion angular
Duration_Threshold ~= 100ms+ (from literature)
Velocity_Threshold ~= Loosely related to element spacing and human behavior
#Variables
O                          : Vector3 = old eye tracking sample
N                          : Vector3 = new eye tracking sample
Window                     : List<Vector3> = window of currently used eye tracking samples
Old_window                 : List<Vector3> = buffer of saved eye tracking samples
```

-continued

Algorithm 1

```
State                    : Enum = Current eye tracking state b/w fixation, saccade, and undecided
SMA                      : Vector3 = Simple moving average with a window size ~<100ms of raw eye
tracking data
Def GetEyeRay (Vector3 N):
                if Dispersion (window, N) <= Dispersion_Threshold and len(window) >=
                duration_Threshold:
                                # Fixation sate
                                # In this state, we will keep adding samples to the window so we
                can get a stable centroid
                                                state := Fixation
                                                old_window.Clear( )
                                                window.Add(N)
Return Centroid(window)
Elif Dispersion (old_window, N) <= Dispersion_Threshold and
Len(old_window) >= Duration_Threshold:
                                # We just fixated on something we were fixating on before, so resume the old fixation
using the previous fixation cache
                                state := Fixation
                                window := Old_window
                                old_window.Clear( )
                                window.Add(N)
                                return Centroid (window)
Elif Velocity (N, 0) >= Velocity_Threshold:
                                # Saccade state
                                if len (window) >= Duration_Threshold && state == Fixation:
                                                old_window := window
                                state ;= Saccade
                                window.Clear( )
                                window.Add(N)
                                return SMA
Else:
                                # Undecided state
                                if len(window) >= Duration_Threshold && state == Fixation:
                                                old_window := window
                                state := Undecided
                                window.Add(N)
                                while Dispersion(window) > Dispersion_Threshold:
                                                # Remove elements till we're at the smallest window within the dispersion
threshold
                                                window.RemoveAt(0)
                                if len(window) > (Duration_Threshold / 2):
                                                # in case we have a lot of close samples, we can use the centroid of those to
provide some stability
                                                return (Centroid(window) + SMA) / 2
                                                                return SMA
```

Figure 11:
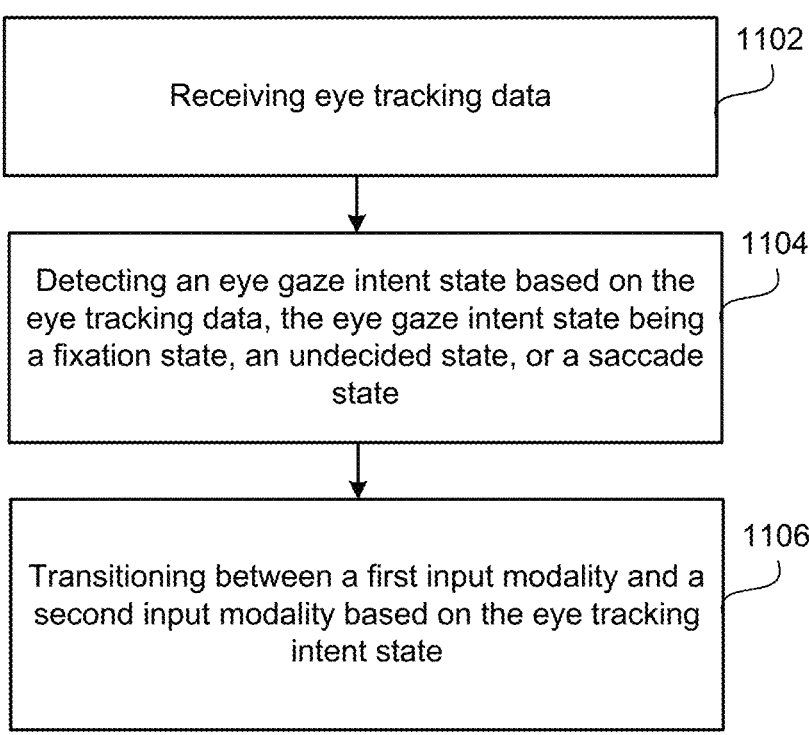
FIG. 11 illustrates a flowchart depicting example operations of computing an eye gaze intent state according to an aspect.

FIG. 11 is a flowchart 1100 depicting example operations of a display device for determining eye gaze intent. The flowchart 1100 may depict operations of a computer-implemented method. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion.

Operation 1102 includes receiving eye tracking data from an eye gaze tracker. Operation 1104 includes detecting an eye gaze intent state based on the eye tracking data, the eye gaze intent state being a fixation state, an undecided state, or a saccade state. Operation 1106 includes transitioning between a first input modality and a second input modality based on the eye gaze intent state.

Figure 12:
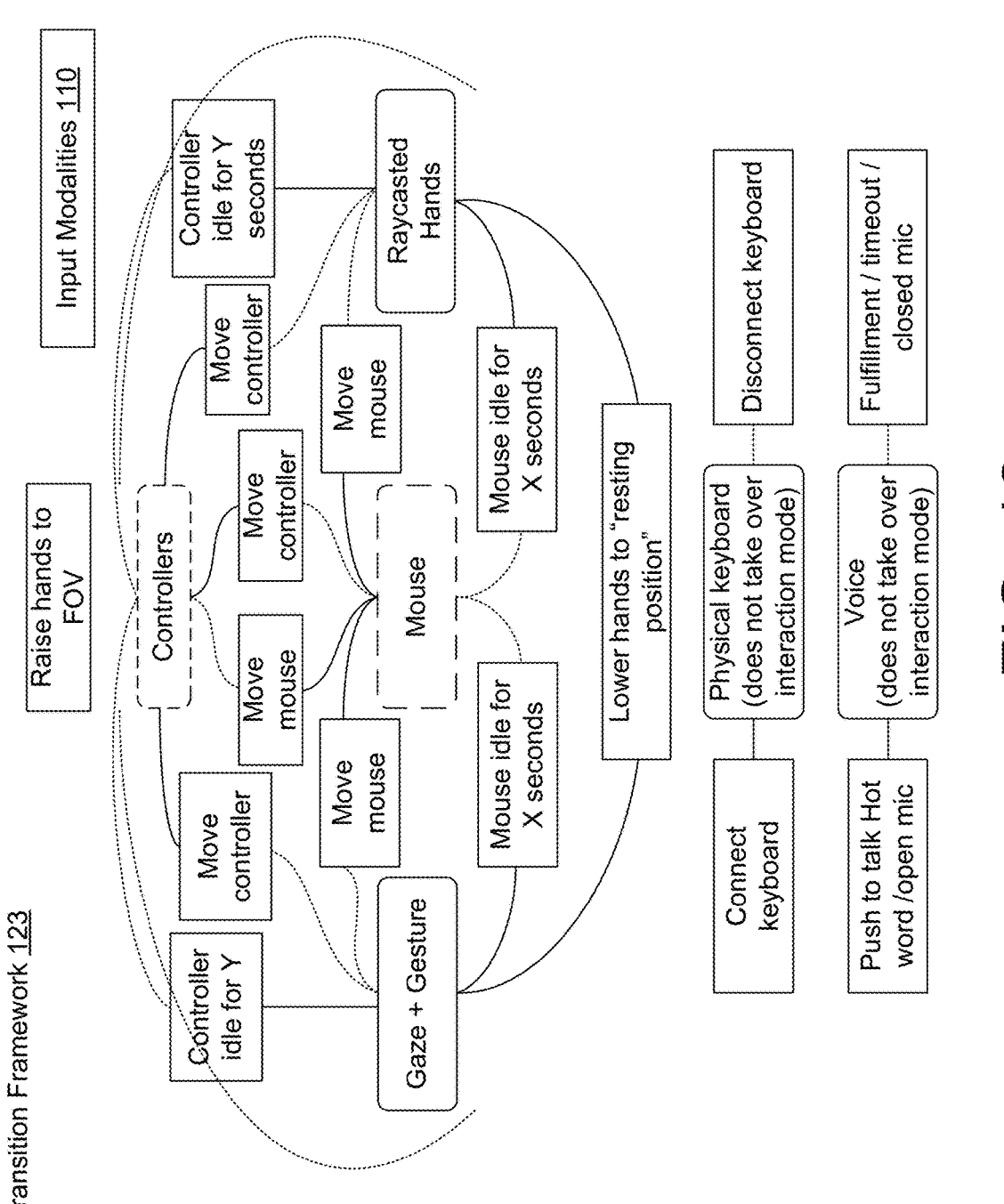
FIG. 12 illustrates an example of a transition framework according to an aspect.

FIG. 12 illustrates an example of the transition framework 123. In some examples, the input transition engine 122 is configured to use one or more portions of the transition framework 123. In some examples, the transition framework 123 can be referred to as a transition model. In some examples, the transition framework 123 may include information that defines transitions between input modalities 110, information on how input modality 110 may coexist without conflicting information on a decision structure that covers available transitions. In some examples, the transitions are considered interaction transfer functions. An input modality 110 may be an input method that can provide input events to the display device 100, which can be mapped to input primitives. In some examples, the transition framework 123 (or a portion thereof) may be used in combination with any of the other features that describe the transitions between an eye pointer and a head or a hand pointer, an eye pointer and an input device, a head pointer and a hand pointer, etc.

An input primitive may be an action that can be performed that includes information about a system context (e.g., point, confirm, scroll, and/or zoom, etc.). An input event may be a base-level intent that originates from an input modality 110, and an input event may be mapped to primitives to be interpreted by the display device 100. Examples of input events may be hand-joint locations, eye gaze coordinates, or key presses. An input interaction system that utilizes more than one input method (e.g., multiple input modalities 110) may be referred to as multimodal. In some examples, a natural input may be used to describe an interaction that does not involve an external component (e.g., hands, eyes, or voice may be considered natural inputs).

User-driven transitions may be transitions that occur as a result (e.g., a direct result) of user action. Examples may be manual interaction switching from settings, moving the mouse or a controller, or shifting the hands between resting and ray-casting zones. System-driven transitions may be transitions that occur without direct user action. Examples are low controller battery, loss of calibration (e.g., eyes), loss of hand tracking after a period of time, or loss of device pairing. In some examples, the display device may trigger a recovery flow to select a different input modality 110.

Independent interaction modalities may be used as a standalone method to access the system, which may include supporting primitives including pointing and selection. In some examples, the input modalities 110 are exclusive so when one is active the other input modalities 110 are inactive. Independent interaction modalities may include gaze (e.g., eye or head) and gestures (e.g., hand), ray-casted hands, and/or controllers. Complementary interaction modalities may be input modalities 110 that can operate in conjunction with an independent interaction modality. In some examples, a complementary interaction modality may take over an active interaction modality except in the case of a direct conflict. Complementary interaction modalities may include mouse, trackpad, physical keyboard, voice selection, and/or voice typing.

With respect to hand tracking and/or gestures while typing, hand gestures may be temporarily paused for a period of time after a key is pressed to reduce false positives. In some examples, the input transition engine 122 may transition to a controller 152 when a gesture or button is not activated by another interaction modality, a controller capacitive sensor is activated, and/or a controller button, trigger, or joystick is activated. In some examples, the input transition engine 122 may transition from a controller 152 when the controller has been idle for a certain period of time (e.g., the capacitive sensor is not activated, the buttons, trigger, joystick are not activated). In terms of field of view (FoV) hand detection, the detection of hands 146 within the user's FoV for the purpose of switching between ray-casted and resting hands may be executed by a perception model or heuristics.

With respect to hand tracking and gestures while using a computer mouse 156, the input transition engine 122 may pause hand gestures for a period of time after the computer mouse 156 is moved or clicked. If the user wants to transition back to hands before the timeout, they can shake their hand to force a transition. The input transition engine 122 may transition to a computer mouse 156 when a gesture or button is not being activated by another interaction modality, movement offset is more than a threshold amount (e.g., should not switch to a computer mouse 156 if you bump your desk), and/or a mouse button is pressed. The input transition engine 122 may transition from a computer mouse 156 when mouse buttons are not being pressed, the computer mouse 156 has been idle for a period of time (e.g., idle is when no buttons are pressed, no scrolling, no movement offset more than a threshold amount).

In some examples, the input transition engine may transition from gaze to hand ray when the hand within a field of view (FoV) threshold of a threshold degree, head-mounted display is facing content within a threshold degree, the hand 146 is aiming at content within a threshold degree, the hand 146 is aiming within a threshold degree of FOV center (or gaze point), or the palm is facing outward. In some examples, the input transition engine 122 may transition from hand ray back to gaze when the hand aiming exceeds a threshold amount from FOV center (or gaze point) or the hand exits a FOV threshold of a certain degree, or the palm is no longer facing outwards.

Table 1 below illustrates pointer positions during transitions. When transitioning between input modalities, the cursor may follow the following rules to decide where it is positioned after the switch. Previous methods are in the rows, and the new methods are in the columns.

TABLE 1

| Pointing Method Transition | Eye Gaze | Head Gaze | Mouse | Raycasted Hands | Controllers |
|---|---|---|---|---|---|
| Eye Gaze | N/A | N/A | Apply mouse offset starting from pre-transition eye gaze position | Snap cursor to hand raycast position | Snap cursor to controller raycast position |
| Head Gaze | N/A | N/A | Apply mouse offset starting from pre-transition head gaze position | Snap cursor to hand raycast position | Snap cursor to controller raycast position |
| Mouse | Snap cursor to eye gaze position | Snap cursor to head gaze position | N/A | Snap cursor to hand raycast position | Snap cursor to controller raycast position |
| Raycasted Hands | Snap cursor to eye gaze position | Snap cursor to head gaze position | Snap cursor to the middle of the screen | N/A | Snap cursor to controller raycast position |
| Controllers | Snap cursor to eye gaze position | Snap cursor to head gaze position | Snap cursor to the middle of the screen | Snap cursor to hand raycast position | N/A |

Table 2 below illustrates examples of protections against false positives by identifying certain actions executed by the input transition engine.

TABLE 2

| False positive scenario | Mitigation |
|---|---|
| User performs a long dragging gesture, which moves their hands into the transition zone, causing an unintentional switch | If a gesture is being actively held, no transition will occur |
| User is using resting gestures and looks down at their hands, causing an unintentional switch to raycasting. (Resting hands in FOV, but lowered) | Transitioning to raycasted hands requires a hand to both be centered in the FOV and be raised above a certain threshold |
| User is using resting gestures and looks down at their hands, causing an unintentional switch to raycasting. (Resting hands in FOV, but lowered) | Transitioning to raycasted hands requires a hand to both be centered in the FOV and be raised above a certain threshold |
| User is using raycasted hands and tries to select something low to the ground, requiring them to position their hands lower, causing an unintentional switch to resting. (Raycasted hands in FOV, but lowered) | Transitioning to rested hands requires hands to both not be centered in the FOV and not be raised above a certain threshold |
| User is using raycasted hands and moves just their head to glance at something to their side causing an unintentional switch to resting. (Raycasted hands out of FOV, but raised) | Transitioning to rested hands requires hands to both not be centered in the FOV and not be raised above a certain threshold |
| Hand tracking position/ rotation jitters or drifts in error, moving pointer into/out of switching zone unintentionally | Hysteresis will be used in the transition boundaries to prevent this. Ideally the zone in which a modality is active will be slightly wider than what the user should need when using that mobility, meaning they shouldn't have to linger near the edge where jitter/drift can force them to transition |
| While using an interaction method besides controller, the desk or controller is bumped causing an accidental transition | Controller IMU is not used as a transition criteria. Buttons, triggers, joysticks, or capacitive sensors must be activated |
| User bumps into their desk/mouse, causing an accidental switch to mouse | Require a threshold of movement before switching to the mouse. However, this addresses only small bumps/vibrations |
| While the user is using the mouse, hand tracking misinterprets their clicks as pinches, causing hands to dispatch unintentional input events | When the mouse is active, hand gestures will be paused so as not to disrupt the mouse input |

TABLE 2-continued

| False positive scenario | Mitigation |
|---|---|
| User pauses their mouse usage while reading the screen and the timeout occurs, switching back to hands and causing unintentional hand gestures to be dispatched | The timeout will be made relatively long to reduce these accidental transitions. If the user wants to switch back sooner than the timeout, they can shake their hand to perform an immediate transition |

Figure 13:
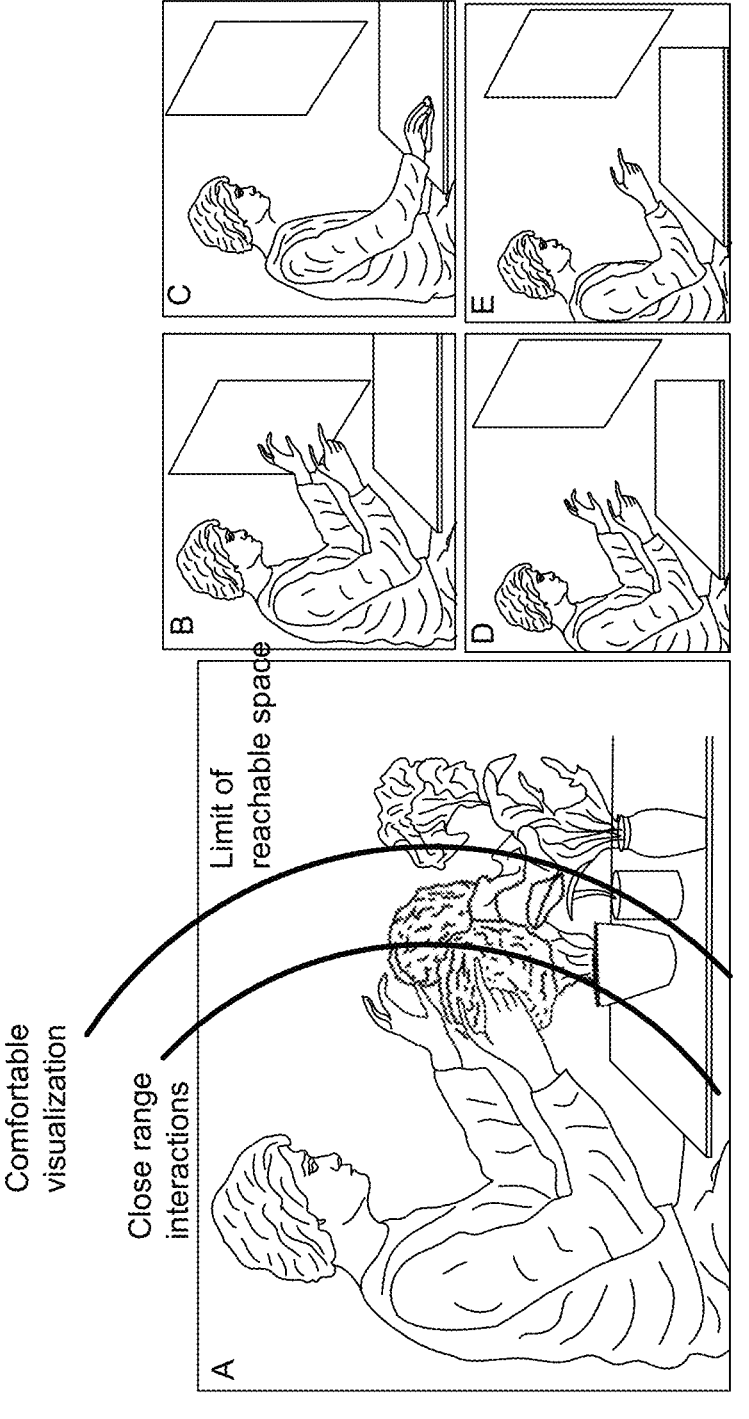
FIG. 13 illustrates a computing environment that can use multiple input modalities for the same or different tasks according to an aspect.
Figure 14B:
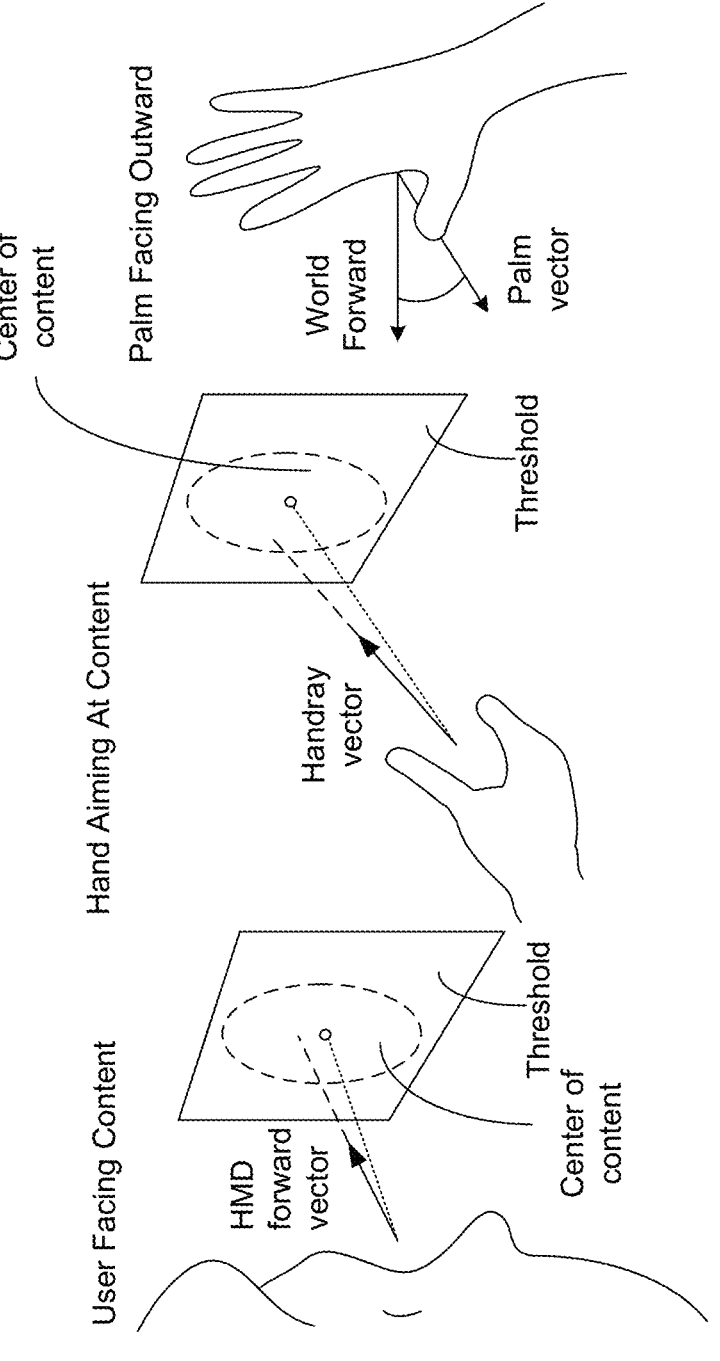
Figure 14C:
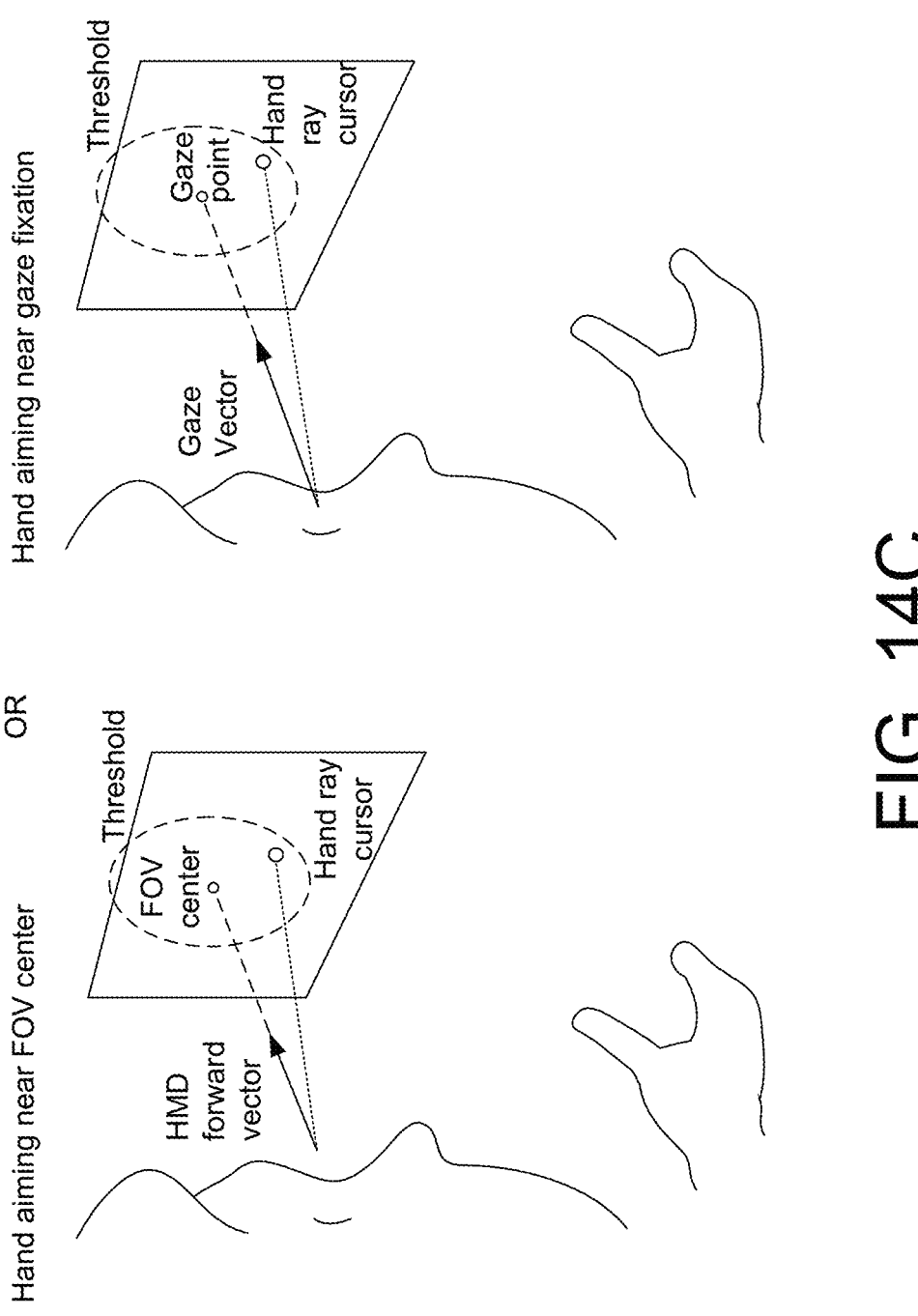

Referring to FIG. 13, the ergonomic spaces around a person inside an XR environment may be primarily determined by the comfortable visualization range. Referring to FIG. 13, within the intersection of reachable space and comfortable visualization, range interactions with our own body may be performed, and direct manipulations of the content may be enabled. FIGS. 14A to 14C illustrate examples of heuristics for a field of view (FoV) check (FIG. 14A), additional naïve checks (FIG. 14B), and multimodal intent checks (FIG. 14C).

Figure 15A:
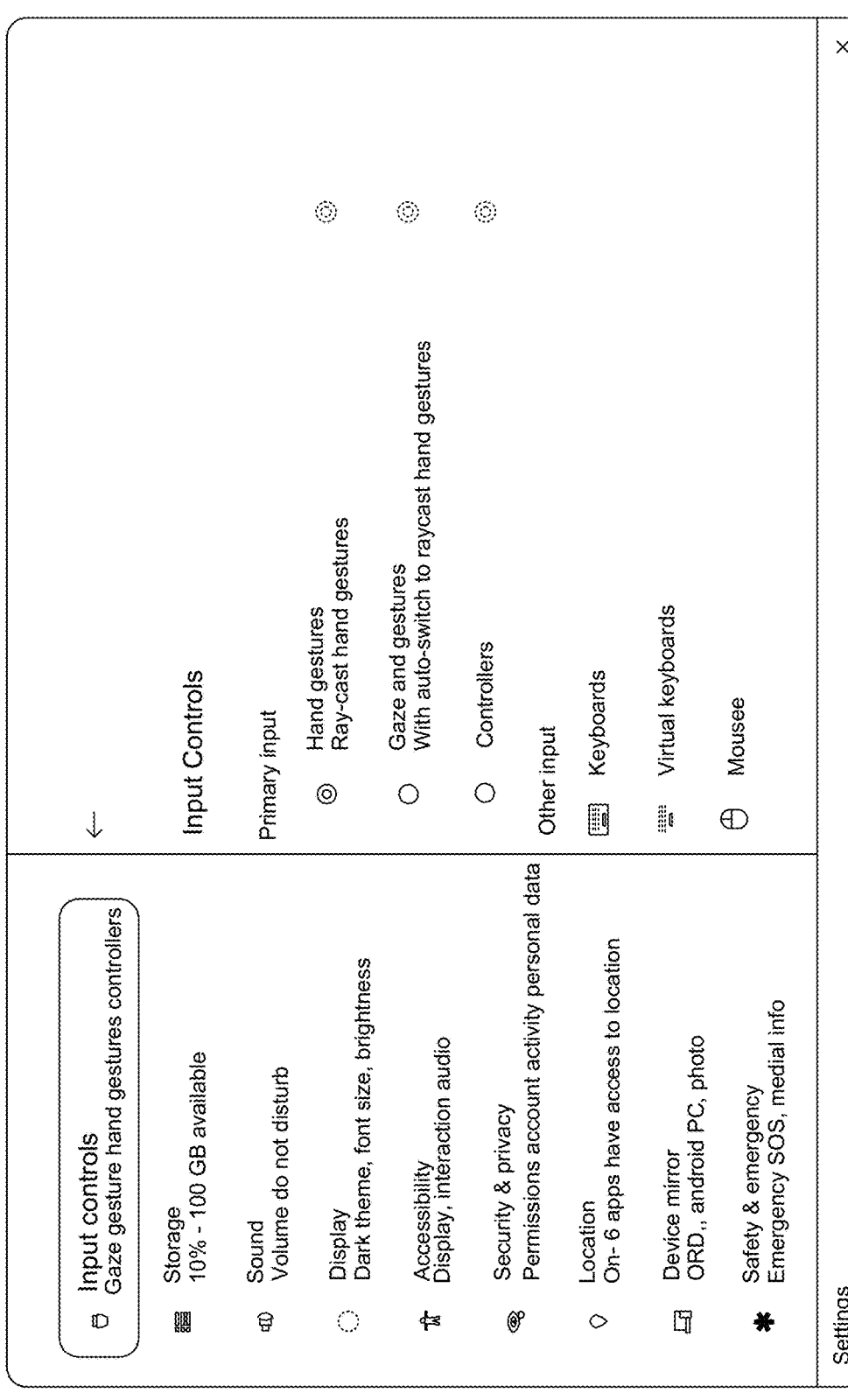
FIGS. 15A to 15C illustrate example user interfaces for configuring transition settings according to an aspect.
Figure 15B:
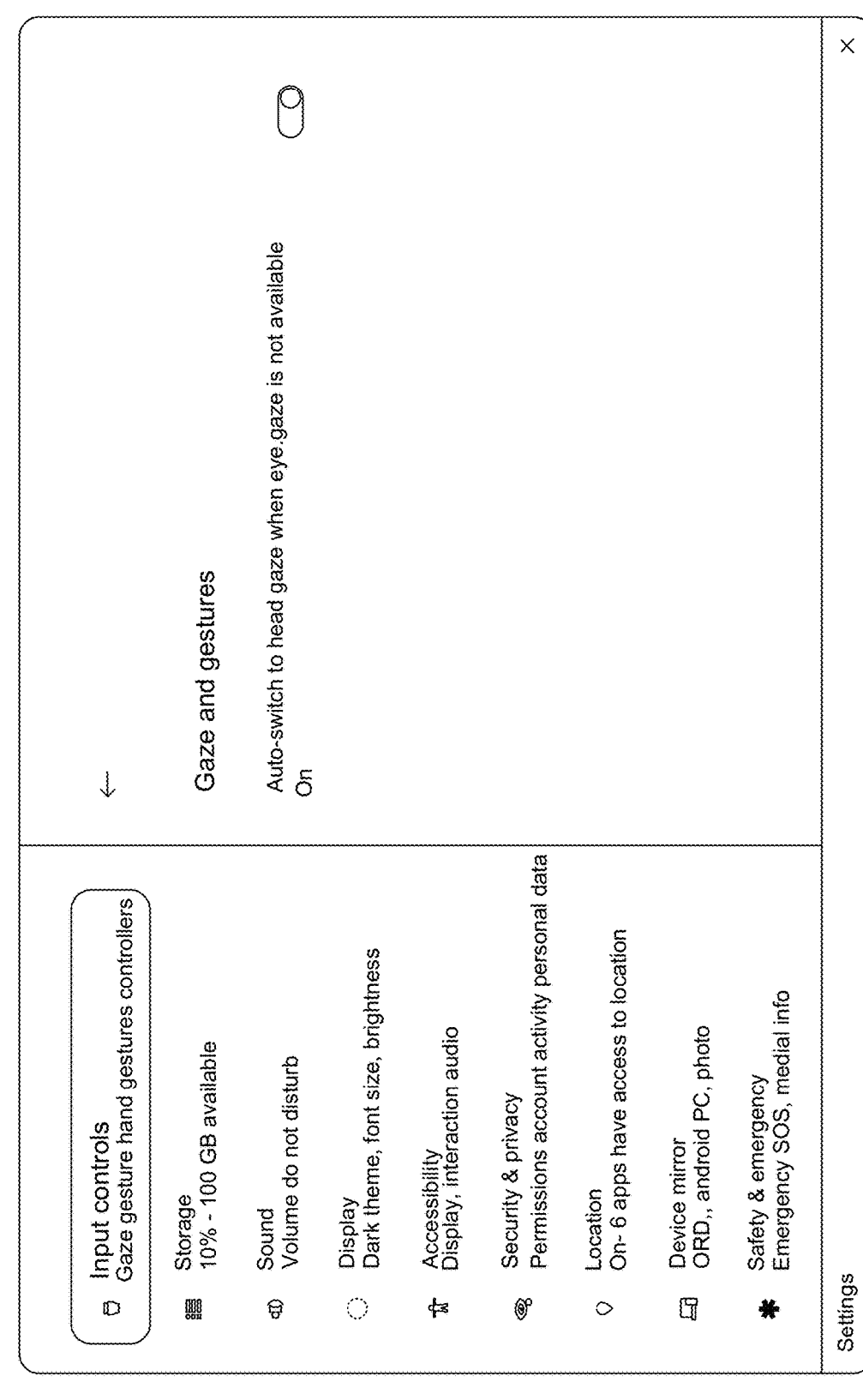
Figure 15C:
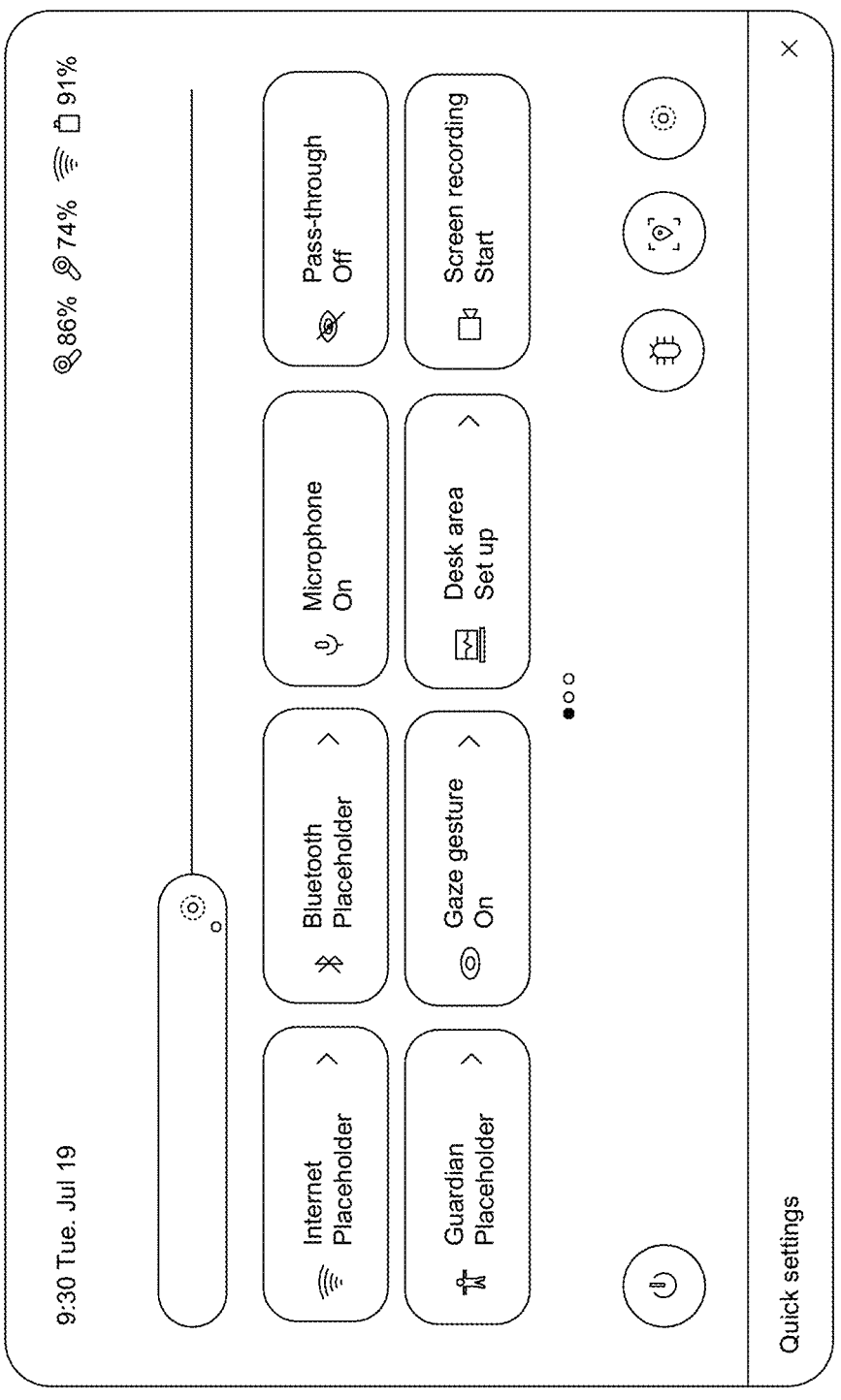

FIGS. 15A to 15C illustrate example user interfaces for defining one or more settings relating to input modalities 110. In some examples, the display device 100 may display an input settings interface 1540 with one or more configuration options such as default interaction method (e.g., the user can select between hand ray-casting and controllers 152) and/or select/deselect automatic transitions (e.g., this option may be available when ray-casted hands are selected as the default interaction method and the gaze and gesture modality is available). In some examples, ray-casted hands may be a default interaction method, automatic transitions may be enabled, and, in some examples, the same input modality is used for both pointing and selection. In some examples, an input modality 110 for pointing is different from an input modality 110 for selection. In some examples, custom combinations of pointing and selection modalities may be manually configured in settings. In some examples, gaze may refer to either head or eye gaze depending on the user's configuration.

Figure 16:
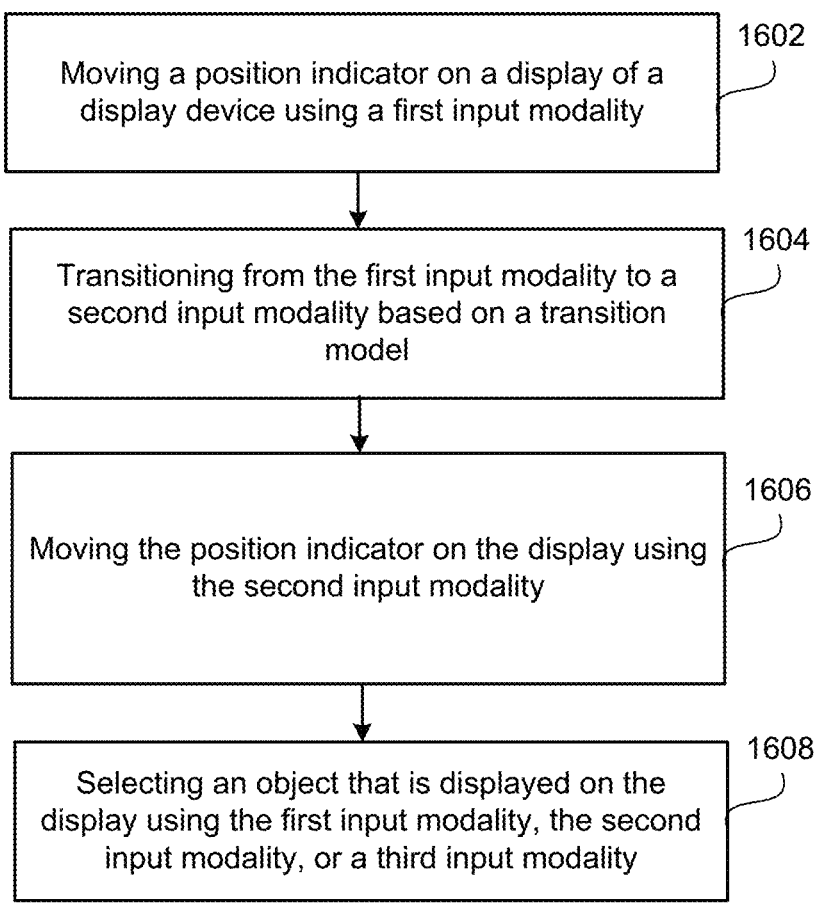
FIG. 16 illustrates a flowchart depicting example operations of transitioning between multiple input modalities for interacting with an object on a display device.

FIG. 16 is a flowchart 1600 depicting example operations of a display device for transitioning between two input modalities using a transition framework (e.g., a transition model) according to an aspect. The flowchart 1600 may depict operations of a computer-implemented method. Although the flowchart 1600 of FIG. 16 illustrates the operations in sequential order, it will be appreciated that this is merely an example, and that additional or alternative operations may be included. Further, operations of FIG. 16 and related operations may be executed in a different order than that shown, or in a parallel or overlapping fashion.

Operation 1602 includes moving a position indicator on a display of a display device using a first input modality. Operation 1604 includes transitioning from the first input modality to a second input modality based on a transition model. Operation 1606 includes moving the position indicator on the display using the second input modality. Operation 1608 includes selecting an object that is displayed on the display using the first input modality, the second input modality, or a third input modality.

Figure 17A:
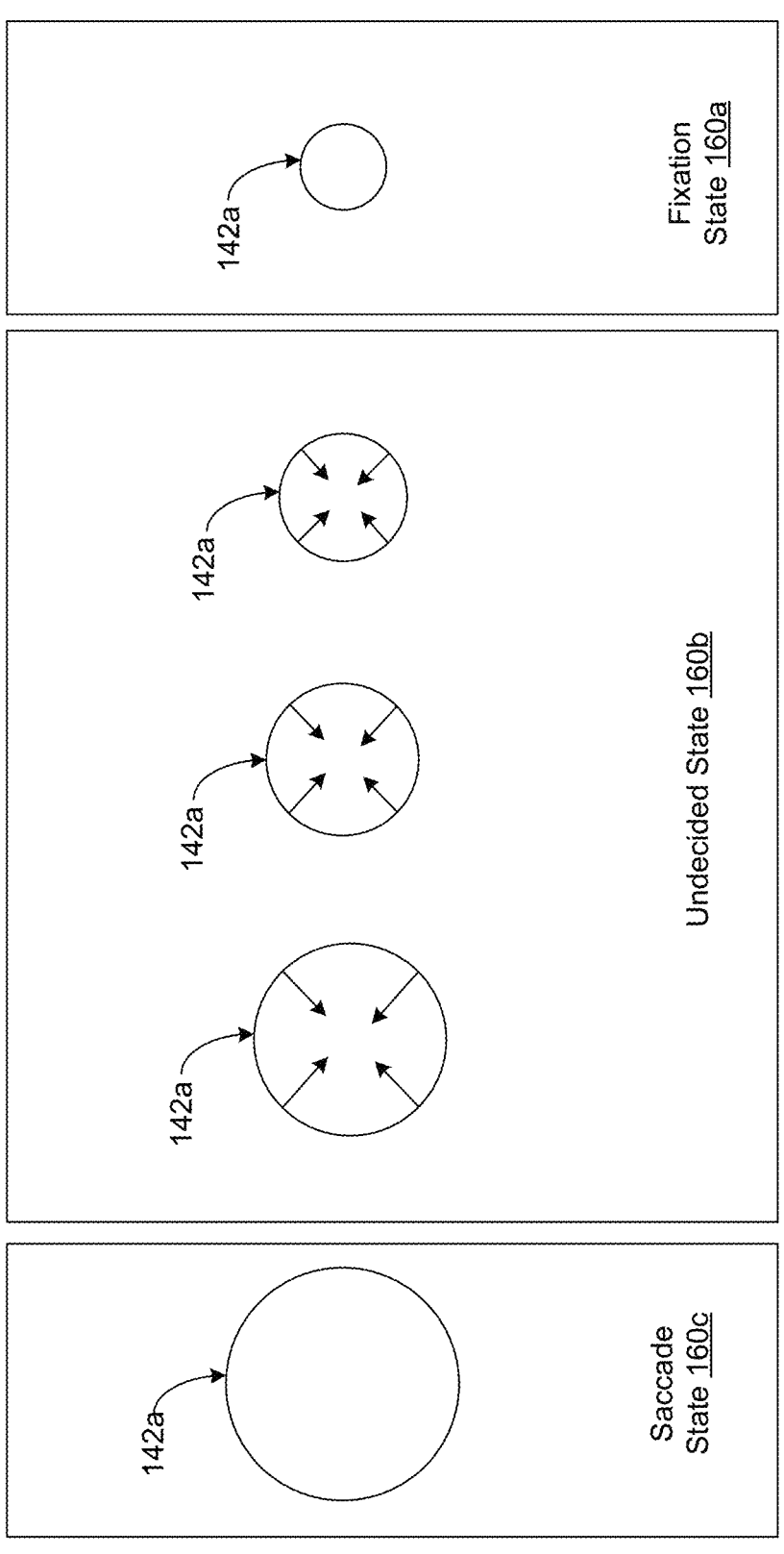
FIG. 17A illustrates examples of a position indicator according to different eye gaze intent states according to an aspect.
Figure 17B:
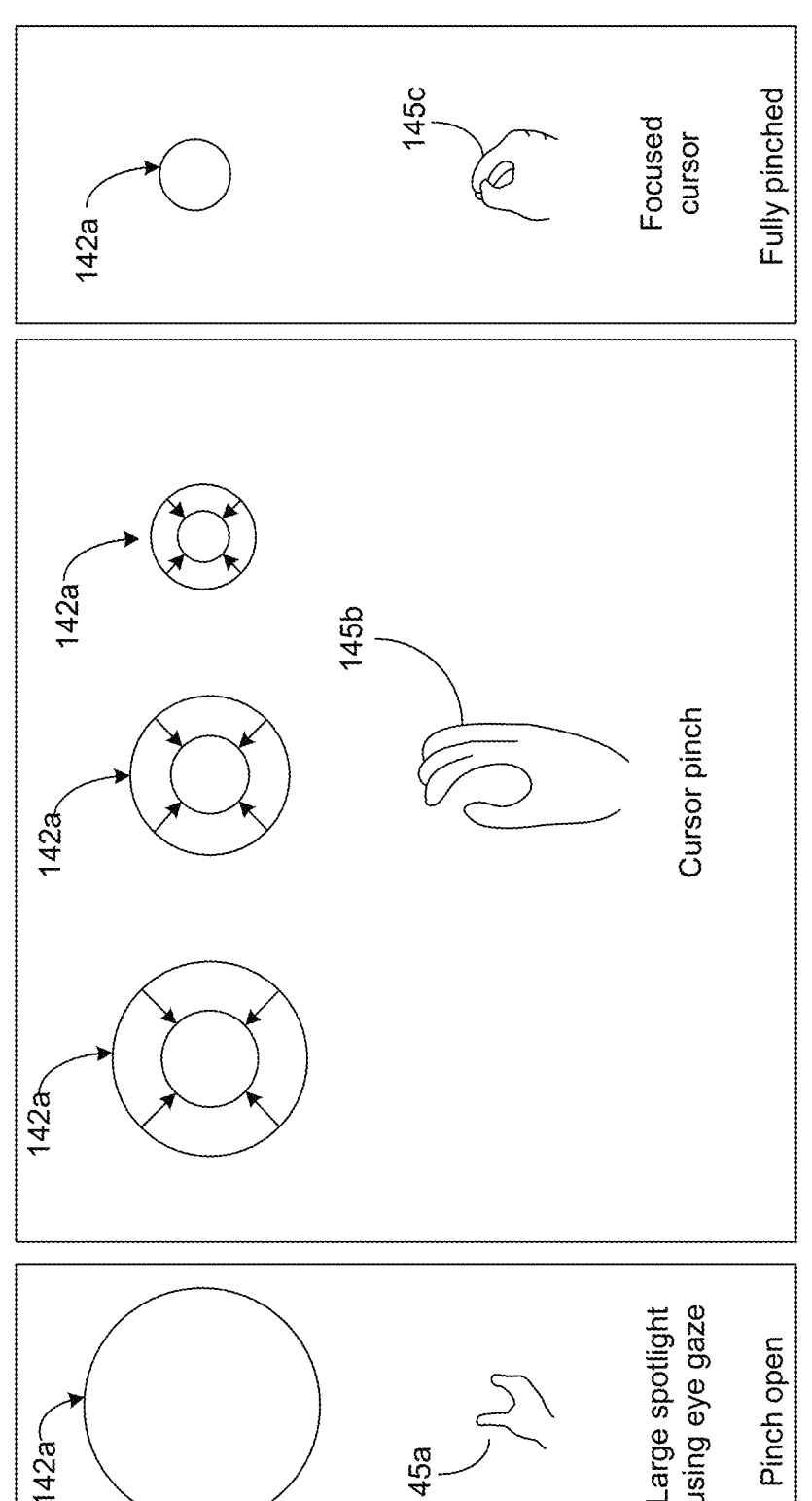
FIG. 17B illustrates examples of a position indicator according to different hand gestures according to another aspect.

FIG. 17A illustrates a gaze spotlight indicator 142a that can change a display appearance and/or size based on the eye gaze intent states 160. The gaze spotlight indicator 142a is an example of the position indicator 142. FIG. 17B illustrates a gaze spotlight indicator 142a that can change a size based on a hand gesture. In some examples, the gaze spotlight indicator 142a is referred to as a gaze indicator. In some examples, the spotlight indicator 142a may be referred to as a UI element (e.g., a UI element that indicates a position on a display screen) or a cursor. In some examples, the spotlight indicator 142a may be referred to as a pinch cursor. A pinch cursor is a cursor that is activated based on a pinching gesture and can change a shape and/or appearance based on the state of the user's hand.

In some examples, as shown in FIG. 17A, the size and/or characteristics of the gaze spotlight indicator 142a may change based on the eye gaze intent state 160 being the saccade state 160c, the undecided state 160b, or the fixation state 160a. In some examples, in response to the eye gaze intent state 160 being the saccade state 160c, the input transition engine 122 may display the spotlight indicator 142a as a UI element (e.g., a circle, square, or other shape) with a first size. In some examples, when in the saccade state 160c, the gaze spotlight indicator 142a is a relatively large hazy spotlight.

In some examples, in response to the eye gaze intent state 160 being the undecided state 160b, the input transition engine 122 may display the gaze spotlight indicator 142a as a UI element (e.g., a circle or other shape) with a second size (e.g., where the second size is smaller than the first size) with one or more graphics (e.g., one or more arrows that point to the center of the UI element). In some examples, display characteristic(s) of the UI element (e.g., the color, tint, or shading) may change when the eye gaze intent state 160 transitions from the saccade state 160c to the undecided state 160b. In some examples, when in the undecided state 160b, the gaze spotlight indicator 142a may gradually focus the user's eye towards the center of the cursor as the input transition engine 122 obtains more intent samples in the undecided state 160b.

As the eye gaze intent state 160 becomes closer to the fixation state 160a, the size of the UI element may continue to become smaller and/or the display characteristics may continue to change. In response to the eye gaze intent state 160 being the fixation state 160a, the input transition engine 122 may display the gaze spotlight indicator 142a as a UI element with a third size (e.g., where the third size is smaller than the second size) and may adjust the display characteristic(s) to be different from the display characteristic(s) of the UI element when the UI element is displayed in the undecided state 160b or the saccade state 160c. When in the fixation state 160a, the spotlight indicator 142a may be referred to as a focused spotlight.

In some examples, the spotlight indicator 142a (and its changing size and appearance) may help avoid the midas touch because the user may freely look around without worrying about chasing the cursor. In some examples, when the input transition engine 122 detects an intent to fixate, the spotlight indicator 142a becomes smaller, thereby providing visual feedback on the location where their eye gaze is pointing.

FIG. 17B illustrates a spotlight indicator 142a based on hand gestures (e.g., pinch open, cursor pinch, fully pinched). Referring to FIG. 17B, in some examples, the input transition engine 122 determines the size of the spotlight indicator 142a based on the distance between a thumb and an index finger, which can be determined based on the hand tracking data 149. The hand tracking data 149 may include the location of keypoints defined on the hand.

When a pinch gesture is in an open gesture state 145a, the spotlight indicator 142a may be a relatively large spotlight based on the user's gaze (e.g., see gaze spotlight indicator

142a in FIG. 17A in the saccade state 160c). In some examples, in the open gesture state 145a, the pinch cursor is not activated. In some examples, the input transition engine 122 may determine that the user's hand is in an open gesture state 145a when the cursor pinch is active and a distance between the tip of the user's thumb and their index finger is greater than a first threshold.

In some examples, a pinch gesture is where a thumb and finger(s) (e.g., an index finger or two more figures) are spaced apart, and the user brings the thumb and fingertip(s) together in a squeezing motion. In some examples, the hand forms a "C" shape, and the pinching motion creates a smaller "C" shape. In some examples, the input transition engine 122 may determine that the user's hand is in an open gesture state 145a when the cursor pinch is active and the distance between the tip of the user's thumb and the index finger is greater than a first threshold.

When the pinch gesture is in the partial pinch state 145b (e.g., the user partially pinches), the motion of the gaze spotlight indicator 142a and the intensity of their pinch may cause the gaze spotlight indicator 142a to compress, thereby activating a cursor pinch. In the cursor pinch, in some examples, the gaze spotlight indicator 142a may include arrows that point towards the center of the gaze spotlight indicator 142a, thereby leading the user's eyes towards the center of the cursor as they select the object 144. In some examples, the input transition engine 122 may determine that the user's hand is in the partial pinch state 145b in response to the distance between tip of the user's thumb and the index finger being less than the first threshold but greater than a second threshold. The second threshold may be less than the first threshold. When a pinch gesture is a closed gesture state 145c, the gaze spotlight indicator 142a becomes a focused cursor. In some examples, the input transition engine 122 may determine that the user's hand is in the closed gesture state 145c in response to the distance between tip of the user's thumb and the index finger being less than the second threshold.

Figure 17C:
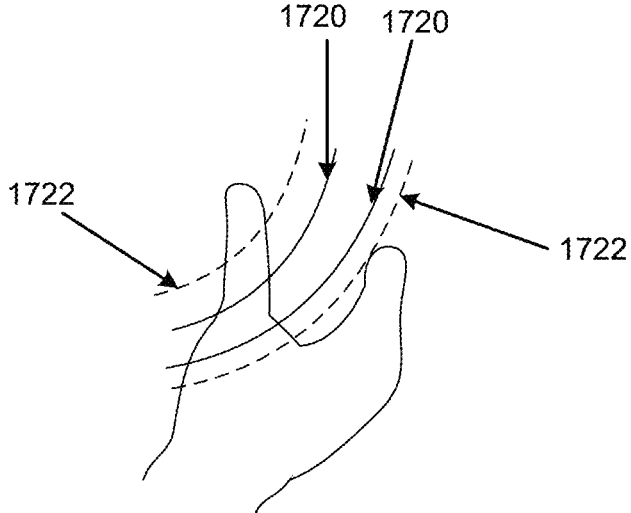
FIG. 17C illustrates an example of activating a pinch cursor according to an aspect.

FIG. 17C illustrates an example of activating a pinch cursor for UI selection according to an aspect. When the distance between tip of the user's thumb and the index finger is within an activation range 1720 (e.g., a band indicated by solid lines in FIG. 17C), the input transition engine 122 may activate the cursor pinch. For example, fingers within the activation range 1720 may activate pinch cursor, which remains activated until the fingers cross a deactivation range 1722 (e.g., a band indicated by dotted lines in FIG. 17C). In some examples, high velocity pinch movements either towards or away from the point of pinch also may trigger cursor pinch if they move the fingers within the region between the activation range 1720 and the deactivation range 1722.

Figure 18:
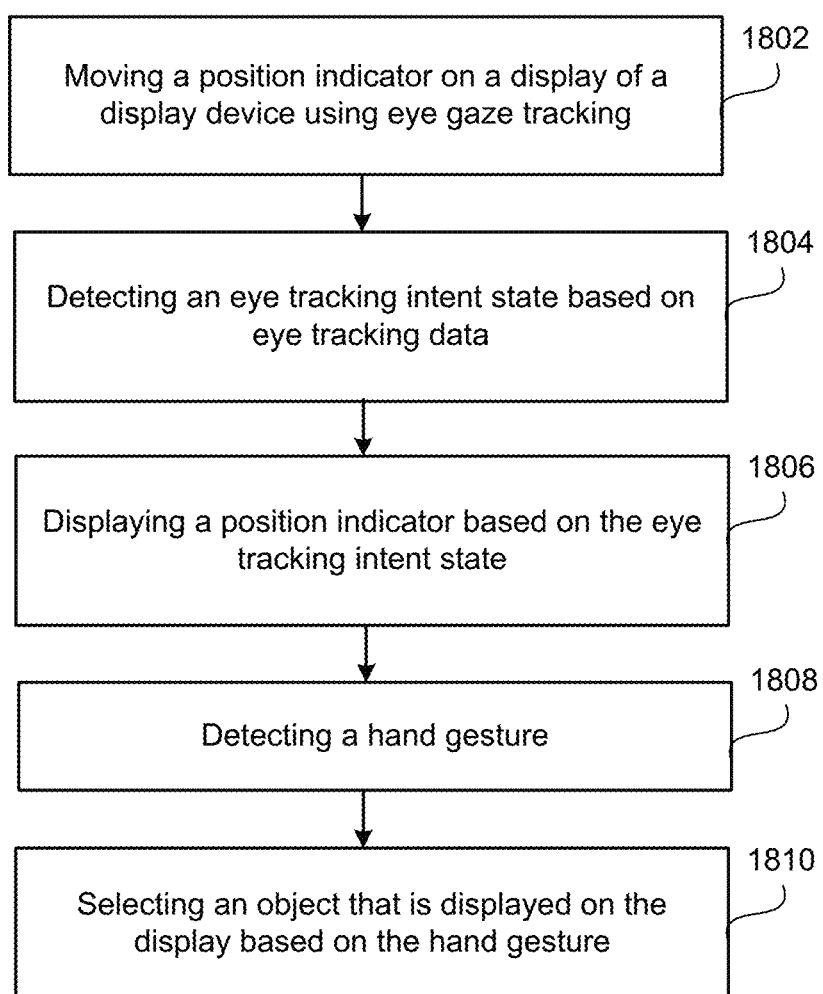
FIG. 18 illustrates a flowchart depicting example operations of displaying a position indicator according to different hand gestures according to an aspect.

FIG. 18 is a flowchart 1800 depicting example operations of a display device for transitioning between two input modalities according to an aspect. The flowchart 1800 may depict operations of a computer-implemented method. Although the flowchart 1800 of FIG. 18 illustrates the operations in sequential order, it will be appreciated that this is merely an example, and that additional or alternative operations may be included. Further, operations of FIG. 18 and related operations may be executed in a different order than that shown, or in a parallel or overlapping fashion.

Operation 1802 includes moving a position indicator on a display of a display device using eye gaze tracking. Operation 1804 includes detecting an eye gaze intent state based on eye tracking data. Operation 1806 includes displaying a position indicator based on the eye gaze intent state. Operation 1808 includes detecting a hand gesture. Operation 1810 includes selecting an object that is displayed on the display based on the hand gesture.

Clause 1. A method comprising: detecting an eye gaze intent state relating to eye movements based on eye tracking data from a sensor system on a display device; receiving an input device signal of an input device; determining to transition between a first input modality to a second input modality based on the eye gaze intent state and the input device signal; and controlling a position indicator on the display device using the first input modality and the second input modality for interacting with an object displayed on the display device.

Clause 2. The method of clause 1, wherein the position indicator is positioned at a first location based on the first input modality, the method further comprising: detecting the eye gaze intent state as a fixation state; determining that the input device signal indicates movement of the input device; and displaying a device pointer as the position indicator at a second location, the second location being a fixation location corresponding to an eye gaze location.

Clause 3. The method of clause 2, wherein the position indicator is hidden from a user in response to the position indicator being controlled by the first input modality.

Clause 4. The method of any one of clauses 1 to 3, wherein the position indicator is positioned at a first location based on the first input modality, the method further comprising: detecting the eye gaze intent state as a saccade state; determining that the input device signal indicates movement of the input device; and displaying a device pointer as the position indicator at the first location.

Clause 5. The method of any one of clauses 1 to 4, further comprising: displaying the position indicator as a device pointer at a first location; detecting the eye gaze intent state as a fixation state; determining whether a distance between a fixation location of the fixation state and the first location satisfies a threshold level; and in response to the distance between the fixation location and the first location being determined as satisfying the threshold level, positioning the position indicator, controllably by the first input modality, at the fixation location.

Clause 6. The method of clause 5, further comprising: in response to the distance between the fixation location and the first location being determined as not satisfying the threshold level, displaying the device pointer at the first location.

Clause 7. The method of any one of clauses 1 to 6, further comprising: displaying the position indicator as a device pointer at a first location; detecting the eye gaze intent state as a saccade state; determining whether a distance between a length of one or more saccades and the first location satisfies a threshold level; in response to the distance between the length of one or more saccades and the first location satisfying the threshold level, positioning the position indicator at a latest reading of an eye tracker; and in response to the distance between the length of one or more saccades and the first location not satisfying the threshold level, displaying the device pointer at the first location.

Clause 8. The method of any one of clauses 1 to 7, wherein the eye gaze intent state include a fixation state, a saccade state, or an undecided state, the method further comprising: classifying one or more eye-tracking samples as the fixation state, the saccade state, or the undecided state based on whether the one or more eye-tracking samples achieve a dispersion threshold, a velocity threshold, or are within a range between the dispersion threshold and the velocity threshold.

Clause 9. An extended reality device comprising: at least one processor; and a non-transitory computer-readable medium storing executable instructions that cause the at least one processor to: detect an eye gaze intent state relating to eye movements based on eye tracking data from a sensor system on a display device; receive an input device signal of an input device; determine to transition between a first input modality to a second input modality based on the eye gaze intent state and the input device signal; and control a position indicator on the display device using the first input modality and the second input modality for interacting with an object displayed on the display device.

Clause 10. The extended reality device of clause 9, wherein the position indicator is positioned at a first location based on the first input modality, wherein the executable instructions include instructions that cause the at least one processor to: detect the eye gaze intent state as a fixation state; determine that the input device signal indicates movement of the input device; and display a device pointer as the position indicator at a second location, the second location being a fixation location corresponding to an eye gaze location.

Clause 11. The extended reality device of clause 10, wherein the position indicator is hidden from a user in response to the position indicator being controlled by the first input modality.

Clause 12. The extended reality device of any one of clauses 9 to 11, wherein the position indicator is positioned at a first location based on the first input modality, wherein the executable instructions include instructions that cause the at least one processor to: detecting the eye gaze intent state as a saccade state; determining that the input device signal indicates movement of the input device; and displaying a device pointer as the position indicator at the first location.

Clause 13. The extended reality device of any one of clauses 9 to 12, wherein the executable instructions include instructions that cause the at least one processor to: display the position indicator as a device pointer at a first location; detect the eye gaze intent state as a fixation state; determine whether a distance between a fixation location of the fixation state and the first location satisfies a threshold level; and in response to the distance between the fixation location and the first location being determined as satisfying the threshold level, position the position indicator, controllably by the first input modality, at the fixation location.

Clause 14. The extended reality device of clause 13, wherein the executable instructions include instructions that cause the at least one processor to: in response to the distance between the fixation location and the first location being determined as not satisfying the threshold level, display the device pointer at the first location.

Clause 15. The extended reality device of any one of clauses 9 to 14, wherein the executable instructions include instructions that cause the at least one processor to: display the position indicator as a device pointer at a first location; detect the eye gaze intent state as a saccade state; determine whether a distance between a length of one or more saccades and the first location satisfies a threshold level; in response to the distance between the length of one or more saccades and the first location satisfying the threshold level, position the position indicator at a latest reading of an eye tracker; and in response to the distance between the length of one or more saccades and the first location not satisfying the threshold level, display the device pointer at the first location.

Clause 16. The extended reality device of any one of clauses 9 to 15, wherein the eye gaze intent state include a fixation state, a saccade state, or an undecided state, wherein the executable instructions include instructions that cause the at least one processor to: classify one or more eye-tracking samples as the fixation state, the saccade state, or the undecided state based on whether the one or more eye-tracking samples achieve a dispersion threshold, a velocity threshold, or are within a range between the dispersion threshold and the velocity threshold.

Clause 17. A non-transitory computer-readable medium storing executable instructions that when executed by at least one processor cause the at least one processor to execute operations, the operations comprising: detecting an eye gaze intent state relating to eye movements based on eye tracking data from a sensor system on a display device; receiving an input device signal of an input device; determining to transition between a first input modality to a second input modality based on the eye gaze intent state and the input device signal; and controlling a position indicator on the display device using the first input modality and the second input modality for interacting with an object displayed on the display device.

Clause 18. The non-transitory computer-readable medium of clause 17, wherein the position indicator is positioned at a first location based on the first input modality, the operations further comprising: detecting the eye gaze intent state as a fixation state; determining that the input device signal indicates movement of the input device; and displaying a device pointer as the position indicator at a second location, the second location being a fixation location corresponding to an eye gaze location.

Clause 19. The non-transitory computer-readable medium of clause 17 or 18, wherein the position indicator is positioned at a first location based on the first input modality, the operations comprising: detecting the eye gaze intent state as a saccade state; determining that the input device signal indicates movement of the input device; and displaying a device pointer as the position indicator at the first location.

Clause 20. The non-transitory computer-readable medium of any one of clauses 17 to 19, wherein the operations comprise: displaying the position indicator as a device pointer at a first location; detecting the eye gaze intent state as a fixation state; determining whether a distance between a fixation location of the fixation state and the first location satisfies a threshold level; and in response to the distance between the fixation location and the first location being determined as satisfying the threshold level, positioning the position indicator, controllably by the first input modality, at the fixation location.

Clause 21. A method comprising: detecting an eye gaze intent state relating to eye movements based on eye tracking data from a sensor system on a display device; determining to transition between a first input modality to a second input modality based on the eye gaze intent state, the first input modality including eye gaze tracking, the second input modality including head or hand tracking; and controlling a position indicator on the display device using the first input modality and the second input modality for interacting with an object displayed on the display device.

Clause 22. The method of clause 21, wherein the position indicator is positioned at a first location based on the first input modality, the method further comprising: detecting a hand gesture based on hand tracking data; detecting the eye gaze intent state as a fixation state; and displaying the position indicator as a head pointer at the first location, the head pointer being movable by the second input modality.

Clause 23. The method of clause 21 or 22, wherein the position indicator is positioned at a first location based on the first input modality, the method further comprising: detecting a hand gesture based on hand tracking data; detecting the eye gaze intent state as an intentful fixation state, the intentful fixation state identifying a second location; determining whether a distance between the first location and the second location satisfies a threshold level; in response to the distance between the first location and the second location satisfying the threshold level, displaying the position indicator as a head pointer at the second location; and in response to the distance between the first location and the second location not satisfying the threshold level, displaying the position indicator as the head pointer at the first location.

Clause 24. The method of any one of clauses 21 to 23, wherein the position indicator is positioned at a first location based on the first input modality, the method further comprising: detecting a hand gesture based on hand tracking data; detecting the eye gaze intent state as a saccade state or an undecided state; determining whether a distance between the first location and a second location satisfies a threshold level, the second location corresponding to an eye gaze location; in response to the distance between the first location and the second location satisfying the threshold level, displaying the position indicator as a gaze indicator; and in response to the distance between the first location and the second location not satisfying the threshold level, displaying the position indicator as a head pointer at the first location.

Clause 25. The method of any one of clauses 21 to 24, further comprising: displaying the position indicator as a head pointer at a first location; detecting the eye gaze intent state as an intentful fixation state; and moving the head pointer to a second location, the second location being a fixation location of the intentful fixation state.

Clause 26. The method of any one of clauses 21 to 25, further comprising: displaying the position indicator as a head pointer at a first location; detecting the eye gaze intent state as a saccade state or an undecided state; determining whether a distance between the first location and a second location satisfies a threshold level, the second location corresponding to an eye gaze location; and in response to the distance between the first location and the second location satisfying the threshold level, displaying the position indicator as a gaze indicator.

Clause 27. The method of any one of clauses 21 to 26, wherein the position indicator is positioned at a first location based on the first input modality, the method further comprising: detecting a hand gesture based on hand tracking data; detecting the eye gaze intent state as an intentful fixation state, the intentful fixation state identifying a second location; determining whether a distance between the first location and the second location satisfies a threshold level; and in response to the distance between the first location and the second location satisfying the threshold level, displaying the position indicator as a hand pointer at the second location.

Clause 28. The method of any one of clauses 21 to 27, wherein the position indicator is positioned at a first location based on the first input modality, the method further comprising: detecting a hand gesture based on hand tracking data; detecting the eye gaze intent state as a saccade state or an undecided state; and display the position indicator as a hand pointer.

Clause 29. The method of any one of clauses 21 to 28, further comprising: displaying the position indicator as a hand pointer at a first location; detecting the eye gaze intent state as an intentful fixation state identifying a second location; and displaying the hand pointer at the second location.

Clause 30. The method of any one of clauses 21 to 29, wherein the eye gaze intent state include a fixation state, a saccade state, or an undecided state, the method further comprising: classifying one or more eye-tracking samples as the fixation state, the saccade state, or the undecided state based on whether the one or more eye-tracking samples achieve a dispersion threshold, a velocity threshold, or are within a range between the dispersion threshold and the velocity threshold.

Clause 31. An extended reality device comprising: at least one processor; and a non-transitory computer-readable medium storing executable instructions that cause the at least one processor to: detect an eye gaze intent state relating to eye movements based on eye tracking data from a sensor system on a display device; determine to transition between a first input modality to a second input modality based on the eye gaze intent state, the first input modality including eye gaze tracking, the second input modality including head or hand tracking; and control a position indicator on the display device using the first input modality and the second input modality for interacting with an object displayed on the display device.

Clause 32. The extended reality device of clause 31, wherein the position indicator is positioned at a first location based on the first input modality, wherein the executable instructions include instructions that cause the at least one processor to: detect a hand gesture based on hand tracking data; detect the eye gaze intent state as a fixation state; and display the position indicator as a head pointer at the first location, the head pointer being movable by the second input modality.

Clause 33. The extended reality device of clause 31 or 32, wherein the position indicator is positioned at a first location based on the first input modality, wherein the executable instructions include instructions that cause the at least one processor to: detect a hand gesture based on hand tracking data; detect the eye gaze intent state as an intentful fixation state, the intentful fixation state identifying a second location; determine whether a distance between the first location and the second location satisfies a threshold level; in response to the distance between the first location and the second location satisfying the threshold level, display the position indicator as a head pointer at the second location; and in response to the distance between the first location and the second location not satisfying the threshold level, display the position indicator as the head pointer at the first location.

Clause 34. The extended reality device of any one of clauses 31 to 33, wherein the position indicator is positioned at a first location based on the first input modality, wherein the executable instructions include instructions that cause the at least one processor to: detect a hand gesture based on hand tracking data; detect the eye gaze intent state as a saccade state or an undecided state; determine whether a distance between the first location and a second location satisfies a threshold level, the second location corresponding to an eye gaze location; in response to the distance between the first location and the second location satisfying the threshold level, display the position indicator as a gaze indicator; and in response to the distance between the first location and the second location not satisfying the threshold level, display the position indicator as a head pointer at the first location.

Clause 35. The extended reality device of any one of clauses 31 to 34, wherein the executable instructions include instructions that cause the at least one processor to: display the position indicator as a head pointer at a first location; detect the eye gaze intent state as an intentful fixation state; and move the head pointer to a second location, the second location being a fixation location of the intentful fixation state.

Clause 36. The extended reality device of any one of clauses 31 to 35, wherein the executable instructions include instructions that cause the at least one processor to: display the position indicator as a head pointer at a first location; detect the eye gaze intent state as a saccade state or an undecided state; determine whether a distance between the first location and a second location satisfies a threshold level, the second location corresponding to an eye gaze location; and in response to the distance between the first location and the second location satisfying the threshold level, display the position indicator as a gaze indicator.

Clause 37. A non-transitory computer-readable medium storing executable instructions that cause at least one processor to execute operations, the operations comprising: detecting an eye gaze intent state relating to eye movements based on eye tracking data from a sensor system on a display device; determining to transition between a first input modality to a second input modality based on the eye gaze intent state, the first input modality including eye gaze tracking, the second input modality including head or hand tracking; and controlling a position indicator on the display device using the first input modality and the second input modality for interacting with an object displayed on the display device.

Clause 38. The non-transitory computer-readable medium of clause 37, wherein the position indicator is positioned at a first location based on the first input modality, wherein the operations comprise: detecting a hand gesture based on hand tracking data; detecting the eye gaze intent state as a fixation state; and displaying the position indicator as a head pointer at the first location, the head pointer being movable by the second input modality.

Clause 39. The non-transitory computer-readable medium of clause 37 or 38, wherein the position indicator is positioned at a first location based on the first input modality, wherein the operations comprise: detecting a hand gesture based on hand tracking data; detecting the eye gaze intent state as an intentful fixation state, the intentful fixation state identifying a second location; determining whether a distance between the first location and the second location satisfies a threshold level; in response to the distance between the first location and the second location satisfying the threshold level, displaying the position indicator as a head pointer at the second location; and in response to the distance between the first location and the second location not satisfying the threshold level, displaying the position indicator as the head pointer at the first location.

Clause 40. The non-transitory computer-readable medium of any one of clauses 37 to 39, wherein the position indicator is positioned at a first location based on the first input modality, wherein the operations comprise: detecting a hand gesture based on hand tracking data; detecting the eye gaze intent state as a saccade state or an undecided state; determine whether a distance between the first location and a second location satisfies a threshold level, the second location corresponding to an eye gaze location; in response to the distance between the first location and the second location satisfying the threshold level, displaying the position indicator as a gaze indicator; and in response to the distance between the first location and the second location not satisfying the threshold level, displaying the position indicator as a head pointer at the first location.

Clause 41. A method comprising: displaying a gaze indicator on a display device, the gaze indicator indicating a position of a pointer on a display of the display device; detecting an eye gaze intent state relating to eye movements based on eye tracking data from a sensor system on a display device; and adjusting a display aspect of the gaze indicator based on at least one of the eye gaze intent state or hand movement.

Clause 42. The method of clause 41, further comprising: detecting a hand gesture based on hand tracking data from the sensor system; and in response to detection of the hand gesture, displaying the gaze indicator.

Clause 43. The method of clause 41 or 42, further comprising: detecting the eye gaze intent state as a saccade state; in response to the eye gaze intent state being detected as the saccade state, displaying the gaze indicator with a first size; detecting the eye gaze intent state as an undecided state; and in response to the eye gaze intent state being detected as the undecided state, displaying the gaze indicator with a second size, the second size being smaller than the first size.

Clause 44. The method of clause 43, further comprising: detecting the eye gaze intent state as a fixation state; and in response to the eye gaze intent state being detected as the fixation state, displaying the gaze indicator with a third size, the third size being smaller than the second size.

Clause 45. The method of any one of clauses 41 to 44, further comprising: moving an eye pointer based on the eye tracking data; detecting a hand gesture of a hand based on hand tracking data from the sensor system; in response to detection of the hand gesture, displaying the gaze indicator; detecting movement of a hand; and in response to the movement of the hand being detected, changing a size of the gaze indicator.

Clause 46. The method of any one of clauses 41 to 45, further comprising: displaying a hand pointer or a head pointer; and determining to display the gaze indicator based on the eye gaze intent state.

Clause 47. The method of any one of clauses 41 to 46, wherein the eye gaze intent state include a fixation state, a saccade state, or an undecided state, the method further comprising: classifying one or more eye-tracking samples as the fixation state, the saccade state, or the undecided state based on whether the one or more eye-tracking samples achieve a dispersion threshold, a velocity threshold, or are within a range between the dispersion threshold and the velocity threshold.

Clause 48. An extended reality device comprising: at least one processor; and a non-transitory computer-readable medium storing executable instructions that cause the at least one processor to: display a gaze indicator on a display device, the gaze indicator indicating a position of a pointer on a display of the display device; detect an eye gaze intent state relating to eye movements based on eye tracking data from a sensor system on a display device; and adjust a display aspect of the gaze indicator based on at least one of the eye gaze intent state or hand movement.

Clause 49. The extended reality device of clause 48, wherein the executable instructions include instructions that cause the at least one processor to: detect a hand gesture based on hand tracking data from the sensor system; and in response to detection of the hand gesture, display the gaze indicator.

Clause 50. The extended reality device of clause 48 or 49, wherein the executable instructions include instructions that cause the at least one processor to: detect the eye gaze intent state as a saccade state; in response to the eye gaze intent state being detected as the saccade state, display the gaze indicator with a first size; detect the eye gaze intent state as an undecided state; and in response to the eye gaze intent state being detected as the undecided state, display the gaze indicator with a second size, the second size being smaller than the first size.

Clause 51. The extended reality device of clause 50, wherein the executable instructions include instructions that cause the at least one processor to: detect the eye gaze intent state as a fixation state; and in response to the eye gaze intent state being detected as the fixation state, display the gaze indicator with a third size, the third size being smaller than the second size.

Clause 52. The extended reality device of any one of clauses 48 to 51, wherein the executable instructions include instructions that cause the at least one processor to: move an eye pointer based on the eye tracking data; detect a hand gesture of a hand based on hand tracking data from the sensor system; in response to detection of the hand gesture, display the gaze indicator; detect movement of a hand; and in response to the movement of the hand being detected, change a size of the gaze indicator.

Clause 53. The extended reality device of any one of clauses 48 to 52, wherein the executable instructions include instructions that cause the at least one processor to: display a hand pointer or a head pointer; and determine to display the gaze indicator based on the eye gaze intent state.

Clause 54. The extended reality device of any one of clauses 48 to 53, wherein the eye gaze intent state include a fixation state, a saccade state, or an undecided state, wherein the executable instructions include instructions that cause the at least one processor to: classify one or more eye-tracking samples as the fixation state, the saccade state, or the undecided state based on whether the one or more eye-tracking samples achieve a dispersion threshold, a velocity threshold, or are within a range between the dispersion threshold and the velocity threshold.

Clause 55. A non-transitory computer-readable medium storing executable instructions that cause at least one processor to execute operations, the operations comprising: displaying a gaze indicator on a display device, the gaze indicator indicating a position of a pointer on a display of the display device; detecting an eye gaze intent state relating to eye movements based on eye tracking data from a sensor system on a display device; and adjusting a display aspect of the gaze indicator based on at least one of the eye gaze intent state or hand movement.

Clause 56. The non-transitory computer-readable medium of clause 55, wherein the operations comprise: detecting a hand gesture based on hand tracking data from the sensor system; and in response to detection of the hand gesture, displaying the gaze indicator.

Clause 57. The non-transitory computer-readable medium of clause 55 or 56, wherein the operations comprise: detecting the eye gaze intent state as a saccade state; in response to the eye gaze intent state being detected as the saccade state, displaying the gaze indicator with a first size; detecting the eye gaze intent state as an undecided state; and in response to the eye gaze intent state being detected as the undecided state, displaying the gaze indicator with a second size, the second size being smaller than the first size.

Clause 58. The non-transitory computer-readable medium of clause 57, wherein the operations comprise: detecting the eye gaze intent state as a fixation state; and in response to the eye gaze intent state being detected as the fixation state, displaying the gaze indicator with a third size, the third size being smaller than the second size.

Clause 59. The non-transitory computer-readable medium of any one of clauses 55 to 58, wherein the operations comprise: moving an eye pointer based on the eye tracking data; detecting a hand gesture of a hand based on hand tracking data from the sensor system; in response to detection of the hand gesture, displaying the gaze indicator; detecting movement of a hand; and in response to the movement of the hand being detected, changing a size of the gaze indicator.

Clause 60. The non-transitory computer-readable medium of any one of clauses 55 to 59, wherein the operations comprise: displaying a hand pointer or a head pointer; and determining to display the gaze indicator based on the eye gaze intent state.

Clause 61. A method comprising: moving a position indicator on a display device using a first input modality; transitioning from the first input modality to a second input modality based on a transition model; moving the position indicator on the display device using the second input modality; and selecting an object that is displayed on the display device using the first input modality, the second input modality, or a third input modality.

Clause 62. The method of clause 61, wherein the first input modality includes a controller, and the second input modality includes an eye gaze tracker, the method further comprising: detecting a lack of movement of the controller for a threshold level; in response to the lack of movement for the threshold level being detected, transitioning from the controller to the eye gaze tracker for controlling the position indicator.

Clause 63. The method of clause 62, wherein the threshold level if a first threshold level, the method further comprising: detecting movement of a computer mouse; in response to the movement of the computer mouse being detected, transitioning from the eye gaze tracker to the computer mouse for controlling the position indicator; detecting lack of movement of the computer mouse for a second threshold level; and in response to the lack of movement of the computer mouse for the second threshold level, transitioning from the computer mouse to raycasted hands for controlling the position indicator.

Clause 64. The method of clause 61, further comprising: detecting a hand gesture; and connecting a keyboard to the display device or rendering a virtual keyboard.

Clause 65. The method of clause 61, wherein the third input modality includes hand tracking.

Clause 66. The method of clause 61, wherein the first input modality includes a controller, and the second input modality includes raycasted hands, the method further comprising: detecting a lack of movement of the controller for a threshold level; in response to the lack of movement for the threshold level being detected, transitioning from the controller to the raycasted hands for controlling the position indicator.

Clause 67. The method of clause 66, wherein the threshold level if a first threshold level, the method further comprising: detecting movement of a computer mouse; in response to the movement of the computer mouse being detected, transitioning from the raycasted hands to the computer mouse for controlling the position indicator; detecting lack of movement of the computer mouse for a second threshold level; and in response to the lack of movement of the computer mouse for the second threshold level, transitioning from the computer mouse to eye gaze tracking for controlling the position indicator.

Clause 68. The method of clause 61, further comprising: rendering a setting interface on the display device, the setting interface including one or more controls for controlling transitions between a plurality of input modalities.

Clause 69. An extended reality device comprising: at least one processor; and a non-transitory computer-readable medium storing executable instructions that cause the at least one processor to: move a position indicator on a display device using a first input modality; transition from the first input modality to a second input modality based on a transition model; move the position indicator on the display device using the second input modality; and select an object that is displayed on the display device using the first input modality, the second input modality, or a third input modality.

Clause 70. The extended reality device of clause 69, wherein the first input modality includes a controller, and the second input modality includes an eye gaze tracker, wherein the executable instructions include instructions that cause the at least one processor to: detect a lack of movement of the controller for a threshold level; in response to the lack of movement for the threshold level being detected, transition from the controller to the eye gaze tracker for controlling the position indicator.

Clause 71. The extended reality device of clause 70, wherein the threshold level if a first threshold level, wherein the executable instructions include instructions that cause the at least one processor to: detect movement of a computer mouse; in response to the movement of the computer mouse being detected, transition from the eye gaze tracker to the computer mouse for controlling the position indicator; detect lack of movement of the computer mouse for a second threshold level; and in response to the lack of movement of the computer mouse for the second threshold level, transition from the computer mouse to raycasted hands for controlling the position indicator.

Clause 72. The extended reality device of clause 69, wherein the executable instructions include instructions that cause the at least one processor to: detect a hand gesture; and connect a keyboard to the display device or rendering a virtual keyboard.

Clause 73. The extended reality device of clause 69, wherein the third input modality includes hand tracking.

Clause 74. The extended reality device of clause 69, wherein the first input modality includes a controller, and the second input modality includes raycasted hands, wherein the executable instructions include instructions that cause the at least one processor to: detect a lack of movement of the controller for a threshold level; in response to the lack of movement for the threshold level being detected, transition from the controller to the raycasted hands for controlling the position indicator.

Clause 75. The extended reality device of clause 74, wherein the threshold level if a first threshold level, wherein the executable instructions include instructions that cause the at least one processor to: detect movement of a computer mouse; in response to the movement of the computer mouse being detected, transition from the raycasted hands to the computer mouse for controlling the position indicator; detect lack of movement of the computer mouse for a second threshold level; and in response to the lack of movement of the computer mouse for the second threshold level, transition from the computer mouse to eye gaze tracking for controlling the position indicator.

Clause 76. The extended reality device of clause 69, wherein the executable instructions include instructions that cause the at least one processor to: render a setting interface on the display device, the setting interface including one or more controls for controlling transitions between a plurality of input modalities.

Clause 77. A non-transitory computer-readable medium storing executable instructions that cause at least one processor to execute operations, the operations comprising: moving a position indicator on a display device using a first input modality; transitioning from the first input modality to a second input modality based on a transition model; moving the position indicator on the display device using the second input modality; and selecting an object that is displayed on the display device using the first input modality, the second input modality, or a third input modality.

Clause 78. The non-transitory computer-readable medium of clause 77, wherein the first input modality includes a controller, and the second input modality includes an eye gaze tracker, the operations further comprising: detecting a lack of movement of the controller for a threshold level; in response to the lack of movement for the threshold level being detected, transitioning from the controller to the eye gaze tracker for controlling the position indicator.

Clause 79. The non-transitory computer-readable medium of clause 78, wherein the threshold level if a first threshold level, the operations further comprising: detecting movement of a computer mouse; in response to the movement of the computer mouse being detected, transitioning from the eye gaze tracker to the computer mouse for controlling the position indicator; detecting lack of movement of the computer mouse for a second threshold level; and in response to the lack of movement of the computer mouse for the second threshold level, transitioning from the computer mouse to raycasted hands for controlling the position indicator.

Clause 80. The non-transitory computer-readable medium of clause 77, wherein the operations comprise: detecting a hand gesture; and connecting a keyboard to the display device or rendering a virtual keyboard.

Clause 81. A display device comprising one or more processors and one or more memory devices storing executable instructions that, when executed by the one or more processors, cause the display device to perform the method of any of clauses 1 to 8, 21 to 30, 41-47, and 61 to 68.

Clause 82. A computer-readable storage medium storing instructions that, when executed by one or more processors of a display device, cause the display device to perform the method of any of clauses 1 to 8, 21 to 30, 41-47, and 61 to 68.

Clause 83. A method comprising: detecting an eye gaze intent state relating to eye movements based on eye tracking data from a sensor system on a display device; determining to transition between a first input modality to a second input modality based on the eye gaze intent state; and controlling a position indicator on the display device using the first input modality and the second input modality for interacting with an object displayed on the display device.

Clause 84. The method of clause 83, further comprising a step (or a combination of steps) from any of clauses 1 to 8, 21 to 30, 41-47, and 61 to 68 (or any combination thereof).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
moving a position indicator of a display device from a first location determined by a controller to a second location determined by a tracker of an eye gaze;
detecting an intent state relating to eye movements based on eye tracking data from a sensor system of the display device;
receiving an input signal representing a displacement of the controller; and
in response to the intent state being detected as a non-fixation state and the displacement achieving a movement threshold:
moving the position indicator from the second location back to the first location; and
displaying the position indicator at the first location.

2. The method of claim 1, further comprising:
in response to the intent state being detected as a fixation state and the displacement achieving the movement threshold:
moving the position indicator from the second location to a third location determined by the tracker; and
displaying the position indicator at the third location.

3. The method of claim 1, further comprising:
in response to the intent state being detected as a fixation state and the displacement not achieving the movement threshold, moving the position indicator to a third location determined by the tracker, the position indicator not being visibly displayed at the third location.

4. The method of claim 1, further comprising:
in response to the position indicator being displayed at the first location, detecting the intent state as a fixation state;
determining whether a distance between a third location determined by the tracker and the first location satisfies a threshold level; and
in response to the distance between the third location and the first location being determined as satisfying the threshold level and the intent state being detected as the fixation state, moving the position indicator from the first location to the third location, the position indicator not being visibly displayed at the third location.

5. The method of claim 4, further comprising:
in response to the distance between the third location and the first location being determined as not satisfying the threshold level and the intent state being detected as the fixation state, continuing to display the position indicator at the first location.

6. The method of claim 1, wherein the non-fixation state includes a saccade state, the method further comprising:
in response to the position indicator being displayed at the first location, detecting the intent state as the saccade state;
determining whether a length of a saccade satisfies a threshold level;
in response to the length of the saccade satisfying the threshold level, moving the position indicator from the first location to a third location, the third location being a latest reading of the tracker, the position indicator not visibly displayed at the third location; and
in response to the length of the saccade satisfying the threshold level, continuing to display the position indicator at the first location.

7. The method of claim 1, wherein the non-fixation state includes a saccade state and an undecided state, wherein detecting the intent state includes:
detecting a fixation state based on the eye tracking data achieving a dispersion threshold;
detecting the saccade state based on the eye tracking data achieving a velocity threshold; and
detecting the undecided state based on the eye tracking data not achieving the dispersion threshold and the eye tracking data not achieving the velocity threshold.

8. The method of claim 1, further comprising:
identifying an interface element based on the eye tracking data by determining that the interface element is at a third location corresponding to a fixation location determined by the tracker;
detecting a user gesture while the position indicator is at the first location; and
in response to the user gesture being detected, selecting the interface element at the third location.

9. A display device comprising:
at least one processor; and
a non-transitory computer-readable medium storing executable instructions that cause the at least one processor to:
move a position indicator of the display device from a first location determined by a controller to a second location determined by a tracker of an eye gaze, the position indicator not being visibly displayed at the second location;
detect an intent state relating to eye movements based on eye tracking data from a sensor system on the display device;
receive an input signal representing a displacement of the controller; and
in response to the intent state being detected as a non-fixation state and the displacement achieving a movement threshold:
move the position indicator from the second location back to the first location; and
display the position indicator at the first location.

10. The display device of claim 9, wherein the executable instructions include instructions that cause the at least one processor to:

in response to the intent state being detected as a fixation state and the displacement achieving the movement threshold:

move the position indicator from the second location to a third location determined by the tracker; and display the position indicator at the third location.

11. The display device of claim 9, wherein the executable instructions include instructions that cause the at least one processor to:

in response to the intent state being detected as a fixation state and the displacement not achieving the movement threshold, move the position indicator from the second location to a third location determined by the tracker, the position indicator not being visibly displayed at the third location.

12. The display device of claim 9, wherein the executable instructions include instructions that cause the at least one processor to:

in response to the position indicator being displayed at the first location, detect the intent state as a fixation state;

determine whether a distance between a third location determined by the tracker and the first location satisfies a threshold level; and in response to the distance between the third location and the first location being determined as satisfying the threshold level and the intent state being detected as the fixation state, move the position indicator from the first location to the third location, the position indicator not being visibly displayed at the third location.

13. The display device of claim 12, wherein the executable instructions include instructions that cause the at least one processor to:

in response to the distance between the third location and the first location being determined as not satisfying the threshold level and the intent state being detected as the fixation state, continue to display the position indicator at the first location.

14. The display device of claim 9, wherein the non-fixation state includes a saccade state, wherein the executable instructions include instructions that cause the at least one processor to:

in response to the position indicator being displayed at the first location, detect the intent state as the saccade state;

determine whether a length of a saccade satisfies a threshold level;

in response to the length of the saccade satisfying the threshold level, move the position indicator from the first location to a third location, the third location being a latest reading of the tracker; and in response to the length of the saccade not satisfying the threshold level, continue to display the position indicator at the first location.

15. The display device of claim 9, wherein the non-fixation state includes a saccade state and an undecided state, wherein the executable instructions include instructions that cause the at least one processor to:

detect a fixation state based on the eye tracking data achieving a dispersion threshold;

detect the saccade state based on the eye tracking data achieving a velocity threshold; and detect the undecided state based on the eye tracking data not achieving the dispersion threshold and the eye tracking data not achieving the velocity threshold.

16. The display device of claim 9, wherein the executable instructions include instructions that cause the at least one processor to:

identify an interface element based on the eye tracking data by determining that the interface element is at a third location corresponding to a fixation location determined by the tracker;

detect a user gesture while the position indicator is at the first location; and in response to the user gesture being detected, select the interface element at the third location.

17. A non-transitory computer-readable medium storing executable instructions that when executed by at least one processor cause the at least one processor to execute operations, the operations comprising:

moving a position indicator of a display device from a first location determined by a controller to a second location determined by a tracker of an eye gaze, the position indicator not being visibly displayed at the second location;

detecting an intent state relating to eye movements based on eye tracking data from a sensor system on the display device;

receiving an input signal representing a displacement of the controller; and in response to the intent state being detected as a non-fixation state and the displacement achieving a movement threshold:

moving the position indicator from the second location back to the first location; and displaying the position indicator at the first location.

18. The non-transitory computer-readable medium of claim 17, the operations further comprising:

in response to the intent state being detected as a fixation state and the displacement achieving the movement threshold:

moving the position indicator from the second location to a third location determined by the tracker; and displaying the position indicator at the third location.

19. The non-transitory computer-readable medium of claim 17, wherein the non-fixation state includes a saccade state, wherein the operations comprise:

in response to the position indicator being displayed at the first location, detecting the intent state as the saccade state;

determining whether a length of a saccade satisfies a threshold level; and in response to the length of the saccade satisfying the threshold level and the intent state being detected as the saccade state, moving the position indicator from the first location to a third location, the third location being a latest reading of the tracker, the position indicator not visibly displayed at the third location.

20. The non-transitory computer-readable medium of claim 17, wherein the operations further comprise:

identifying an interface element based on the eye tracking data by determining that the interface element is at a third location corresponding to a fixation location determined by the tracker;

detecting a user gesture while the position indicator is at the first location; and in response to the user gesture being detected, selecting the interface element at the third location.

* * * * *